US011388010B2

(12) United States Patent
Chen et al.

(10) Patent No.: US 11,388,010 B2
(45) Date of Patent: Jul. 12, 2022

(54) BLOCKCHAIN ACCOUNT MIGRATION

(71) Applicant: ArcBlock, Inc., Bellevue, WA (US)

(72) Inventors: Tian Chen, Issaquah, WA (US);
Zhihong Mao, Issaquah, WA (US)

(73) Assignee: ArcBlock, Inc., Bellevue, WA (US)

( * ) Notice: Subject to any disclaimer, the term of this patent is extended or adjusted under 35 U.S.C. 154(b) by 255 days.

(21) Appl. No.: 16/657,890

(22) Filed: Oct. 18, 2019

(65) Prior Publication Data

US 2021/0119807 A1    Apr. 22, 2021

(51) Int. Cl.
*H04L 29/06* (2006.01)
*H04L 9/32* (2006.01)
*G06F 16/21* (2019.01)
*G06F 9/54* (2006.01)
*H04L 9/06* (2006.01)

(52) U.S. Cl.
CPC ............ *H04L 9/3247* (2013.01); *G06F 9/542* (2013.01); *G06F 16/214* (2019.01); *H04L 9/0637* (2013.01); *H04L 2209/38* (2013.01); *H04L 2209/56* (2013.01)

(58) Field of Classification Search
CPC .............. H04L 9/3247; H04L 9/0637; H04L 2209/56; H04L 2209/38; H04L 9/3242; H04L 9/3297; H04L 9/3239; G06F 16/214; G06F 9/542
See application file for complete search history.

(56) References Cited

U.S. PATENT DOCUMENTS

| 2014/0380055 | A1* | 12/2014 | Blanchard | H04L 9/3247 713/171 |
| 2018/0323963 | A1* | 11/2018 | Stallman | H04L 9/3239 |
| 2019/0370223 | A1* | 12/2019 | Yang | G06F 3/0647 |
| 2019/0372834 | A1* | 12/2019 | Patil | H04L 9/3297 |
| 2020/0051069 | A1* | 2/2020 | Wilson | G06Q 20/389 |
| 2020/0294011 | A1* | 9/2020 | Robertson | H04L 9/0637 |
| 2020/0320529 | A1* | 10/2020 | Lyadvinsky | H04L 9/3252 |
| 2020/0364703 | A1* | 11/2020 | Joveski | G06Q 20/02 |
| 2021/0027281 | A1* | 1/2021 | Kilroe | G06F 21/31 |

* cited by examiner

*Primary Examiner* — Taghi T Arani
*Assistant Examiner* — Lin Chang
(74) *Attorney, Agent, or Firm* — Eversheds Sutherland (US) LLP

(57) ABSTRACT

Techniques and systems described below relate to systems and methods to migrate a blockchain account. A blockchain migrate transaction can migrate an existing account from an old address to a new address. A blockchain account migration can be performed in response to a determination that a secret key associated with an address has or has potentially been exposed. Existing digital assets associated with a potentially compromised account may be carried over to a new account as part of a blockchain account migrate transaction.

20 Claims, 25 Drawing Sheets

BLOCKCHAIN ACCOUNT MIGRATION

BACKGROUND

Adoption of blockchain technologies in various contexts is challenging. There are many challenges that software developers and organizations face to create widespread, decentralized blockchain applications. Among them include, but are not limited to, poor performance and requirements for deeply specialized knowledge to create blockchain-based applications.

Existing blockchain applications are built for specialized software developers, creating a barrier to widespread adoption of blockchain technologies. Furthermore, ensuring that blockchain networks are secure is challenging. For example, there are many challenges in which a user knows or has reason to believe that his or her account is compromised. A user may be able to create a new address, but there may still be data associated with an old address that cannot be moved over, and it may be difficult or impossible to inform all other parties to re-route blockchain transactions intended to the user from the old address to the new address.

In some cases, there are challenges involved in updating blockchain nodes. Nodes of a blockchain network agree upon protocols, rules, and software that implement functionality and which can change over time. A blockchain network may be upgrade from one protocol version to another based on a consensus of a majority or supermajority of nodes agreeing to and performing an update. Challenges exist when nodes of a blockchain network are to be updated due to the decentralized nature of the blockchain network—even if one node successfully updates, the blockchain as a whole may not move forward with the update.

Generation and transfer of digital assets and tokens in a blockchain network are challenging to execute in a scalable manner. In some cases, pre-generating tokens in bulk has drawbacks, such as bloating of the blockchain. Additionally, signing many transactions (e.g., hundreds or millions) may be resource intensive in terms of cost, compute time, data storage usage, and more. Furthermore, there may be security challenges involved in certain types of blockchain transactions in which a party to a blockchain transaction is required to have possession of cryptographic material that can be stolen.

Cross-chain transaction are challenging to implement. In some cases, an entity may control digital assets across multiple blockchain networks. A cross-chain transaction may refer to a scenario in which a first entity has a first digital asset on a first blockchain and a second entity has a second digital asset on a second blockchain such that the first and second entities are to exchange control of the first digital asset for control of the second digital asset and vice versa in a manner that is safe, secure, and robust to failures that can occur at any point between when such a cross-chain transaction is initiated and when it is completed.

BRIEF DESCRIPTION OF THE DRAWINGS

Various techniques will be described with reference to the drawings, in which.

DETAILED DESCRIPTION

Figure 1:
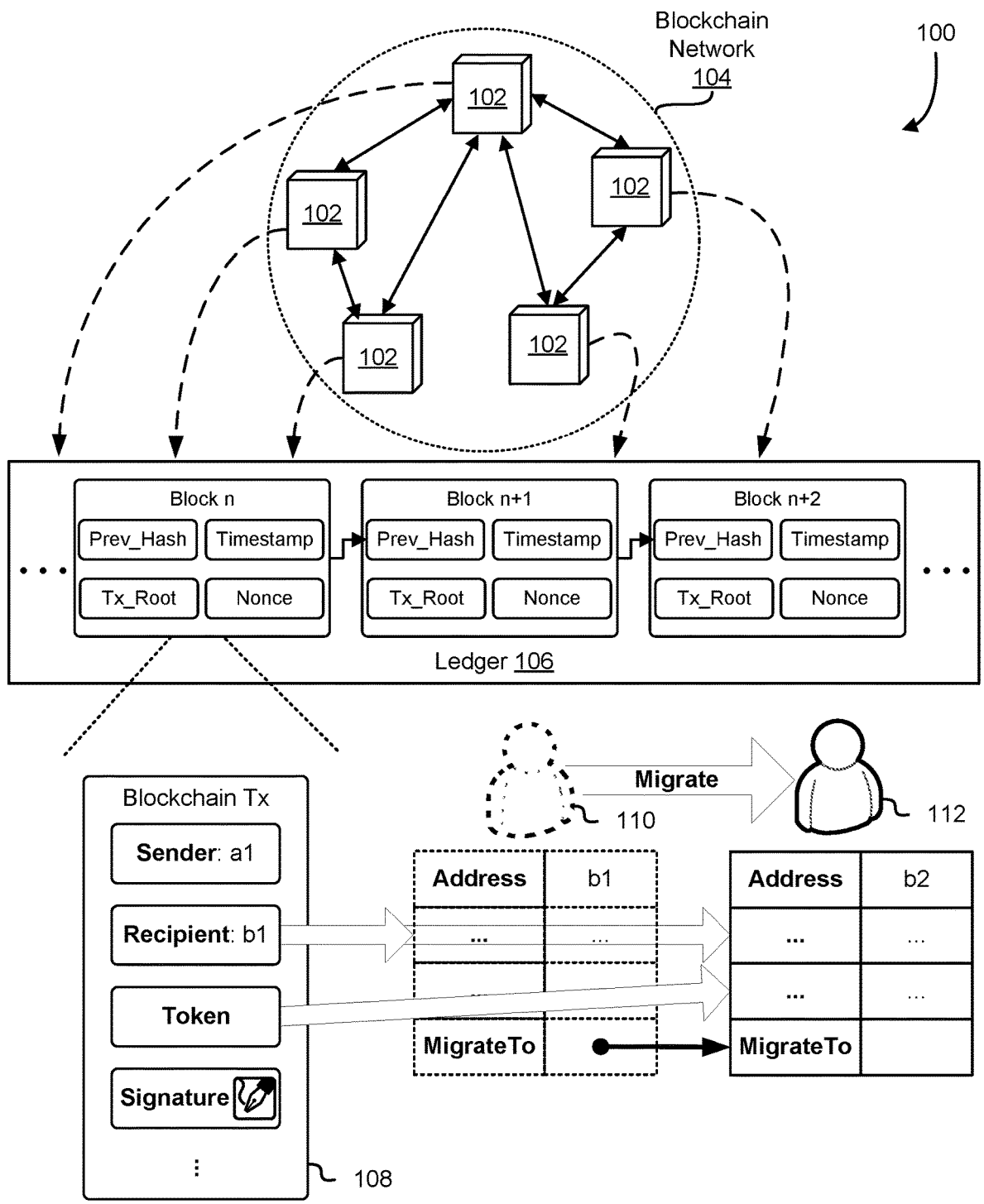
FIG. 1 illustrates a computing environment in which an embodiment may be practiced.

Techniques and systems described below relate to systems and methods to migrate blockchain accounts. A blockchain migrate transaction can migrate an existing account from an old address to a new address. A blockchain account migration can be performed in response to a determination that a secret key associated with an address has or has potentially been exposed. Existing digital assets associated with a potentially compromised account may be carried over to a new account as part of a blockchain account migrate transaction. In some cases, digital assets cannot be transferred to a new account.

In various blockchain networks, a blockchain user may be associated with an account that has a unique address which is a type of identifier that can be used to identify the user, such as to allow other users of the blockchain network to send digital assets to the blockchain user or verify information regarding the user. Each account may have a private and public key associated with it where the private key is used to generate digital signatures and the public key, made available to the blockchain network, is used to verify those digital signatures.

In some cases, a user may determine that the private key may no longer be a secret and may be known to a malicious party. The user can initiate a blockchain account migration transaction that invalidates the private key and generates a new account for the user with a new asymmetric key pair and associates the old (potentially compromised account) to the new account. The blockchain account migration transaction may generate a link from a first account to a second account, thereby indicating that the first account is deprecated and that its private key cannot be used for signing any new transactions on the blockchain—any attempt to do so may be rejected by validating nodes of the blockchain network. In some embodiments, a blockchain account is deprecated when a "MigrateTo" field is non-empty, thereby indicating that a migration has occurred. The "MigrateTo" field may include a list of account migrations for a user over time—for example, if a user migrated from address b1 to b2 and then from b2 to b3, then the first account (with address b1) may include the list {b2, b3} which traces all of the account migrates a user has performed over time. The list of migrated accounts may be used to access intermediate accounts or the most recent account, which is an active (not deprecated) account. In some embodiments, digital assets and/or tokens are transferred from an old address to a new address as part of a blockchain account migration transaction. In some cases, an account may have non-movable tokens which remain with a deprecated account.

Techniques and systems described below relate to systems and methods to upgrade blockchain software. A blockchain network may comprise multiple nodes which are independently operated in a decentralized manner in which no individual node controls the blockchain network. Rather, a blockchain network may rely on a consensus of nodes of the blockchain network for making decisions such as whether to update from one version of the blockchain software to another. Nodes of a blockchain may vote on whether to accept a proposed upgrade, and if a consensus is reached, an upgrade blockchain transaction may be broadcast to the blockchain ledger that indicates a time or block height at which to perform an upgrade as well as information that indicates how to perform the upgrade (e.g., which version to upgrade to and/or where to get upgrade binaries).

A blockchain node upgrade may be performed by a blockchain node in concert with a node monitoring service and an update management service. In various embodiments, the blockchain node, the node monitoring service, and the update management service programmatically execute code that collectively causes a blockchain node to be upgraded. In some embodiments, the blockchain node obtains an upgrade blockchain transaction from a block that is committed to the blockchain ledger that indicates to upgrade the blockchain software at a specific block height— for example, upgrade from v1 to v2 at block height n=1,000 where the upgrade block height has not yet been reached. In some embodiments, the blockchain node provides this information (e.g., the upgrade blockchain transaction) to the blockchain management service and the blockchain management service downloads the upgrade software, verifies it, and stores the software. The management service, in some embodiments, is responsible for switching the current version of the software when the upgrade block height is reached. A node monitoring service can be a daemon that is used to start a blockchain node and monitors the health of the blockchain node. A blockchain node may be a child process of a node monitoring service. If a node monitoring service detects that a blockchain node is not running (e.g., crashed or programmatically shut down) it can, in some embodiments, restart the blockchain node.

When an upgrade node transaction is broadcasted to a blockchain network (e.g., via the ledger), a blockchain node may receive the transaction and route it to an update management service which verifies the transaction and determines how to download and store upgrade code. The upgrade node transaction may include a block height when the upgrade should occur. When the upgrade block height or time is reached, the update management service updates configuration information to the upgraded version and then stops the blockchain node. Subsequently, the node monitoring service may detect that the blockchain node is not running and attempts to launch the blockchain node. Since the configuration information has been updated, the node monitoring service will attempt to launch the blockchain node under the upgraded version, in accordance with at least one embodiment. Once the blockchain node has been started with the new version, the blockchain node will tell other nodes on the blockchain network that it is running the new version and will wait for enough other nodes to indicate that they are also running the new version. When enough nodes are running the new version (e.g., ⅔ super majority or simple majority) then the nodes will continue processing the next block of the blockchain according to the updated version.

A blockchain protocol upgrade may be performed on a blockchain node comprising two parts—a core component and a set of transaction protocols on the node that are installed or otherwise configured to carry out specific operations of the node. Transaction protocols can be implemented as binaries such as dynamically linked libraries (DLLs) that the core component loads. In some embodiments, the entire node is updated all at once, whereas in other embodiments, individual protocols are updated while the rest of the node continues to run. A blockchain protocol upgrade may be a light-weight upgrade that is small (e.g., on the order of kilobytes) in size and may be liable to change more frequently than core components.

In at least one embodiment, a deploy protocol transaction includes or encodes information to obtain binaries of one or more protocols. When a deploy protocol transaction is issued, there may be a voting process similar to those described in embodiments hereinabove and below where a consensus is reached to upgrade from one version to another—e.g., v1 to v2. In some embodiments, the deploy protocol transaction takes the updated binary, verifies that it is a newer version than the currently running version, and loads the binary into a virtual machine using a hot swap reloading. In some embodiments, the updated version of a protocol binary is loaded without requiring the entire node the shutdown. In some embodiments, a deploy protocol upgrade is treated as an account migration where a first address corresponds to a first version of a protocol and migration to a second address corresponds to a second version of the protocol that is more up-to-date.

Techniques and systems described below relate to systems and methods relating to blockchain asset factory generation and utilization. A first entity (also referred to as an "issuer") creates an asset factory object that includes a list of parameters including a template that encodes how to create different assets. For example, an asset factory object may be a ticket to a movie showing that includes, as part of a list of parameters, a show time, the title of the movie, total number of tickets available, and a template that includes a field for seating information. The first entity may digitally sign the asset factory transaction and broadcast it to a blockchain network. A second entity (also referred to as an "owner") generates an acquire asset transaction by creating an object based on the information included in the asset factory and then also including additional information to fill in the template fields. Continuing with the previous example, a buyer creates an acquire asset transaction by selecting a particular seat for the movie that the buyer wants to see and signing the acquire asset transaction. The acquire asset transaction is validated and broadcasted to the blockchain network, and may include a transfer of digital assets from the owner to the issuer. In some cases, the asset factory includes a restriction on the issuance of tickets—for example, the owner may be required to provide a zero-knowledge proof that he or she is over a certain age in order for the acquire asset transaction to be valid. A consume asset transaction may be generated to fulfill the utilization of the acquire asset transaction. In some embodiments, an issuer or an account derived from the issuer generates a consume asset transaction with a first set of information that pertains to the asset factory—for example, the show time and the tile of a movie—and a second set of information that is to be filled in by the owner—for example, a seat number and a reference to the user's acquire asset transaction. The issuer or derived account may generate a digital signature over the consume asset transaction and send it to the owner. The owner may inspect the information that was provided by the issuer (or account derived from the issuer) to verify that it matches the information that the issuer expected, and the issuer may fill in the missing parts and digitally sign the completed consume asset transaction. The completed and signed consume asset transaction may be broadcasted to the blockchain ledger to be validated (e.g., validating that the owner referenced a valid and not-yet-consumed acquire asset transaction). Continuing with a movie ticket example, the owner may be requested to complete and sign a consume asset transaction as a condition for entry to see a particular movie.

In some embodiments, an issuer pre-generates multiple consume asset transactions so that the private key used on the issuer side does not need to be physically or logically accessible at the point in which the owner signs the consume asset transaction. Accordingly, security of blockchain-based systems is improved because the issuer or account derived from the issue is not required to have physical or even logical access to a private key at the point in which an owner generates his or her corresponding digital signature, thereby reducing the risk involved in having the owner-side private key being inadvertently exposed.

Techniques and systems described below relate to systems and methods relating to cross-chain transactions. A cross-chain transaction may refer to an exchange of a digital asset or token on a first blockchain for a digital asset or token on a second blockchain. In at least some embodiments, a protocol that implements cross-chain transaction is robust to failure, which can include the refusal of any party of a cross-chain transaction to operate according to the protocol.

In at least one embodiment, a first user has control of a token on a first blockchain and a second user has control of a digital asset on a second chain. Both parties may have accounts on both blockchains. The first user sends a request to a third entity on the first blockchain to create a tether transaction that transfers control of the token (e.g., a first token) to the third entity and also specifies a second token and a third token which are to be utilized in different scenarios that may arise as part of execution of the cross-chain transaction. The third entity may include its public key and generate a digital signature over the tether transaction and provide it to the first entity. The first entity may inspect the tether transaction and digitally sign the tether transaction and upon execution of the tether transaction on the blockchain, control of the first token has been transferred from the first entity to the third entity. The tether transaction is considered valid and will be accepted on the first blockchain if the transaction is correctly signed by the first entity and the third entity, that the first entity does indeed have control of the token. In some cases, there are limits imposed on the amount of tokens and/or digital assets that can be tethered to the third entity. The tether transaction may be executed on the first blockchain.

The first entity may then use the tether transaction on the second blockchain through an exchange transaction. The second entity may be from the second entity and comprise some or all of the following data: the second chain's DID; the second entity's public key; sender information that corresponds to the digital asset controlled by the second entity on the second blockchain that is be transferred from the second entity to the first entity; receiver information that includes the full data payload of the tether transaction; an expiration; and any combination thereof. The second entity may digitally sign the exchange transaction upon calculating the hash of the deposit transaction and verifying that the tether corresponding to the hash has not been withdrawn. The exchange transaction may be valid and accepted by the second blockchain based on some or all of the following conditions: tether transaction is correctly signed by the first entity and the third entity; the exchange transaction is correctly signed by the second entity and the first entity; the second entity has control of the digital asset that it purports to transfer; and the tether transaction has not appeared on the second blockchain before. There may be other conditions that must be satisfied for the exchange transaction to be valid, which may be described in connection with various embodiments in greater detail below.

To release the tether from the third entity on the first blockchain, the second entity may first create a release tether transaction on the first blockchain. In at least some embodiments, the release tether transaction does not actually transfer control of the first token from the third entity to the second entity, but rather servers as a cryptographically verifiable attestation that the second entity has already notified the third entity to release the tether. The first blockchain may consider the release tether transaction be valid if one or more of the following conditions are met: the release tether transaction is correctly signed by the second entity; the exchange transaction referenced by the release tether transaction is correctly signed by the second entity and the first entity; the exchange transaction is from the second entity and equals to withdrawer of the tether transaction; the tether transaction is correctly signed by the first entity and the third entity; the tether corresponded to first token is available under the third entity; and various combinations thereof. Other embodiments may have different sets of conditions, as described in greater detail below. In some embodiments, the release tether transaction acts as a notification that is the third entity's responsibility to verify that the exchange transaction was actually successfully executed on the second chain. The third entity may generate an approved withdraw blockchain transaction to approve the release of the tether on the first token. The third entity may allow for the first entity to stop the transaction and get the first token back using a revoke tether transaction under certain conditions. In some embodiments, a dispute transaction can be submitted by the first entity or the second entity if either or both determines that the third entity does not act according to the protocol (e.g., by refusing to release the tether when all conditions have been met).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a computing environment 100 in which an embodiment may be practiced. The computing environment 100 may be used to implement a system that supports access to various blockchains and blockchain protocols. FIG. 1 illustrates nodes 102 of a blockchain network 104; a blockchain ledger 106; a blockchain transaction 108; an old blockchain account 110 of a user associated with a first blockchain address, and a new blockchain account 112 of the user associated with a second blockchain address different from the first blockchain address.

In at least some embodiment, a blockchain network 104 refers to any and all suitable forms of distributed ledgers, which includes consensus-based blockchain and transaction-chain technologies, permissioned and un-permissioned ledgers, shared ledgers, and more. Non-limiting examples of blockchain technology include Bitcoin, Ethereum, and Arc-Block, although other examples of blockchain technologies are also contemplated in the scope of this disclosure. While Bitcoin, Ethereum, and ArcBlock may be described in connection with various embodiments of this disclosure, those embodiments are to be construed merely as illustrative examples and not limiting. For example, alternative blockchain implementations and protocols are contemplated within the scope of the present disclosure. A blockchain network 104 may be an interconnected network of nodes 102 that can be independently operated and controlled by different entities, none of which has unilateral control over the operation of the blockchain network. A blockchain network 104 may be a distributed and decentralized system that can be used to execute and record blockchain transactions on an electronic ledger.

A blockchain network may make reference to a peer-to-peer electronic ledger 106 implemented as a decentralized system and collectively managed by the nodes of the blockchain network. A ledger may comprise multiple blocks wherein a genesis block is a first block of the ledger and all other blocks reference a previous block. In at least some embodiment, each block (except the genesis block) includes a hash of the previous block to which that block became chained together to create an immutable record of the block to the blockchain ledger which cannot be modified, deleted, or otherwise altered. A block may include one or more blockchain transactions. A blockchain transaction may refer to a data structure that encodes the transfer of control of a digital asset between users of the blockchain network. For example, a blockchain transaction may transfer control of a digital asset from a source address to a destination address. The blockchain transaction may be signed with a private key associated with the address which can be cryptographically verified using a corresponding public key that is made available to other parties of the blockchain network. In at least one embodiment a blockchain transaction includes a transaction input and a transaction output.

A block of the ledger 106 may include a list of transactions such as transaction 108 illustrated in FIG. 1. In at least one embodiment, transaction 108 comprises a sender address, a recipient address, a token, and a digital signature generated using the sender's private key. The sender address may be a blockchain address associated with a user or account that controls a token. The recipient address may be a first blockchain address associated with a user, wherein that user has performed a blockchain account migration to a second blockchain address. The recipient address may refer to an address of a recipient that the sender transfers control of the token to. While a token is illustrated in FIG. 1, the sender may transfer control of any suitable token or digital asset that the sender controls, provided that there are no additional encumbrances or restrictions that prevent such a transfer. Transaction 108 may be digitally signed by the sender using a private key with a corresponding public key that is associated with the sender address and accessible to other users of the blockchain network. In at least one embodiment, transaction 108 is a UTXO of a Bitcoin-based blockchain.

In at least some embodiments, a user migrates from a first blockchain account 110 to a second blockchain account 112. The first blockchain account may have a first private key $sk_1$ that is associated with the account where the first private key $sk_1$ can be used to digitally sign transactions that can be used to transfer control of tokens and digital assets to other users. A corresponding first public key $pk_1$ can be used by other entities to verify the authenticity of blockchain transactions signed by the user and verify that control of an asset was indeed transferred. Likewise, other blockchain accounts such as the second blockchain account 112 may have a different private key $sk_2$ and public key $pk_2$ that are used to sign and validate transactions and other data on and off the blockchain network. Private keys $sk_1$ and $sk_2$ may be different, such that knowledge of $sk_1$ does not provide any insight into $sk_2$ other than that the keys have different values.

In at least some embodiments, when blockchain transaction 108 is processed, the node processing the transaction will detect that a sender "a1" is attempting to transfer a token to a recipient "b1" wherein the sender and recipient information described here may refer to blockchain addresses. As part of processing blockchain transaction 108, a node may use the recipient's blockchain address to determine whether "b1" is an active account or a deprecated account. An active account may be an account that is currently in use (e.g., no "MigrateTo" data) whose private key is valid and can be used to generate digital signatures that will be accepted by the blockchain. A deprecated account may be an account whose private key may no longer be used to generate signatures on the blockchain.

Upon determining that the recipient of blockchain transaction 108 is a deprecated account, the system making such determinations may use data associated with the deprecated account to determine an active account. For example, the first blockchain account 110 is deprecated and has a "MigrateTo" field that includes a reference to the second blockchain account 112 which is active. In at least some embodiments, a deprecated account stores (e.g., in "MigrateTo" field) an array of accounts that forms the ancestry for a chain of account migrations. For example, b1 migrates to b2, and at a later time, if b2 migrates to b3, then the "MigrateTo" field of b1 includes {b2, b3} as an ordered list and "MigrateTo" field of b2 would include just {b3}.

If a transaction attempts to transfer a token or digital asset to a deprecated account, the token or digital asset may instead be re-routed to the corresponding active account. In at least one embodiment, FIG. 1 illustrates a case in which transaction 108 attempts to transfer a token to recipient that had blockchain address "b1" but instead transfers the token to the recipient's new blockchain address "b2." However, such need not be the case, and in some cases, there may be restrictions on the transferability of tokens between different blockchain accounts. For example, consider a scenario in which the first blockchain account 110 is associated with a user "Jane Doe" and whose name is stored as fields of the first blockchain account 110—e.g., First and Last Name fields, not illustrated in FIG. 1. As a result of a marriage, the user's name may change from "Jane Doe" to "Jane Smith" which causes a blockchain account migration to the second blockchain account 112 which includes the user's updated name. Continuing with the example, blockchain transaction 108 may include, as the token, a digital version of the user's diploma which has her name listed as "Jane Doe" and includes an encumbrance or restriction on the transaction that requires the recipient's name to match the name on the diploma. In this case, as well as others, the token may not be suitably re-routed to the second blockchain account 112 and may, therefore, be stored in the first blockchain account 110 even though it has been deprecated.

In at least one embodiment, FIG. 1 illustrates a solution to a problem that is rooted in computer technology in order to overcome a problem specifically arising in the realm of computer networks. In at least one embodiment, a problem arises in blockchain networks where a user's association to a first blockchain address is memorialized in an append-only blockchain ledger. In at least some embodiments, a user has need to re-associate to a second blockchain address, such as where a secret key associated with the first blockchain address has been exposed—in such a case, a problem specifically arising in blockchain network is that it may be difficult or impossible for the user to notify all other users of the blockchain network that the first blockchain address should no longer be used, and that there are challenges in ensuring that a blockchain transaction that attempts to transfer digital assets or tokens to the user via the first blockchain address are properly received by the user.

Figure 2:
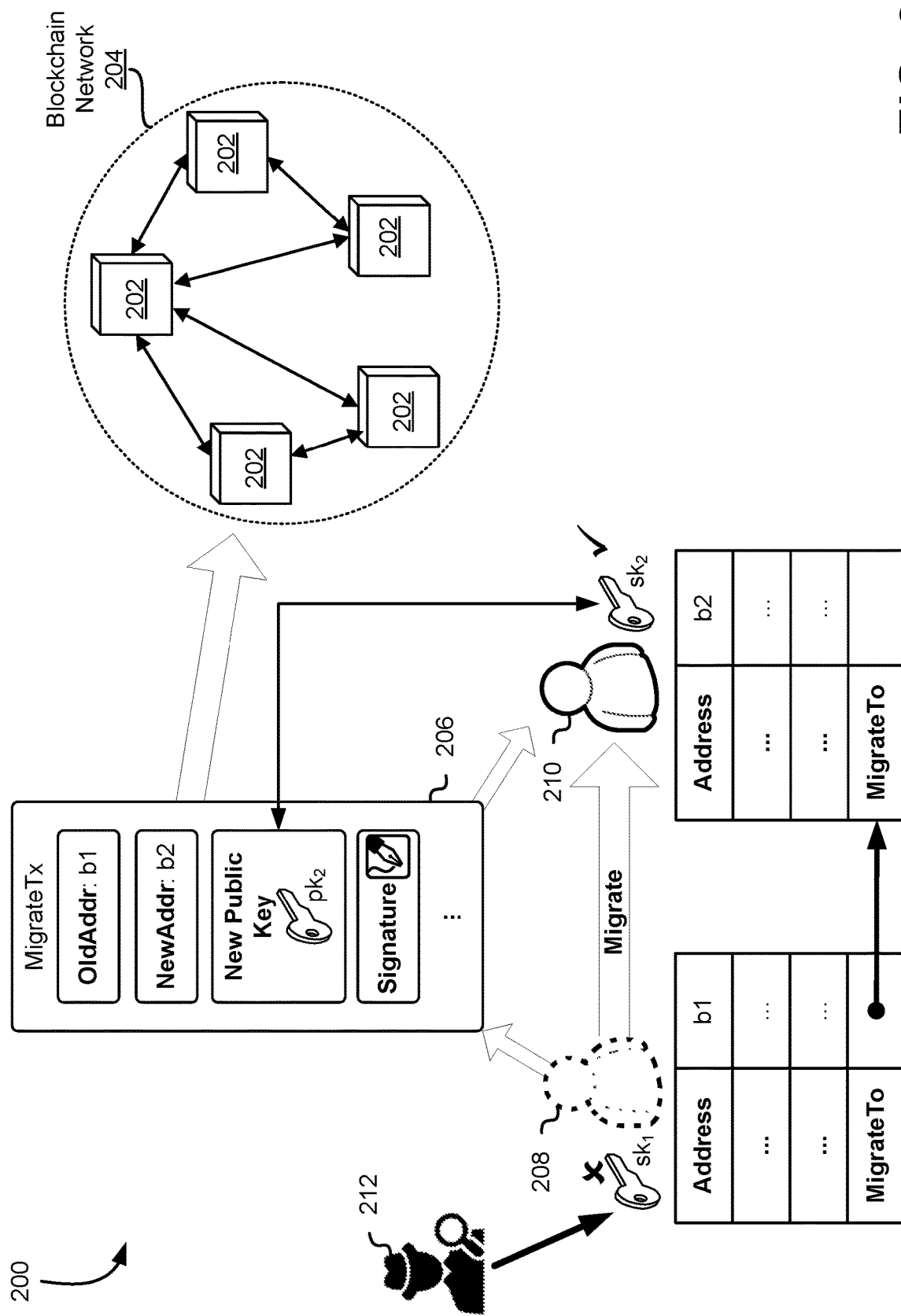
FIG. 2 illustrates a computing environment which may be used to implement a system that supports blockchain account migration.

FIG. 2 illustrates a computing environment 200 in which an embodiment may be practiced. The computing environment 200 may be used to implement a system that supports blockchain account migration. FIG. 2 illustrates nodes 202 of a blockchain network 204, an account migrate blockchain transaction 206, a first blockchain account 208 of a user, a second blockchain account 210 of the user, and an entity 212 that may have access to cryptographic material associated with the old account.

In at least some embodiments, FIG. 2 illustrates a blockchain network 204 comprising nodes 202 in accordance with those described elsewhere in this disclosure, such as in connection with FIG. 1. In at least some embodiments, the blockchain network uses a proof of work consensus protocol. In at least some embodiments, the blockchain uses a proof of stake consensus protocol. In at least one embodiment, the blockchain network 204 supports a blockchain account migration transaction.

A user may create a blockchain account wherein each account has an address, a private key, and a corresponding public key. For example, FIG. 2 illustrates a first blockchain account 208 with a private key $sk_1$ and a corresponding public key $pk_1$ that can be used to verify digital signatures generated using private key $sk_1$.

Users of a blockchain network should keep their private keys secret. There are challenges involves in different techniques to store a private key as a secret (e.g., secret key). For example, storing a secret key in an electronic format may be vulnerable to computer hacking, malware, and other types of attacks. As an alternative, a blockchain paper wallet (e.g., bitcoin paper wallet) has is an alternative storage technique that has been proposed. A blockchain paper wallet may refer to a type of offline wallet that is not communicatively connected to other computer systems over a network such as the Internet. For example, a paper wallet is not hackable over the Internet. A paper wallet is not necessarily made of paper, but could also be made of other materials such as plastics or other substances which may be more durable than paper. A private key and public key may be printed or otherwise encoded on the paper wallet, for example, as QR codes or a Base58 encoding of the key information.

Although paper wallets are virtually impossible to access using computer viruses and malware, other entities such as entity 212 illustrated in FIG. 2 may gain physical access to secret key $sk_1$ and copy down the secret key or otherwise see the secret key $sk_1$ written down on the paper wallet. If a user suspects entity 212 has seen or otherwise gained access to the private key $sk_1$, the user can initiate a blockchain account migration to deprecate the first blockchain account 208.

A blockchain account migration may be initiated for a variety of reasons—a user may have reason to believe that the private key associated with a blockchain account has been compromised. A blockchain account migration can be used to replace an asymmetric key pair that was generated under a first cryptographic algorithm with a second cryptographic algorithm, which may be prompted by the discovery of a weakness or vulnerability of the first cryptographic algorithm. In some cases, blockchain account migrations are used to perform a key rotation so that cryptographic keys are not used more than a threshold number of times or are not used beyond a fixed duration. A key rotation may refer to a programmatic routine or process in which data encrypted under a first cryptographic key is decrypted and then re-encrypted under a second cryptographic key. A key rotation may be performed based on various indicia or triggers, such as in response to a determination that the first cryptographic key may be compromised (e.g., another entity has access to the first cryptographic key). In some cases, a key rotation is performed after a cryptographic key is used a certain number of times or after a certain duration, as a safeguard that repeated or prolonged use of a cryptographic key may render it susceptible to attackers who may be able to glean information regarding the confidential data from a collection of ciphertexts generated by a particular cryptographic key. A user may generate a new private key $sk_2$ and corresponding public key $pk_2$. In some embodiments, the new address "b2" is generated based at least in part on the new private key $sk_2$.

A blockchain account migrate transaction 206 may be initiated by the owner of an account. In at least some embodiments, the user creates blockchain account migrate transaction 206 and fills in one or more of the following fields: an old address; a new address; a new public key; and a digital signature. Other combinations of data fields and properties are contemplated in the scope of this disclosure. In some embodiments, the old address refers to the account for which migration is being performed on. In at least some embodiments, the blockchain account migrate transaction 206 is digitally signed using a private key that matches the old address. For blockchain account migrate transaction 206 to be accepted by the blockchain, the digital signature generated over blockchain account migrate transaction 206 may be verified by using the public key associated with the old address. The new public key included in blockchain account migrate transaction 206 may be the public key of the second blockchain account 210. In some embodiments, the new public key must match the new address field in order to be valid. In at least some embodiments, blockchain account migrate transaction 206 includes a digital signature using $sk_2$ that attests that the user has possession of the secret key for the second blockchain account 210.

In some embodiments, blockchain account migrate transaction 206 has a required lock time that prevents blockchain account migrate transaction 206 from being executed immediately. In some embodiments, blockchain account migrate transaction 206 is broadcasted to the blockchain ledger but is not executed for at least a predetermined lock time which provides enough time for a dispute or revocation of the migration to occur. In at least some embodiments, a required lock time prevents an adversary that gains access to cryptographic material of the first blockchain account from immediately initiating a migration that transfers the user's assets to an account that the adversary has access to.

In some embodiments, when blockchain account migrate transaction 206 is processed, some or all digital assets and/or tokens of the first blockchain account 208 are transferred to the second blockchain account 210. In some cases, a balance is transferred from the first blockchain account to the second blockchain account (e.g., BTC balance). In some cases, there are non-movable or unmovable digital assets attached to the first blockchain address which cannot be moved. For example, a blockchain diploma may be bound to a specific blockchain account and may be non-movable. When blockchain account migrate transaction 206 is processed, a record is added that the first blockchain account is migrated to address "b2" of the second blockchain account 210. The field may be implemented as an array of account addresses that forms a link or lineage of migrations.

After blockchain account migrate transaction 206 is processed, the first blockchain account 208 may be considered a deprecated account. Deprecated accounts may have certain properties on the blockchain—the private keys of deprecated accounts may no longer be used on the blockchain and any transactions signed with those keys are rejected. Accordingly, when a blockchain account is deprecated, its private key is deprecated. In some cases, transfers of digital assets to a deprecated account are rejected or transferred to the active account in the deprecated account's "MigrateTo" field.

Figure 3:
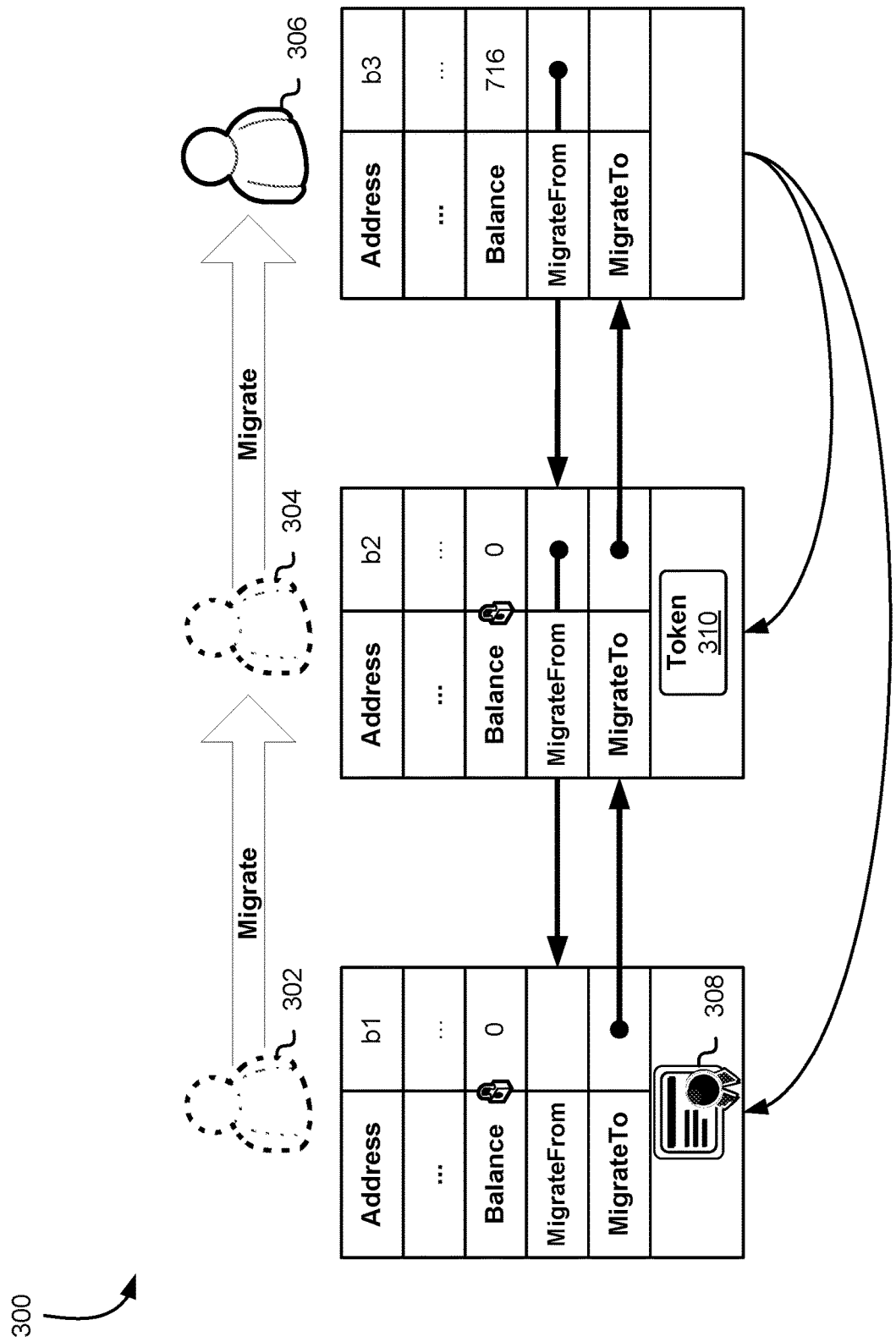
FIG. 3 illustrates a computing environment in which a system supports multiple blockchain account migrations, in accordance with at least one embodiment.

FIG. 3 illustrates a computing environment 300 in which an embodiment may be practiced. The computing environment 300 may be used to implement a system that supports blockchain account migration. FIG. 3 illustrates a blockchain account chain migration with a first blockchain account 302, second blockchain account 304, and third blockchain account 306, in accordance with at least one embodiment. The blockchain accounts illustrated in FIG. 3 may be associated with the same user, who has migrated from one blockchain account to another over time.

In at least one embodiment, a user creates a first blockchain account 302 with address "b1" at a first time to and uses the blockchain account to perform various blockchain-related functionality, such as generating digital signatures with a first private key $sk_1$ that is associated with the blockchain account. As part of operating on the blockchain, control of a digital asset 308 may be transferred to the user at the first blockchain account 302. In some embodiments, the digital asset 308 is a blockchain diploma that is digitally signed by an authority (e.g., a university) that attests that the blockchain diploma was earned by the user associated with the first blockchain account. In some embodiments, the blockchain diploma includes information that indicates that the diploma was earned by the user at address "b1" and is digitally signed by the institution or organization issuing the diploma, and authenticity of the blockchain diploma can be verified using a public key of the issuer of the blockchain diploma. Accordingly, in at least some embodiments, it is possible to cryptographically verify, on the blockchain, that the user at address "b1" has attended a university. Likewise, an issuer may be a licensing department such as a government organization that issues driver's licenses, passports, and other such documents.

A digital asset or token 310 may be non-moveable. A non-movable digital asset (e.g., token) may include restrictions on the ability for the digital asset to be transferred from one blockchain account to another. For example, a digital asset may be encumbered by a locking script that checks that the recipient of the digital asset is a specific blockchain address—accordingly, any attempted transfer of the digital asset to another blockchain address would fail. Digital assets may be designed to be non-moveable—for example, a blockchain diploma may be non-moveable to ensure that an individual that earned a diploma is not able to transfer blockchain diploma to another user that allows that user to purport to have earned the diploma. Likewise, a blockchain license may be tied to an individual or organization, and may need to be re-issued by the issuer (e.g., by invalidating a first license to a first blockchain address and issuing a second license to a second blockchain address) if a transfer is desired. An example of a moveable token may be a ticket that is not tied to any specific user (e.g. a blockchain ticket attesting to a purchase of a movie ticket). That said, some tickets may also be non-movable (e.g., a blockchain ticket attesting to a purchase of an airline ticket, which includes the name of the passenger).

At a time $t_1 > t_0$, the user may determine that the first blockchain account 302 was compromised in some manner—for example, the user may know or have reason to know that another entity may have possession of the secret key of the first blockchain account 302. The user may create a second blockchain account 304 with a new secret key $sk_2$ and initiate a blockchain account migration transaction, such as those described in connection with FIG. 2. As a result of the migration, the first blockchain account 302 may be deprecated and some digital assets (e.g., balance of BTC or ETH) may be transferred from the first blockchain account 302 to the second blockchain account 304. The first blockchain account 302 may be marked as deprecated and subsequent attempts to transfer digital assets to the first blockchain account 302 may be re-rerouted to an active blockchain account in the "MigrateTo" field of the first blockchain account 302. In some embodiments, the "MigrateTo" field as described in various embodiments is encoded as a blockchain transaction that is appended to an append-only blockchain ledger that indicates that user of a blockchain address has migrated to another blockchain address. In some embodiments, a "MigrateFrom" field is associated with the second blockchain account that can be used to find the accounts that have migrated to that account.

In some embodiment, control of a token 310 is transferred to the second blockchain account 304. At a time $t_2 > t_1$, the user may determine to perform a second blockchain account migration, which may be in response to various scenarios as described throughout this disclosure. In some embodiments, the user initiates a blockchain account migration transaction to move from the second blockchain account 304 with address "b2" to a third blockchain account 306 with address "b3." A balance of the second blockchain account may be transferred to the third blockchain account and then locked at zero as a result of execution of the blockchain account migration transaction.

In some embodiments, a "MigrateFrom" field is associated with the third blockchain account that can be used to find the accounts that have migrated to that account. For example, the "MigrateFrom" field illustrated in FIG. 3 may be an array, list, or other suitable data structure of all accounts that have migrated to the third blockchain account, either directly or indirectly. The "MigrateFrom" field illustrated in FIG. 3 may, for example, be {b2, b1} ordered in reverse chronological order, indicating that b2 migrated to b3, and that b1 migrated to b2 before that. In at least some embodiments, digital assets and tokens attached to deprecated accounts can be used for authentication or verification of other accounts in the migration chain. For example, if a user with an active account (e.g., third blockchain account 306 illustrated in FIG. 3) wants to buy a movie ticket that is age-restricted, the user can present a driver's license (e.g., digital asset 308, which may be non-movable) from a deprecated account and a valid migration chain from the deprecated account to the active account to demonstrate the user's age. It should be noted that this verification may be done in the context of a zero-knowledge proof in which the issuer of the movie ticket may be unaware of whether the verifiable proof (whether the buyer meets the age restriction) was satisfied indirectly based on information from a deprecated account tied to the active account that is attempting to purchase the ticket.

Figure 4:
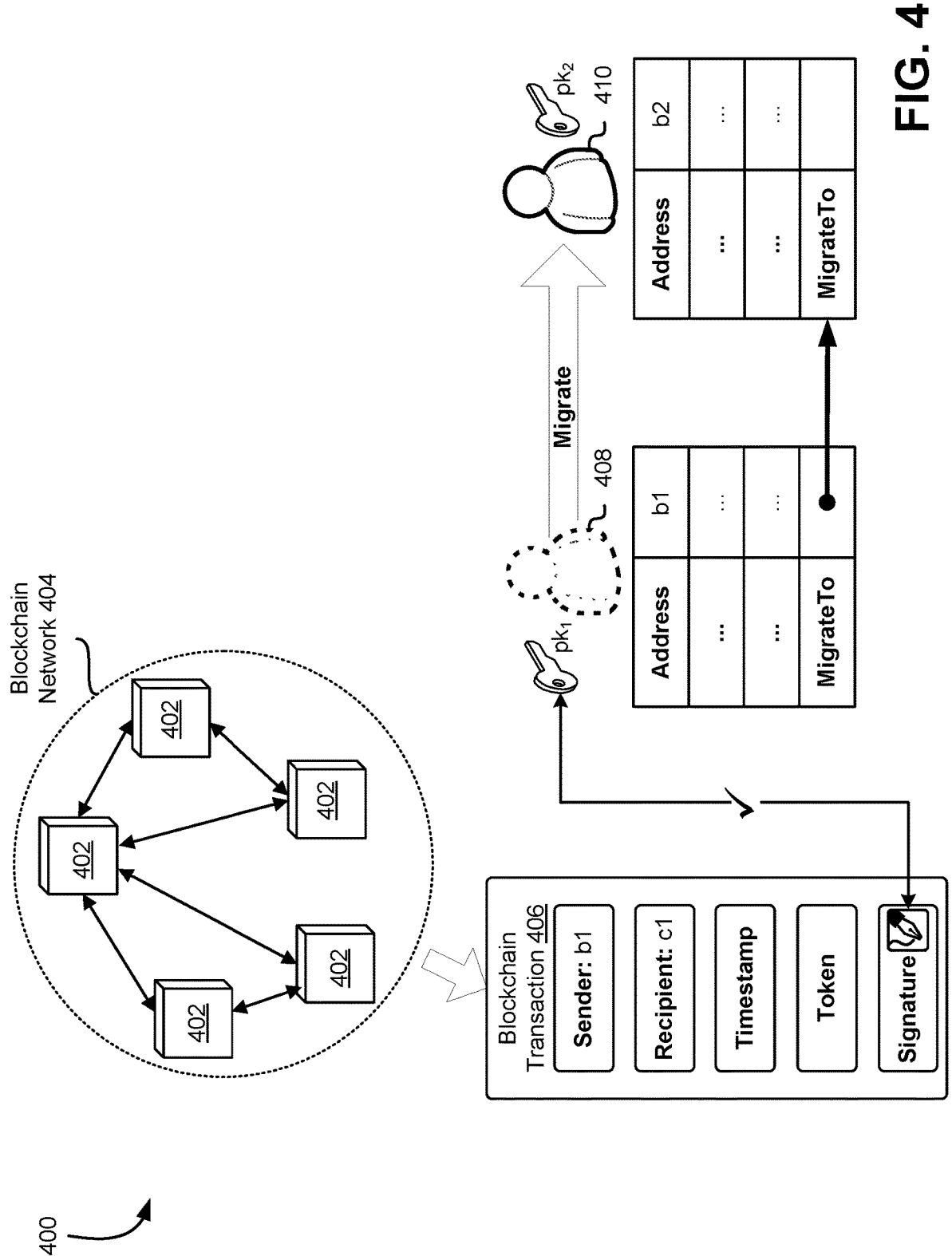
FIG. 4 illustrates a computing environment in which a blockchain transaction is processed and validated after a blockchain account migration from a first blockchain account to a second blockchain account invalidates a private key for future use, in accordance with at least one embodiment.

FIG. 4 illustrates a computing environment 400 in which an embodiment may be practiced. The computing environment 400 may be used to implement a system that supports blockchain account migration. FIG. 4 illustrates nodes 402 of a blockchain network 404; a blockchain transaction 406; a first blockchain account 408; and a second blockchain account 410. FIG. 4 illustrates, in at least one embodiment, a blockchain transaction 406 that is processed using a deprecated account. Blockchain transaction 406 may be processed and validated after a blockchain account migration from the first blockchain account 408 to the second blockchain account 410 invalidates private key $sk_1$ for future use.

The blockchain network 404 may be in accordance with those described elsewhere in this disclosure. A blockchain ledger may store a record of blockchain transactions that have been executed over time. Blockchain transaction 406 may have been executed prior to the blockchain account migration illustrated in FIG. 4 based on the timestamp included in the blockchain transaction. The timestamp may be used to verify whether the digital signature generated using private key $sk_1$ of the first blockchain account 408 is valid. If the timestamp of the blockchain transaction (e.g., time or block when blockchain transaction 406 was confirmed) is from before the blockchain account migration, the blockchain transaction 406 is still considered valid and the public key $pk_1$ of the first blockchain account 408 is still considered valid for verifying such transactions, even after the account has been deprecated.

In some examples, blockchain transaction 406 is broadcasted to the blockchain network with a lock time such that the first blockchain account is migrated between when the blockchain transaction was broadcasted but before the lock time is reached. Continuing with this example, the digital signature generated using $sk_1$ of the first blockchain account may still be considered valid, and the blockchain transaction may still be processed—for example, if the transaction was to transfer digital assets from the first blockchain account 408 to a recipient, the digital assets may be transferred from the second blockchain account 410 instead (e.g., when the balance of the first blockchain account 408 is transferred to the second blockchain account 410 as a result of the blockchain account migration transaction).

Figure 5:
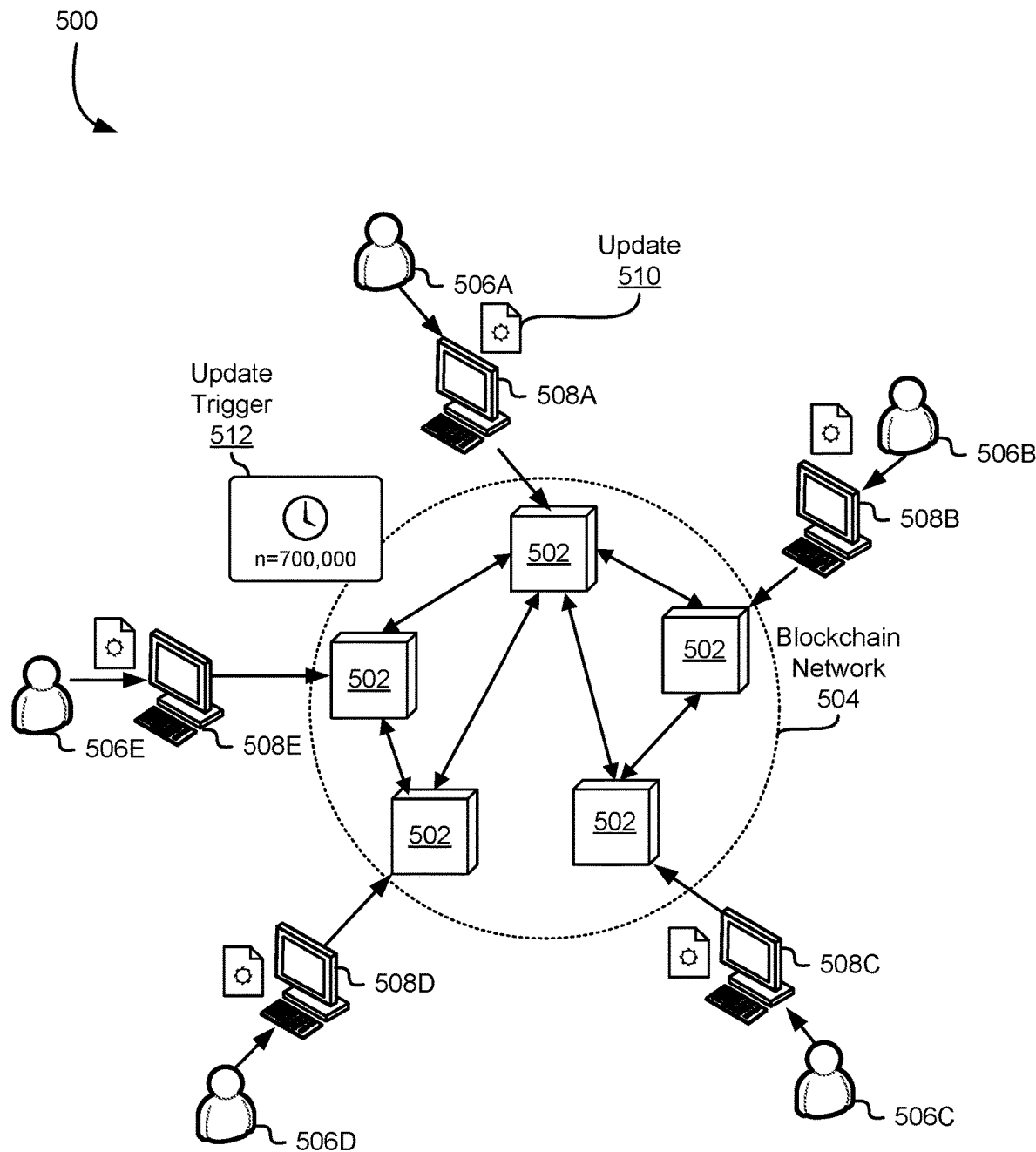
FIG. 5 illustrates a computing environment applicable to blockchain update techniques.

FIG. 5 illustrates a computing environment 500 applicable to various embodiments described throughout this disclosure. In at least one embodiment, FIG. 5 illustrates a blockchain network 504 with a set of interconnected nodes 502 that may be independently operated. In some embodiments, nodes are full nodes of a blockchain network that store the entire contents of a blockchain ledger.

In some embodiments, a blockchain node is controlled by an operator that has access to a console or other electronic system that includes a human interface device such as a keyboard or touchscreen that the operator can use to control the node. FIG. 5 illustrates, in accordance with at least one embodiment, human operators 506A-E that use a computer system 508A-E to control nodes 502 of a blockchain network 504.

In at least one embodiment, the operation of computing environment 500 described in connection with FIG. 5 can be improved by applying blockchain update techniques described throughout this disclosure, such as those discussed in connection with FIGS. 6-8. FIG. 5 illustrates difficulties involved in performing updates in a decentralized, consensus-based network. In some embodiments, updating (e.g., upgrading) a blockchain network is non-trivial and the updating process can be contrasted to updates to a personal computer—an operating system can push an update file from a centralized server to eligible devices and the device authenticates the update file is a genuine and authorized update and applies the update. In contrast, updating a blockchain presents unique challenges rooted in computer technology—nodes of a blockchain network may first vote on whether to apply an update, which among multiple candidate updates to update to, when to apply the update, combinations thereof, and more.

A blockchain network may operate according to a consensus protocol. A consensus may be reached by a threshold number or proportion of nodes. For example, in some cases, a two-thirds majority of nodes is needed to migrate or upgrade to a new version, whereas in other cases a simple majority (more than 50%) may be adopted as the threshold. Other suitable percentages, including pluralities, majorities, etc. are contemplated within the scope of this disclosure.

Upon reaching a consensus on the parameters for updating the blockchain—such as which binaries or executables to upgrade with and at what block height to perform the upgrade—nodes of a blockchain network may need to actually coordinate performing an update 510. An update may be applied by installing binaries, executables, and the like, which may involve taking the node offline briefly to apply the update. In some embodiment, nodes agree on what time the upgrade is to be performed and each operation of the node (e.g., human operators) replace a first version software with a second version software (e.g., upgrading from version 1.0 to version 2.0). If an operator brings his or her node down too early (e.g., before the block height is reached) to update the node, then the node is incompatible with the blockchain network since a consensus of nodes will still be running on the old version, in at least one embodiment. If an operator brings his or her node down too late (e.g., after the block height is reached) to update the node, then the node may have been unable to participate operate on the blockchain network (e.g., submitting transactions, mining new blocks, etc.) while the node was in an out-of-date state.

In some embodiments, a block height is used to indicate when to apply an update. For example, FIG. 5 illustrates an update trigger 512 that nodes cue off of to determine that they should apply an update—an upgrade may be applied at a specific block height, e.g., at the 700,000th block, as illustrated in FIG. 5 and in at least one embodiment.

Blockchain nodes may be updated periodically. Having to disconnect a blockchain node to apply a software update and restart the node may be undesirable, at least because the blockchain node is not able to be fully utilized when updates are being applied. In some cases, such as when a restart is needed, a blockchain node may be completely unavailable while it is being updated. However, if a node is not updated, it may be operating in an unsafe or undesirable state (e.g., without the most recent security information). Accordingly, there are challenges surrounding increasing the availability of blockchain nodes.

Figure 6:
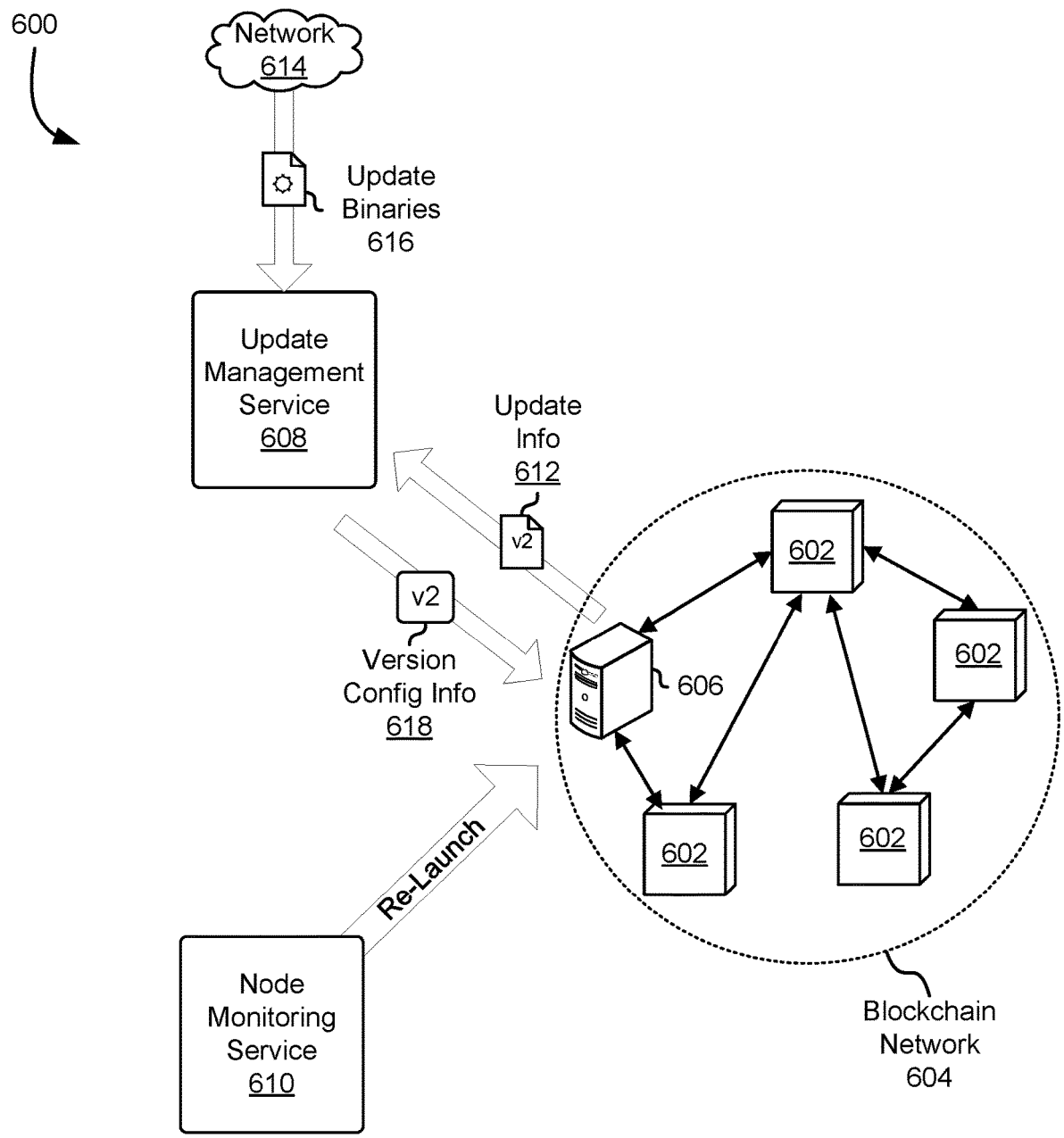
FIG. 6 illustrates a computing environment to implement blockchain node update, in accordance with at least one embodiment.

FIG. 6 illustrates a computing environment 600 to implement blockchain node update, in accordance with at least one embodiment. Techniques described in connection with FIG. 6 may be applicable to the computing environment described in connection with FIG. 5. In at least one embodiment, FIG. 6 illustrates a blockchain network 604 with a set of blockchain nodes 602. Blockchain node 606 may be configured to interoperate with an update management service 608 and a node monitoring service 610.

In at least one embodiment, a voting process is used by a blockchain network to collectively determine to update (e.g., upgrade) the blockchain network. A blockchain network may reach a consensus in any suitable manner, which may differ depending on whether the blockchain uses a proof of work or proof of stake consensus protocol. In at least one embodiment, a blockchain network is a proof of stake network where a list of validators forms a consensus when at least two thirds of validators or writers to the ledger agree on an operation.

Regardless, nodes of a blockchain network may vote to perform a software update to code running on the nodes at a specified time. In some embodiments, the time is specified as a block height, which may be a proxy for time in systems where blocks are, on average, mined at predetermined intervals. When a consensus (e.g., ⅔ majority) is reached to perform a node upgrade to a specific version at a specific block height, all nodes agree to perform the upgrade, even nodes that voted against doing so.

In some embodiments, an update node transaction is broadcasted to the blockchain network as a result of the voting process that indicates a specific update to perform at a specific time. For example, an update may involve changing parameters of the blockchain, such as the size of blocks. An update node transaction may include update information 612, such as a specific version number to update to, where to find binaries for an update, how to validate an update, and more. An update node transaction may include a timestamp at which nodes are to apply an update. A node 606 may transmit the update information 612 to an update management service 608.

Update management service 608, in some embodiments, is an application or lightweight executable that runs on a computer system. In some cases, the same computer system runs the node 606, update management service 608, and node monitoring service 610. The update management service may be implemented as a command line interface that receives (e.g., as parameters) versioning information. The versioning information may be version information 612 illustrated in FIG. 6, which may include a version number. In some embodiments, the update management service 608 maps an update version or other update information to a network location (e.g., a URL, URI) where the update management service 608 can download, over a network 614, update binaries 616.

Network 614 can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a node 606 for receiving requests and serving content in response thereto, although for other networks an alternative device serving a similar purpose could be used as would be apparent to one of ordinary skill in the art.

Update management service 608 may download update binaries 616 and store it in a data storage device. The update binaries 616 may be durably stored in the node 606 and updated at a later point in time when an upgrade is triggered (e.g., based on update block height encoded in an update node transaction). The update management service 608 may download an update binary and verify authenticity of the update binary. In some embodiments, an update node transaction includes an expected hash or checksum of a valid update file and update management service checks that the hash or checksum of a downloaded update file matches the expected hash or checksum. Update management service 608 may verify the authenticity and integrity of a downloaded update file. While an update binary is illustrated in FIG. 6, any suitable mechanism for updating a node may be used in its place.

Node monitoring service 610 may be an application, service, or any other suitable form of executable code that runs on a computer system. In some cases, node monitoring service 610 is an operating system service that monitors the health of a blockchain node such as node 606 illustrated in FIG. 6. In some embodiments, node monitoring service 610 is responsible for checking that node 606 is in a healthy state. If node monitoring service 610 detects that node 606 is not running, node monitoring service 610 may restart the node by launching one or more executables for the node. In some embodiments, node 606 is a child process of monitoring service 610. In some embodiments, node 606 runs based on version configuration information that informs the node how to operate. For example, version 1 of a node may operate differently from version 1.1 and so on. In some embodiments, node monitoring service 610 is a starter daemon or maintenance daemon.

In some embodiments, when an update block height is reached, an update is triggered. In at least some embodiments, node 606 detects an update trigger has been satisfied and launches update management service 608. In some embodiments, update management service 608, in response to being launched to perform an update, updates version configuration information 618 for node 606. In some embodiments, updates version configuration information 618 is or includes metadata for the version of the blockchain node to use when it runs. In some embodiment, updates do not take place right away while node 606 is running, and the update management service 608 will update the version configuration information 618, and upon successfully doing so, shutdown the node 606. Node 606 may be shut down in any suitable manner, such as by terminating one or more processes and/or threads. Continuing, if node 606 is shutdown, node monitoring service 610 may detect that node 606 is not running and attempt to restart it. When node 606 is restarted, it may detect the updated version configuration information and then fetch and apply the update binaries 616 as part of restarting.

When an updated is applied to node 606, different local and global states are possible. For example, if the update is applied successfully, the update may be locally successful. If the update is not applied successfully, the update may be locally unsuccessful, either partially or fully. For example, a partially unsuccessful update may involve some functionality being updated but others failing (e.g., one or more protocols may fail to update while a core component succeeds). In some cases, a partially unsuccessful update is not possible—an update may be all-or-nothing in the sense that a failure of any portion of an update results in the failure of the entire update.

If the update is not applied successfully to node 606, then the update may be locally unsuccessful. If an update is not locally successful, node 606 may fail to launch, in which case node monitoring service 610 may detect that node 606 is not running and attempt to restart it again. If repeated failures are detected, node monitoring service 610 may send a message to update management service 608 that the update was not able to be applied successfully and update management service 608 may revert the version configuration information to the previous state. In some embodiments, a user is notified of the failure and logs and/or diagnostics information is provided to facilitate recovery.

In some embodiments, successfully applying an update locally to node 606 does not necessarily guarantee a blockchain network is updated. For example, if an update trigger is detected by nodes of a blockchain at block height N but several nodes fail to apply the update, then the blockchain may not move forward and will be stopped at N. However, if some individual nodes fail to start and enough nodes to form a consensus are able to restart on the updated version, then the blockchain will continue moving forward and processing blocks, and the individual nodes that field can attempt to apply the update again later.

In some cases, node 606 may successfully apply an update locally and wait for other nodes to signal acceptance of the update. In some cases, is less than a threshold number of nodes (e.g., ⅔ supermajority) accept the update, then node 606 may be stopped in its state at N and wait for more nodes to vote for the next block. If node 606 cannot get enough votes for the next height, it may be stuck at height N. In such cases, node 606 may technically be considered healthy but could not agree on a consensus. An operator of node 606 may be able to manually roll back the update to get the node un-stuck if the blockchain network continues to operate on the previous version and abandons the updated version.

Figure 7:
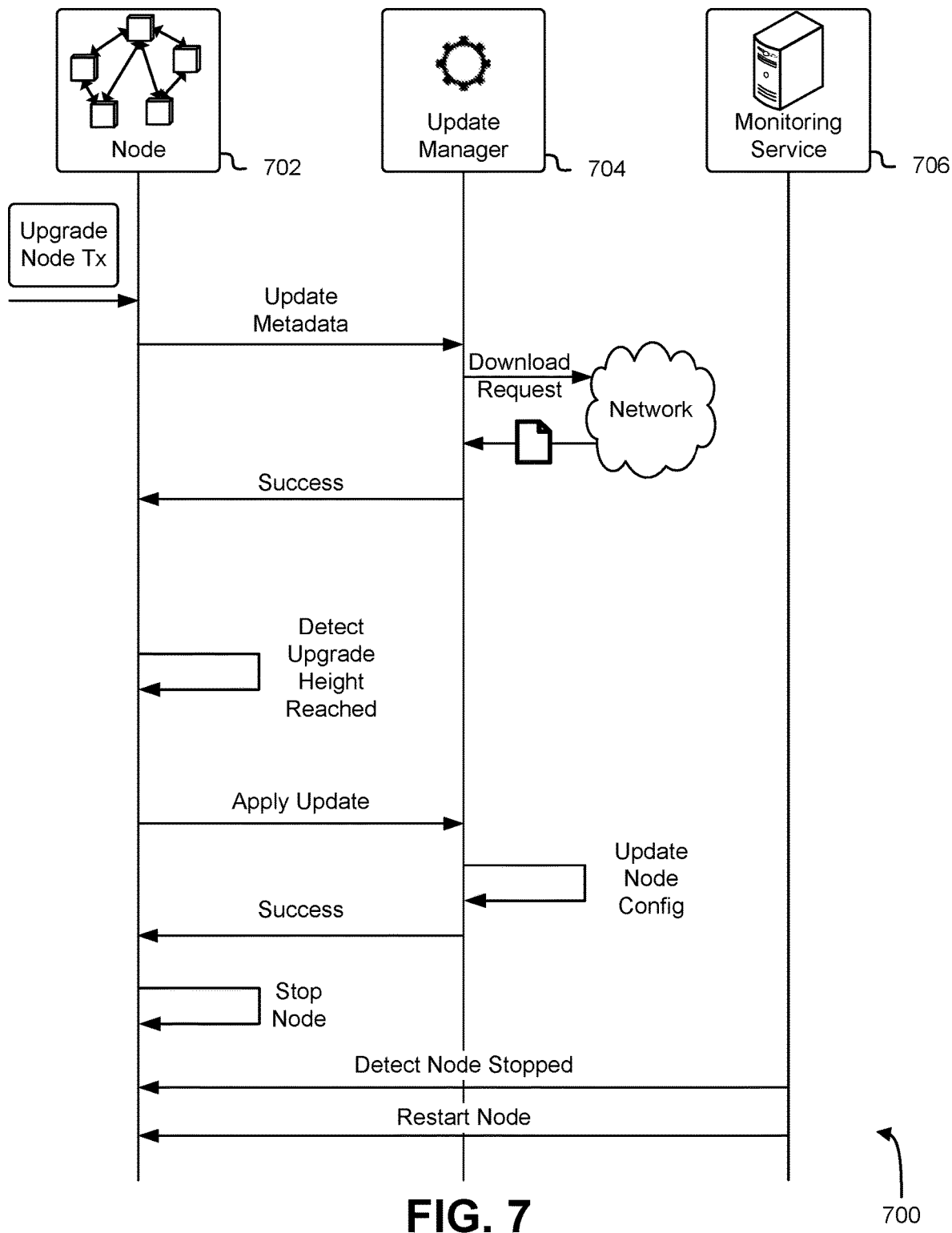
FIG. 7 illustrates a computing environment to implement blockchain node update, in accordance with at least one embodiment.

FIG. 7 illustrates a computing environment 700 to implement blockchain node update, in accordance with at least one embodiment. Techniques described in connection with FIG. 7 may be applicable to the computing environment described in connection with FIG. 5. In at least one embodiment, FIG. 7 illustrates a blockchain node 702, update manager 704 and monitoring service 706. In at least some embodiments, FIG. 7 illustrates a workflow for applying blockchain updates.

Blockchain node 702, update manager 704, and monitoring service 706 may be implemented as software running that is running on a computer system. In some embodiments, node 702 is connected to a blockchain network whose protocols and operations are agreed upon collectively by nodes of the blockchain network. Systems and processes described in connection with FIG. 7 may be coextensive with embodiments described elsewhere in this disclosure, such as those discussed in connection with FIG. 6.

FIG. 7 illustrates a workflow for blockchain node upgrade, in accordance with at least one embodiment. An update (e.g., upgrade) node transaction may be broadcasted to node 702 and node 702 may store update information in a global state and invoke update manager 704 using a command line interface (CLI). Update metadata may be passed to the update manager 704 as a parameter that encodes the version to update to. Update manager 704 may be response for downloading the update software, verifying the software, and switching versions when an update is to be applied. An update file or binary may be retrieved from a network location, and the update manager 704 may verify authenticity and integrity of the software based on information supplied by the update node transaction.

Node 702 may continue to operate under a specific version of software until an upgrade block height or time is reached. Global state may be used to determine when the update trigger has been satisfied. The node 702 may send a message to the update manager 704 to switch versions. The update manager 704 may modify version configuration information for node 702 and send a message to node 702 indicating that the switch has been made.

Node 702 may receive a message from update manager 704 that version configuration information has been updated and node 702 may stop itself. Once node 702 has been stopped, monitoring service 706 may detect that node 702 is not running and restart node 702. Upon being restarted, node 702 may be configured to execute with the previously updates. A node may be a blockchain node which is configured to operate on blocks, consensus, transactions, etc. and does not handle software downloading or other update related actions that are not directly related to consensus.

In some embodiments, only one pending update is allowed at a time. For example, if a first update node transaction at block height at block height n=100 is broadcasted indicating to upgrade to version 2.0 at height 1000 and a second update node transaction at block height n=200 is broadcasted indicating to update to version 2.1 at height 1100, then the second update node transaction may replace the first, effectively superseding the previous update node transaction.

In at least one embodiment, monitoring service 706 is used to restart a node when it crashes or stops for any reason. Monitoring service 706 may be a lightweight executable application that runs as a background process that monitors a node. In at least some embodiments, monitoring service 706 is a parent of the node process, so the operating system notifies the monitoring service 706 when the node is not running. Monitoring service 706 may use version configuration information to determine how to load the node. In some embodiments, if an update fails to install C times, then the monitoring service 706 may rollback the update and revert to the previous version. If the reversion fails, the monitoring service may notify an operator to take further action.

Figure 8:
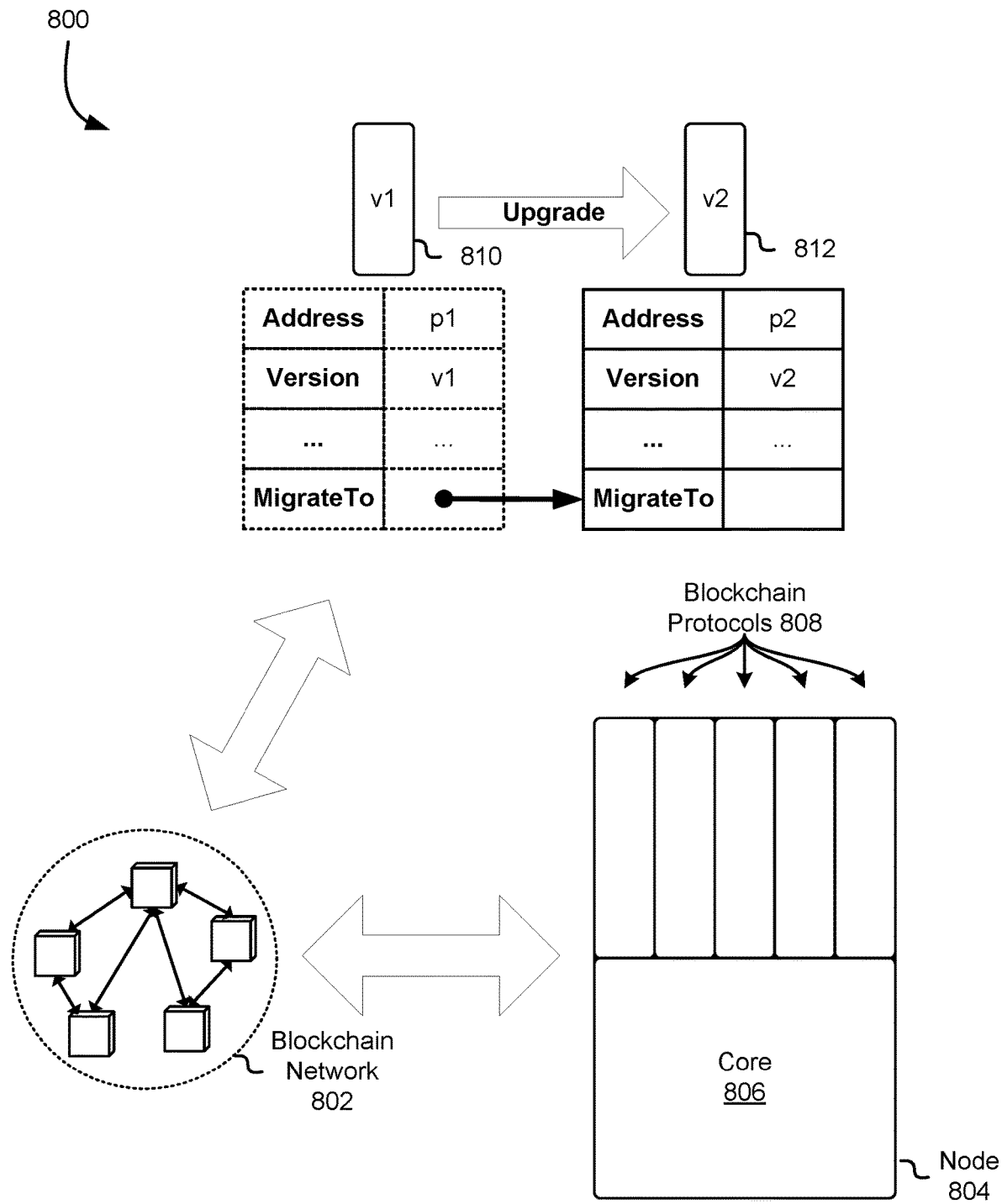
FIG. 8 illustrates a workflow for applying blockchain updates, in accordance with at least one embodiment.

FIG. 8 illustrates a computing environment 800 to implement blockchain node update, in accordance with at least one embodiment. Techniques described in connection with FIG. 8 may be applicable to the computing environment described in connection with FIG. 5. In at least one embodiment, FIG. 8 illustrates a blockchain network 802, a node 804, a core 806, and blockchain protocols 808. In at least some embodiments, FIG. 8 illustrates a workflow for applying blockchain updates. For example, FIG. 8 may be coextensive with computing environments described in connection with FIGS. 5-7.

Blockchain network 802 may be any suitable blockchain network, such as those described throughout this disclosure. Node 804 may be a node of blockchain network 802. Node 804 may be an application executed on a computer system comprising at least a core 806 and one or more blockchain protocols 808. The core 806 may refer to a component that provides basic functionality to the node. In at least one embodiment, an entire node can be updated or updates to protocols can be individual installed. Blockchain protocols may be implemented using binaries such as dynamically linked libraries which can be loaded and unloaded during execution of a program. Update of an entire node can be implemented according to techniques discussed in connection with FIGS. 6-7.

A lightweight update for blockchain transaction protocols may be implemented using techniques described in this disclosure. In one embodiment, nodes of a blockchain protocol vote, reach a consensus on a protocol update, and broadcasts a deploy protocol transaction. A deploy protocol transaction, in an embodiment, takes binaries of a protocol and version information for others to review. Examples of data and other information that can be reviewed includes source code of the protocol, pipeline, and data structure definition, which can be published on a website for others to review. The data may be hashed and the hash provided to ensure that the version of the data that is published for review is the same that is being proposed for the protocol update. However, the actual piece of code that is deployed is a software binary built from the code. In some embodiments, when a deploy protocol transaction is issued, there is a vote and agreement to perform a migration from a first protocol version to a second protocol version. The migration may be memorialized based on techniques described in connection with blockchain account migration (e.g., as discussed in connection with FIGS. 1-4). For example, a first version 810 of a protocol may be associated with a first blockchain address and is migrated to a second version 812 of a protocol based on techniques described in connection with FIG. 1. For example, a "MigrateTo" field may be added to the first version 810 to indicate that it is has been deprecated in favor of the second version 812.

In some embodiments, a deploy protocol transaction takes an updated binary of a protocol and executes it on each node and when a node executes the deploy protocol transaction, it verifies the version is newer than the current version and verifies a MD5 hash of the binary matches that of the expected update and executes it on each node across the entire blockchain network. A node may run on a virtual machine such as an Erlang virtual machine that can be used to perform hot swap reloading without needing to shut down a node. In some embodiments, a list of the most recent protocols is stored and when a node is restarted, binaries of the most recently used protocols are loaded first. In some embodiments, a deploy protocol transaction is performed immediately upon being confirmed to a blockchain, whereas in other embodiments it may be performed at an update node height specified in the deploy protocol transaction. In some embodiments, deploy protocol transaction is a protocol and can self-update. A version of the deploy protocol transaction may be housed in the core 806 of the node to allow for bootstrapping.

For a blockchain account, a user may have access to a secret key that is a private key of an asymmetric key pair where the corresponding public key is made available to other users on the blockchain network to perform various functions such as verifying the authenticity and integrity digital signatures generated by the user. The blockchain account may be associated with an address, which may be a unique identifier on the blockchain network. If a user determines that his secret key has been compromised or may have been compromised, he can initiate a blockchain account migration transaction that will associate the user to a new address.

To perform a blockchain account migration, a user may create a new address and then create a migration account blockchain transaction that includes one or more of the following: an old address; a new address; a public key associated with the new address; and a digital signature. The migrate account blockchain transaction may be broadcasted to nodes of a blockchain network that validate the account migrate blockchain transaction, execute the requested migration, and include it in a block that is added to the blockchain network. A blockchain account migration may be performed on a blockchain network by recording a link from a first address (e.g., the old account) to a second address (e.g., the new account) which indicates that the first address is deprecated and that its private key may not be used to sign more transactions and that the entity backing the first address has migrated to the second address.

A blockchain account migration can be initiated for various reasons. For example, a blockchain account migration can be performed in response to determining that a secret key associated with an account has been compromised or may have been compromised; a blockchain account migration can be performed to upgrade security of the blockchain to use more secure cryptographic algorithms; a blockchain migration can be performed on a periodic basis as a precautionary measure or after a secret key has been used a maximum number of times.

There may exist several challenges surrounding the generation and exchange of digital asset (e.g., token) on a blockchain. In some cases, a digital asset corresponds to a real world product or service such that control of a digital asset (e.g., token) entitles the owner of the digital asset or token to a real world product or service. Accordingly, when a product or service is offered in the real world, a digital asset or token may be created. However, when performed at scale, there may be challenges involved in when and what type of digital asset is created. For example, if an organization creates a thousand or even millions of widgets and offers them for sale, there are challenges involved in creating, for each of the thousand or even millions of widget, a corresponding blockchain entry at least because doing so occupies an increasing amount of space and storage on the blockchain and may occupy computing resources to use a secret key associated with the organization to sign digital certificates for each blockchain entry.

In the context of blockchains, there may be different types of tokens such as fungible tokens and non-fungible tokens. Fungible tokens are those which are essentially interchangeable and can be aggregated, split, and subjected to different organization schemes since one is essentially the same as another. For example, a Bitcoin (1 BTC) may be a fungible token since one Bitcoin (e.g., mined at block A) is essentially interchangeable for another Bitcoin (e.g., mined at a different block B), for two half Bitcoins, etc. An example of a non-fungible token is a blockchain token that grants access to a concert show with a seat number, as each ticket may have a different seat number.

In some cases, creating hundreds, thousands, or even more tokens on a blockchain which each has the distinct possibility of being transferred to another user (e.g., as part of an exchange of digital assets) has challenges involved in the amount of work that needs to be done at the very onset of the tokens or objects being made available to other users of the blockchain. Generating millions of tokens for a product or service that may be offered can take up a lot of space and storage and may be difficult to maintain. Additionally, the creator or issuer of those tokens may need to digitally sign each transaction and securely store them somewhere. Furthermore, if many tokens are issued but few are actually transferred, the rest of the assets are forever on the blockchain. For example, if a movie theatre issues blockchain tokens for seats to a showing and generates a blockchain token for each seat and offers them to the public, unsold tickets may forever be recorded to the blockchain and replicated to thousands of nodes across the world, thereby collectively occupying a large amount of storage space.

Creating blockchain tokens on demand as an alternative implementation may have other challenges. For example, an issuer may create and sign a blockchain transaction to transfer control of an asset in exchange for other assets (e.g., price in Bitcoins) and stores it locally rather than broadcasting to the blockchain. As a result, the pre-generated transaction is held locally and when an exchange is to be made to a counterparty, the pre-generated transaction is provided to the counterparty off-chain and the counterparty contributes other digital assets and signs it, and the resulting transaction—signed by both parties and attesting to a transfer of a token from the issuer and digital assets to the issuer—is broadcasted in its entirety to the blockchain. However, this scheme is not automatic in the sense that the issuer may be required to perform an action in response to a counterparty providing a request for to product or service associated with the token (e.g., issuer has to provide a transaction to the counterparty). Additionally, there are security challenges involved in such scheme, at least because the pre-generated transactions need to be securely stored, otherwise they could be signed and broadcasted by an unintended counterparty. Additionally, once a pre-generated transaction is created and digitally signed, certain parameters (e.g., price) cannot be altered and the transaction needs to be destroyed and re-generated to modify any fields (e.g., if the show time of a movie changes). Accordingly, a problem rooted in computer technology involves how to scalable generate, acquire, and consume digital assets (e.g., tokens) in a blockchain network.

Figure 9:
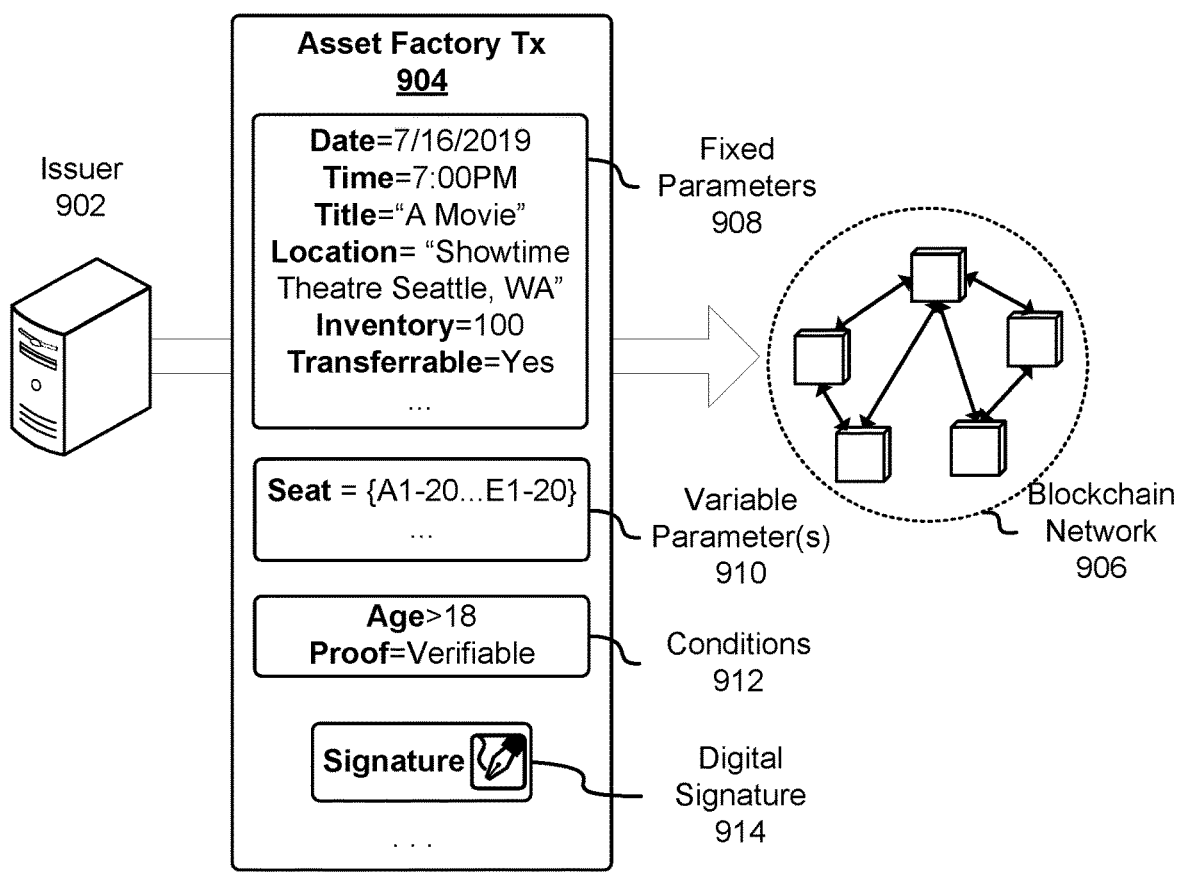
FIG. 9 illustrates a computing environment which may be used to implement a blockchain asset factory transaction, in accordance with at least one embodiment.

FIG. 9 illustrates a computing environment 900 in which an embodiment may be practiced. The computing environment 900 may be used to implement a system that supports blockchain asset factory. FIG. 9 illustrates a an issuer 902 that generates an asset factory transaction 904 that is broadcasted to a blockchain network 906, in accordance with at least one embodiment. Techniques described in connection with FIG. 9 may be applicable to embodiments described elsewhere in this disclosure, such as in FIGS. 10-13. The blockchain network 906 may be in accordance with those described elsewhere in this disclosure. The issuer 902 may refer to any suitable computing entity that interfaces with a blockchain network 906 and may refer to a user of a blockchain network that can be identified by a unique identifier (e.g., blockchain address).

An asset factory transaction 904, in an embodiment, is generated by an issuer 902 (e.g., creator) that digitally signs the asset factory transaction. An asset factory transaction may include a set of fixed parameters 908, a set of variable parameters 910, a set of conditions 912, and a digital signature 914 attesting that the issuer 902 generated the asset factory transaction 904. A fixed parameter may refer to a parameter that is common between all tokens or digital assets that are to be generated by an asset factory. For example, an asset factory for a movie ticket may have fixed parameters that include the show time, location, total inventory, and cost of the ticket. As a second example, fixed parameters may include different configurations of a product—a vehicle product may have fixed parameters for the color of the vehicle. A variable parameter may refer to a parameter that is specified later on by an owner that generates an acquire asset transaction. Continuing with the previous example, for a movie ticket, a variable parameter may include the seat of the ticket, since each person selects a different seat. Different embodiments may have different fixed and variable parameters—for example, a ticket that grants general admission to a park may not have a fixed parameter for seating if each ticket simply grants access to the park without differentiating between patrons. On the other hand, additional variable parameters for a concert ticket may include, in addition to the seat, a ticket type (e.g., early bird) which may also affect price (e.g., price may also be a variable parameter). Generally speaking, many different combinations of variable and fixed parameters may exist that an issuer that creates the asset factory transaction can specify. While an asset factory can be used for tickets as described in various examples above, asset factory transaction can be used for facilitating exchange of blockchain assets and tokens for various types of goods and services. An asset factory transaction may be broadcasted to the blockchain network prior to any exchanges relating between an issuer and owner, which may be facilitated by downstream transactions for an acquire asset transaction and consume asset transaction.

Figure 10:
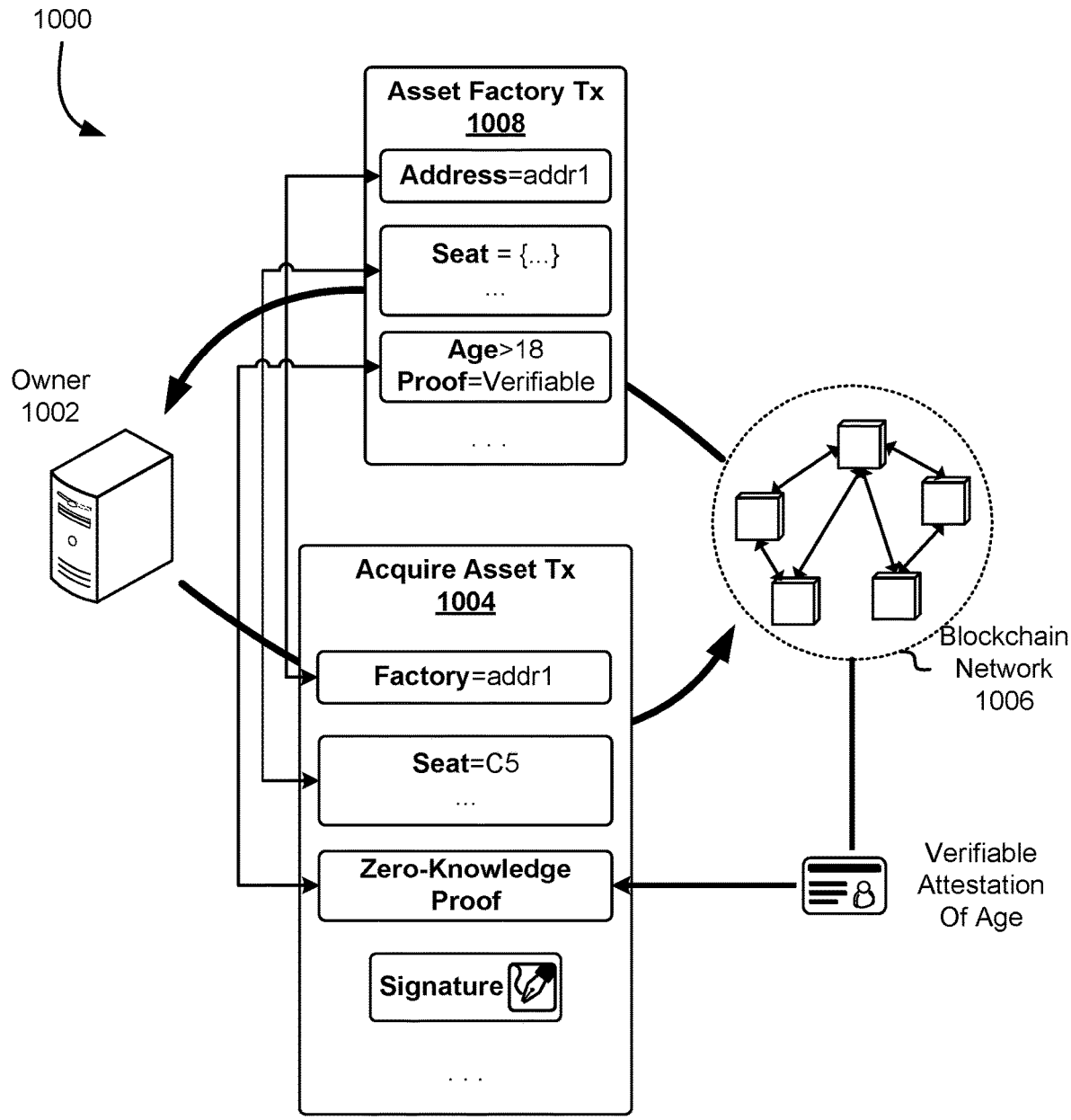
FIG. 10 illustrates a computing environment which may be used to implement an acquire asset blockchain transaction, in accordance with at least one embodiment.

FIG. 10 illustrates a computing environment 1000 in which an embodiment may be practiced. The computing environment 1000 may be used to implement a system that supports blockchain asset factory. FIG. 10 illustrates an owner 1002 that generates an acquire asset transaction 1004 that is broadcasted to a blockchain network 1006, in accordance with at least one embodiment. Techniques described in connection with FIG. 10 may be applicable to embodiments described elsewhere in this disclosure, such as in FIGS. 9 and 11-13. The blockchain network 1006 may be in accordance with those described elsewhere in this disclosure. The owner 1002 may refer to any suitable computing entity that interfaces with a blockchain network 1006 and may refer to a user of a blockchain network that can be identified by a unique identifier (e.g., blockchain address).

An acquire asset transaction 1004 may be submitted by an owner 1002 that wants to create a token which can be later utilized, such as to obtain the benefit of a real-world product or service backed by the issuer. In at least one embodiment, an asset factory transaction 1008 such as those described in connection with FIG. 9, is broadcasted to the blockchain network 1006. In at least one embodiment, an acquire asset transaction include a reference to the asset factory's address, specifications (e.g., the defining the variable parameters specified in the asset factory transaction). The acquire asset transaction may include a digital signature generated by the owner 1002 by the owner and broadcasted to the blockchain network 1006. For example, relating to a movie ticket example described elsewhere, an issuer may generate an asset factory transaction with a movie show time and available seats, broadcasting the asset factory transaction; an owner may create an acquire asset transaction that is digitally signed which specifies additional parameters required by the asset factory transaction (e.g., a specific seat for the owner) and includes a transfer of control of digital assets from the owner to issuer.

In some embodiments, an acquire asset transaction may be accepted by a blockchain based on restrictions imposed by the blockchain network and/or asset factory transaction. For example, an asset factory transaction may encode one or more restrictions to acquire asset transactions that may be created. For example, a first restriction is that the total number of tickets sold may not exceed a limit or capacity specified by an asset factory transaction. As a second example, a restriction might be that a ticket for a particular seat cannot be re-sold—accordingly, when a corresponding acquire asset transaction is being validated, it will be rejected if there is already a previous blockchain transaction that includes the same seat number. As a third example, specific ticket types may have restrictions on them—a movie that is rated R may require that the user provide a verifiable proof of the user's age; an early-bird ticket may require that the acquire transaction is broadcasted before a certain time, and more. A verifiable proof may refer to an attestation to a certain information that is supported by a trusted authority. An issuer may define which authorities are trusted. For example, an issuer may create an asset factory that require an attestation of a user's age be provided by an acquire asset transaction and the user may include the user's address and a blockchain license issued by a government organization (e.g., included in a list of trusted authorities defined by the issuer). As part of validating the transaction, a digital certificate of the blockchain license may be verified using a public key of the government organization to verify authenticity (e.g., not forged) and integrity (e.g., not altered) of the blockchain license and then verifying that the age restriction is met. In some embodiments, a user presents biometric data to a scanner (e.g., a fingerprint scanner, iris scanner, voice recorder) that authenticates the user, and then uses the blockchain license of the user to provide an attestation—in this way the entity making the acquire asset transaction is authenticated as the same individual whose blockchain-based license is being used to satisfy an asset factory's conditions. A blockchain license may be a verifiable attestation (e.g., of age, nationality, membership to an organization, health condition, etc.) that can be used as part of a zero-knowledge proof that satisfies a condition presented by asset factory transaction 1008 in order for the asset factory to vend a token (e.g., acquire asset transaction 1004).

In some embodiments, a zero-knowledge proof according to a Zero-Knowledge Succinct Non-Interactive Argument of Knowledge (zk-SNARKs) protocol is used to provide a yes/no answer to whether the user meets an age restriction without providing other information. For example, a zk-SNARKs protocol may be used by a prospective owner to prove that his or her age meets the restriction without divulging the owner's age, what form of identification was used beyond attesting that it is from an authority trusted by the issuer, and without divulging other information about the owner (e.g., name, address, date of birth). No real-world analogy exists that provides the privacy assurances described hereinabove and elsewhere—using a movie ticket example again, it would be as if a movie-goer selected a ticket for an age-restricted show and a driver's licensing agency employee was teleported to the movie theatre, tells a movie theatre employee that the movie-goer is older than the age restriction of the show, and then the agency employee and movie theatre employee both immediately forget the conversation (zk-SNARKs may provide assurances that no information is divulged as to how the proof was verified). Unlike in real-world examples where a movie-goer's age is authenticated by a movie theatre attendant, the movie theatre attendant obtains no information about the user beyond the fact that the movie-goer meets an age restriction—for example, information on the license such as the movie-goer's address, weight, height, date of birth, issuer of the license, etc. are not divulged to the movie theatre attendant, some or all of which could subject the movie-goer to risk of identity theft.

In some cases, an asset factory transaction is created by an issuer and an acquire asset transaction is created by an owner. An acquire asset transaction may include a transfer of digital assets to the issuer, whose blockchain address may be included in the asset factory transaction. In at least some embodiments, after an issuer creates and broadcasts an asset factory transaction, there is no other action needed by the issuer for an owner to generate an acquire asset transaction, thereby reducing constraints and/or requirements on the issuer to have a signing key available at different points in time. In some embodiments, a hash is generated over the parameters of an acquire asset transaction. In some embodiments, when an acquire asset transaction is being validated, a hash of its parameters is calculated and a blockchain ledger is checked to see whether that hash has already been included in another acquire asset transaction—if so, it may indicate that a particular token should not be generated a second time (e.g., in the case of non-fungible tokens, such as for a particular seat to see a movie). In some cases, an acquire asset transaction includes an owner field which can be initialized to the owner creating the acquire asset transaction or reference the blockchain address of another blockchain user (e.g., as a gift).

An asset factory can, in some cases, be updated with an update asset factory transaction. The update transaction, in at least some embodiments, can be used to update fixed parameters but not variable parameters. In one embodiment, an update asset factory transaction is implemented using techniques for account migration that use versioning. As an example, an asset factory transaction may have a "MigrateTo" field and when an update is applied, a second asset factory transaction is broadcasted with updated parameters such as price, total quantity, etc. In some embodiments, an update asset factory transaction is a blockchain transaction that references a previous asset factory, includes updated parameters, and is digitally signed by the original issuer of the asset factory transaction, and acquire asset factory transactions, to be validated, include the updated parameters.

In some embodiments, an issuer creates different asset factories that can be interrelated. For example, an issuer may create a first asset factory for early bird ticket sales and a second asset factory for regular tickets. The multiple asset factories may include references to each other's addresses. Continuing with the example, the total quantity of tickets sold may be calculated by adding up the acquire asset transactions generated under each of these asset factories even though none of the individual asset factories exceeds a maximum inventory. For example, if total number of seats (e.g., maximum inventory) of a movie show for sale is 50 and there are 20 early bird ticket sale and 30 regular ticket sale, further acquire asset transactions will fail as having reached the maximum inventory since there are a total of 50 acquire asset transactions broadcasted to the blockchain (between the two asset factories) even though neither asset factory alone has reached capacity. In at least some embodiments, asset factory and acquire asset transactions support data fields for extensions where custom logic can be housed by issuers and owners for customizing conditions and logic for processing of the transactions.

Figure 11:
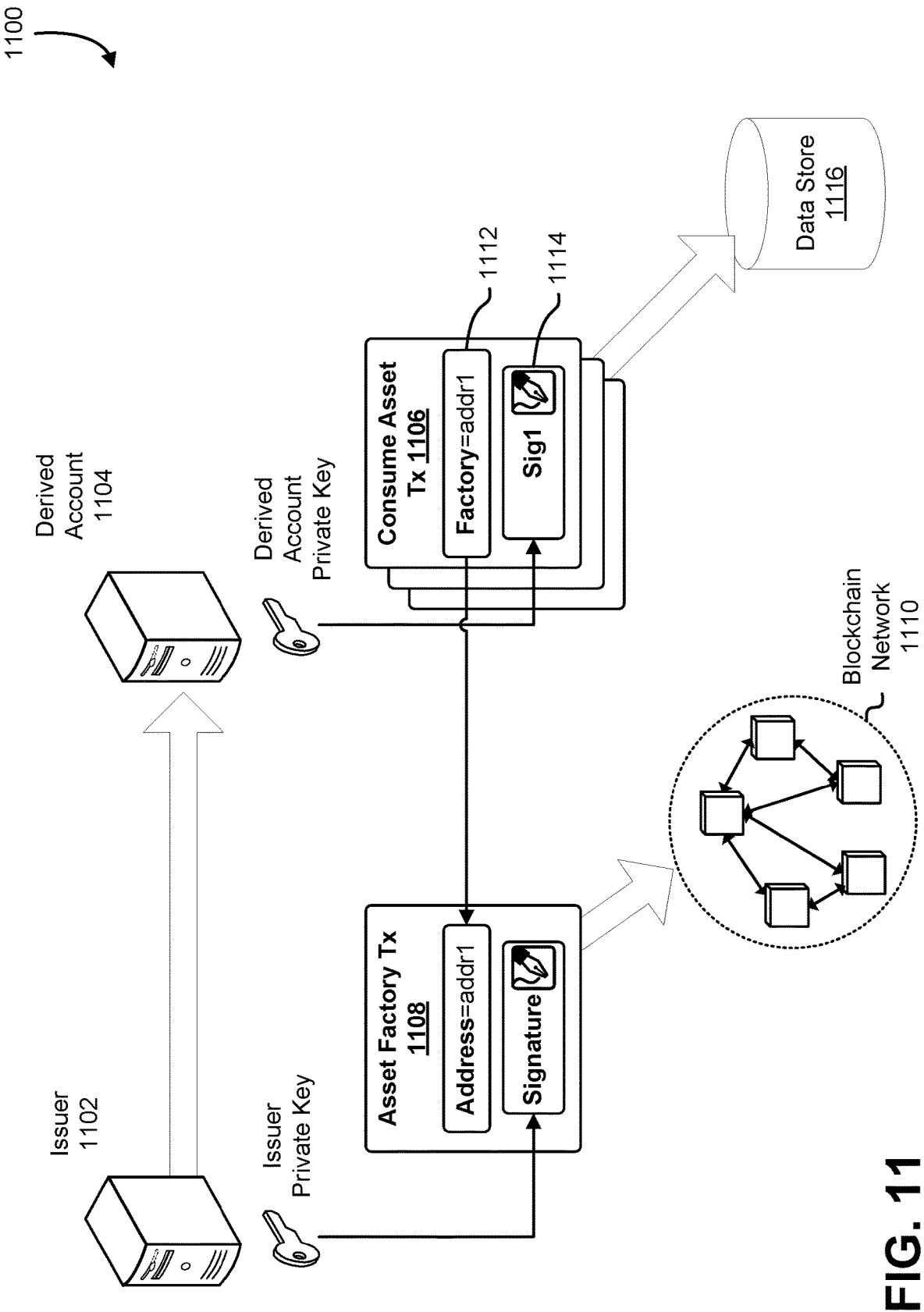
FIG. 11 illustrates a computing environment which may be used to implement a consume asset blockchain transaction, in accordance with at least one embodiment.

FIG. 11 illustrates a computing environment 1100 in which an embodiment may be practiced. The computing environment 1100 may be used to implement a system that supports blockchain asset factory. FIG. 11 illustrates an issuer 1102 and a derived account 1104 of the issuer that generates a set consume asset transaction 1106 based on an asset factory transaction 1108, in accordance with at least one embodiment. Techniques described in connection with FIG. 11 may be applicable to embodiments described elsewhere in this disclosure, such as in FIGS. 9-10 and 12-13. The blockchain network 1110 may be in accordance with those described elsewhere in this disclosure. The issuer 1102 may refer to any suitable computing entity that interfaces with a blockchain network 1110 and may refer to a user of a blockchain network that can be identified by a unique identifier (e.g., blockchain address).

A consume asset transaction 1106 may be utilized to consume a digital asset referenced in an acquire asset transaction. According to a protocol, a consume asset transaction may be digitally signed by two parties. In at least one embodiment, one of the digital signatures is from the issuer of the asset factory of an acquire asset transaction and the other digital signature is of the owner of the acquire asset transaction. In some cases, the first digital signature referenced above is generated by a child account (e.g., derived account 1104) of the issuer 1102 rather than the issuer. Generally speaking, the issuer may digitally sign the consume asset transaction directly or delegate the signing to another entity using any suitable techniques for ensuring authentication, integrity, non-repudiation of the signature, as well as cryptographically verifiable assurances that singing authority has been delegated from the issuer to the other entity.

In at least one embodiment, a first blockchain account, which can be an issuer (e.g., as described above in connection with an asset factory transaction) or a delegated account (e.g., child account generated by the issuer) generates a consume asset transaction and fills it out with a reference 1112 to an asset factory transaction, such as a blockchain address, some or all fixed parameters of a blockchain address, and any suitable alternative. The issuer or delegated account may also generate a first digital signature 1114 over the consume asset transaction 1106 (one-party signature). For a consume asset transaction to be accepted to a blockchain ledger, a second digital signature from an owner of an acquire asset transaction may be required. The first digital signature 1114 may be any suitable digital signature that can be traced back to the issuer of the asset factory transaction 1108. For example, the asset factory transaction 1108 and consume asset transaction 1106 may both be digitally signed by the issuer 1102. As a second example, the asset factory transaction 1108 may be digitally signed by the issuer 1102 (e.g., using issuer private key) and the consume asset transaction 1106 is digitally signed using a derived account private key which has a corresponding derived account public key that can be used to validate digital signatures purportedly signed by the derived account private key. In some cases, a digital certificate that includes the derived account private key is digitally signed by the issuer private key that attests that the derived account is associated to the issuer and is delegated the authority to digitally sign consume asset transactions for an asset factory. In some cases, the digital certificate includes a chain of trust that links the derived account to the issuer. In some cases, a chain of trust is broadcasted to the blockchain network 1110 that indicates that the derived account 1104 is a child account of the issuer 1102.

That first blockchain account may digitally sign the consume asset transaction and store it locally in a data store 1116 (e.g., it is not immediately broadcasted to the blockchain network). The consume asset transaction may be provided to an owner of an acquire asset transaction generated based on the asset factory transaction described above, and addition information relating to the acquire asset transaction is further included with the consume asset transaction, such as specific variable parameter values for the particular owner of the particular acquire asset transaction and the blockchain address of the acquire asset transaction, and the owner may contribute, as a second blockchain account, a second digital signature to the consume asset transaction. In some embodiments, the owner broadcasts the consume asset transaction after filling in additional information and contributing a second digital signature, for example, according to embodiments described in connection with FIG. 12.

Figure 12:
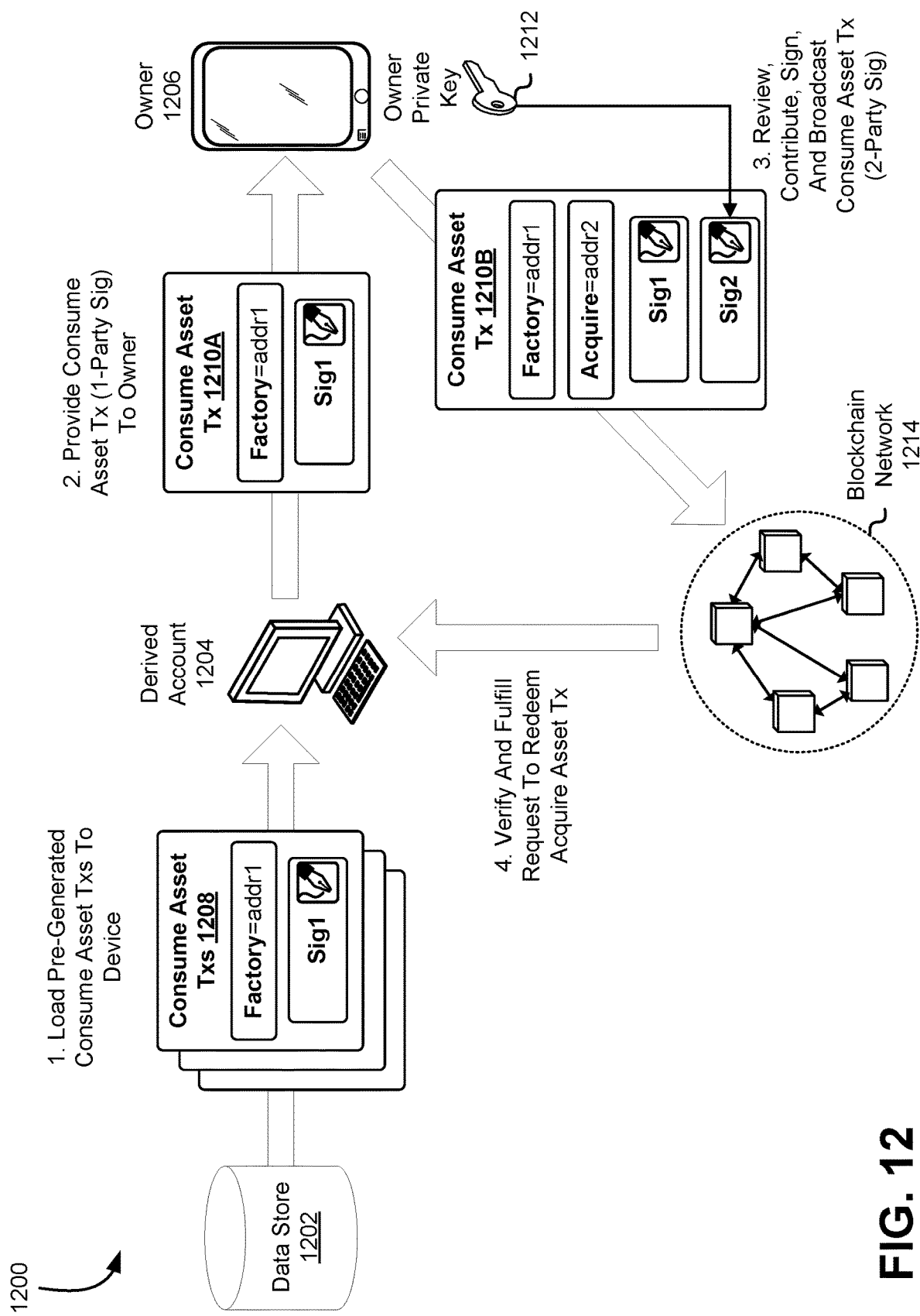
FIG. 12 illustrates a computing environment which may be used to implement a consume asset blockchain transaction, in accordance with at least one embodiment.

FIG. 12 illustrates a computing environment 1200 in which an embodiment may be practiced. The computing environment 1200 may be used to implement a system that supports blockchain asset factory. FIG. 12 illustrates data store 1202, derived account 1204, and owner 1206, in accordance with at least one embodiment. Techniques described in connection with FIG. 12 may be applicable to embodiments described elsewhere in this disclosure, such as in FIGS. 9-11 and 13.

Data store 1202 may refer to any suitable data storage system and may be in accordance with those described elsewhere in this disclosure, such as those discussed in connection with FIG. 11. For example, data store 1202 may be hard disk drive, network storage device, or other suitable storage device that stores consume asset transactions 1208. Data store 1202 may store data such as consume asset transactions 1208 in an encrypted format. Data store 1202 may be accessible by an organization via an intranet. Data store 1202 may be physically and/or logically isolated from the blockchain network 1214—for example, data store 1202 may be connected to a company intranet which does not have a physical and/or logical connection to the Internet or any other network that is connected to blockchain network 1214. Firewalls, proxies, gateways, virtual local area networks (LANs), and more may be utilized to isolate data store 1202 from other networks. In some cases, data store 1202 is connected to a network that has access to the blockchain network.

Derived account 1204 may be in accordance with those discussed in connection with FIG. 11. For example, derived account 1204 may be a child account of an issuer of an asset factory. In some embodiments, issuer (e.g., as described in connection with FIG. 11) digitally signs a set of consume asset transactions 1208 and stores them in data store 1202. In some cases, a derived account signs the set of consume asset transaction 1208. In some cases, multiple different derived accounts use their respective private keys to digitally sign different subsets of consume asset transactions, which can be used to track the manner in which a consume asset transaction is redeemed. Consume asset transactions 1208 may be generated with different nonces and/or salt values.

In some embodiments, a first computing device (e.g., not illustrated in FIG. 12) with access to a derived account private key is used to digitally sign consume asset transactions and then store those 1-party signed consume asset transactions in data store 1202 and a second computing device (e.g., illustrated in FIG. 12 as numeral 1204) that lacks access to the derived account private key is used to provide consume asset transaction 1210A to owner 1206. For example, a secure computing device (e.g., a desktop computer in a physically secured space controlled by an organization) may be a first computing device that securely stores a private signing key in a hardware security module; and a handheld embedded device having a QR code scanner and lacking a HSM, TPM, etc. to securely store cryptographic keys may be a second computing device that is used at a point of sales or as a field device to complete the consume asset transactions. For example, if an embedded device that lacks access to a derived account private key is stolen, a blockchain account migration described in connection with FIGS. 1-4 can be used to deprecate the derived account and prevent the consume asset transactions (1-party signature) from being validated on the blockchain network. Attempting to broadcast a transaction with the digital signature of a deprecated account may fail.

Accordingly, FIGS. 11 and 12 provide a tangible solution to a real-world technical problem surrounding the security of computer systems—typically, when two or more computing entities are to jointly participate in a blockchain transaction, both parties have access to private keys which are used to contribute digital signatures of the respective parties. However, having access to a private key may introduce other risks, since as the device with the private key being stolen or requiring additional costly hardware to securely store the private keys. With techniques described herein, the risk of cryptographic material associated with derived account 1204 being compromised is reduced and/or eliminated.

In some embodiments, derived account 1204 illustrated in FIG. 12 is a mobile or embedded device and loads pre-generated consume asset transactions from data store 1202. In some embodiments, a first device with access to a private key generates consume asset transactions 1208 and stores them in 1202 while a second device without access to the private key loads consume asset transactions 1208. In some cases, a first device generates one or more one-party signed consume asset transactions and directly transfers them to a second device (e.g., ad hoc generation over a wireless network).

Owner 1206 illustrated in FIG. 12 relates to a device controlled by a blockchain account that controls an acquire asset transactions such as those described in connection with FIGS. 9-11 and 13-14, in at least one embodiment. Owner 1206 may refer to a mobile device under the control and possession of a human owner and may have biometric-based security systems to authenticate the owner. Derived account 1204 (e.g., in response to a request from owner 1206) may provide, to owner 1206, a consume asset transaction 1210A from a set of consume asset transactions 1208. In some embodiments, the consume asset transaction 1210A includes a blockchain address or other reference to a blockchain asset factory transaction and a digital signature generated by derived account 1204 or an issuer (e.g., parent of derived account 1204).

Consume asset transaction 1210A received by owner 1206 may include one digital signature. In some cases, the first digital signature is generated by an issuer of the asset factory referenced on consume asset transaction 1210A. In some cases, the first digital signature is generated by the derived account 1204 and a digital certificate attests to a cryptographically verifiable chain of trust indicating that derived account 1204 is a child account of the issuer of the asset factory transaction and is authorized to generate digital signatures for consume asset transaction 1210A.

Upon receiving consume asset transaction 1210A, owner 1206 may display information relating to the consume asset transaction and/or the asset factory transaction on a graphical user interface to be reviewed. For example, a customer may be prompted with show time information for a movie that the customer is being requested to redeem a ticket for. Owner 1206 may review the consume asset transaction 1210A, contribute information associated to an acquire asset transaction generated using the aforementioned asset factory transaction, and generate a second digital signature over the consume asset transaction using owner private key 1212 associated with a blockchain account of owner 1206. Owner 1206 may be the same entity that created and broadcasted an acquire asset transaction. A different entity may have created and/or controlled the acquire asset transaction at some point in the past and transferred control of the acquire asset transaction to owner 1206.

Consume asset transaction 1210B may be a fully formed blockchain transaction that includes a first digital signature from an issuer of an asset factory transaction (or delegated account) and a second digital signature from an entity that controls. Consume asset transaction 1210A, with just a first digital signature, may not be accepted by blockchain network 1214 whereas consume asset transaction 1210B signed by two parties may be accepted.

In some embodiments, consume asset transaction 1210B includes at least a reference to an asset factory transaction, a reference to an acquire asset transaction generated by said asset factory transaction, and a first digital signature generated by a first party by or on behalf of an issuer of the asset factory transaction, and a second digital signature generated by a second party in control of said acquire asset transaction. In some embodiments, additional information such as additional data included in the asset factory transaction and/or the acquire asset transaction may be included in consume asset transaction 1210B. For example, consume asset transaction 1210A (and by extension, consume asset transaction 1210B) may include the show time, movie name, and theatre number for the movie, which may allow owner 1206 which can be displayed to a user to review without requiring additional time or latency involved in querying that information from blockchain network 1214.

In some cases, consume asset transaction 1210A includes a restriction. For example, consume asset transaction 1210A may reference an asset factory transaction that requires a proof. The proof may be a self-proof (not requiring any particular form of verification) or other types of proofs such as a verifiable proof. A zk-SNARKs proof can be a type of verifiable proof. For example, in order to buy cigarettes or alcohol, which may be controlled substances whose sale is age-restricted, owner 1206 may, use biometric data to generate authentication information that attests to the user's identity and provide that authentication information along with a reference to a blockchain license issued by a trusted authority (e.g., government entity issuing drivers licenses) that attests to the user's age. In some embodiments, a zero-knowledge proof is used that (1) attests that biometric data being presented is associated with an identity; (2) the identity has additional information available on the blockchain network 1214 whose authenticity and integrity is verified by a trusted source; and (3) based at least in part on the additional information, a constraint or restriction is satisfied.

Once consume asset transaction 1210B has contributions from both parties, it may be broadcasted to a blockchain network 1214. Blockchain network 1214 may be in accordance with those described elsewhere in this disclosure. In some embodiments, blockchain network 1214 validates consume transaction 1210B by doing one or more of the following verification routines: verifying authenticity and/or integrity of one or more digital signatures; verifying at least one digital signature of consume asset transaction 1210B is generated by issuer (or delegated account thereof) of the asset factory transaction referenced in the consume asset; and verifying at least one digital signature is generated by owner of an acquire asset transaction generated by the asset factory transaction; the acquire asset transaction has not been previously consumed; and any suitable combination thereof.

Once owner 1206 broadcasts consume asset transaction 1210B to blockchain network 1214, the issuer or child account can verify the contents of the consume asset transaction, such as verifying that the owner provided a valid acquire asset transaction and that the digital signature over the consumer asset transaction matches the creator of the acquire asset transaction. Upon verify the consume asset transaction, the issuer or derived account of the issuer may release control of a real-world product or service. In some cases, the verifications are performed as a condition for consume transaction 1210B being broadcasted to the network and derived account 1204 merely needs to verify that the particular consume asset transaction 1210A sent to owner 1206 was successfully broadcasted to the blockchain network 1214. For example, each consume asset transaction may have a field for a unique identifier.

Figure 13:
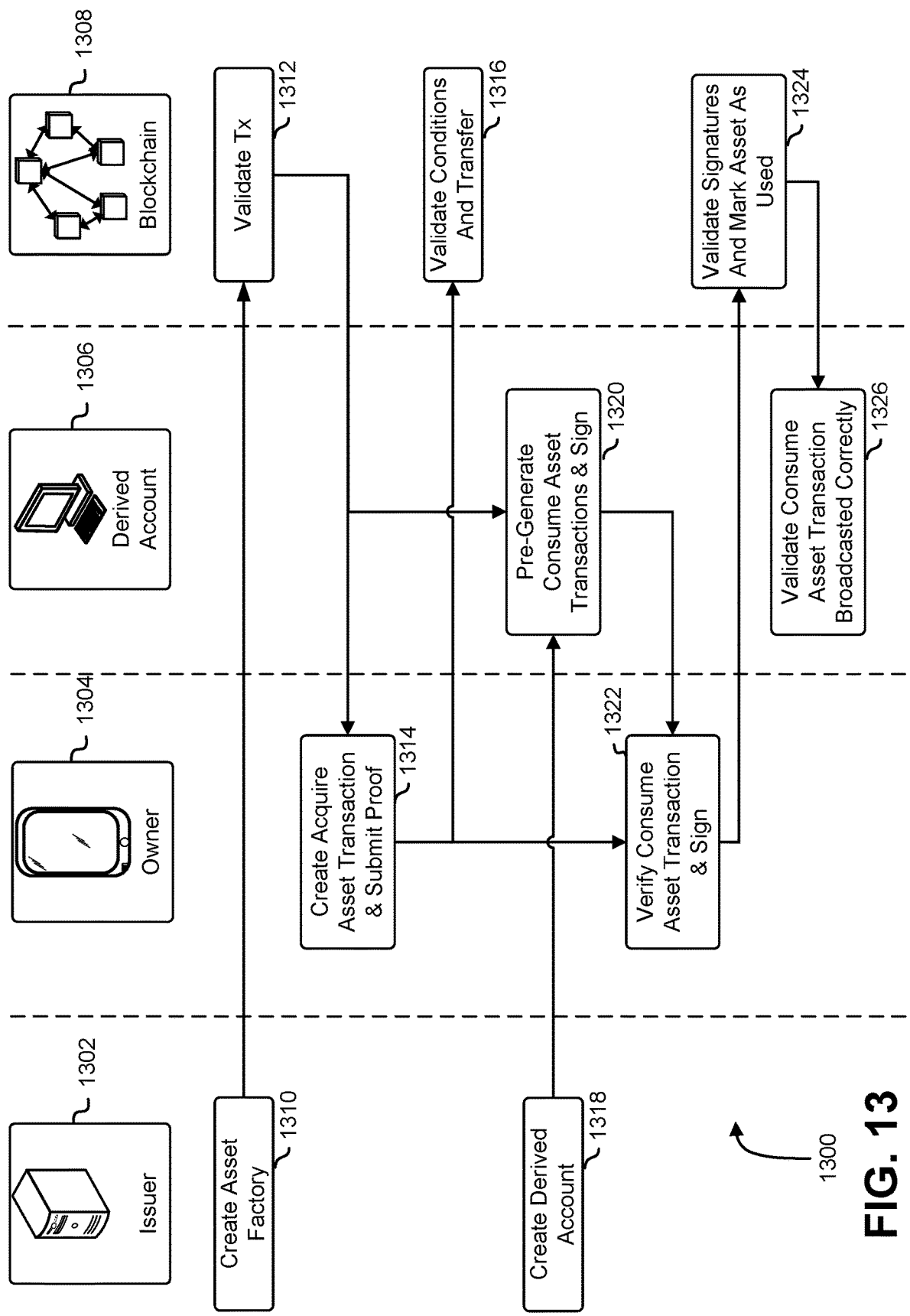
FIG. 13 illustrates a diagram which may be used to implement a system that supports blockchain asset factory, in accordance with at least one embodiment.

In at least one embodiment, a platform offering different products and services generates multiple different asset factories and allows a customer to select among those different products and services. For example, an e-commerce provider may allow users to select multiple products or services to buy—some of which are to be fulfilled by the provider and some by a third party using the provider. The provider creates an asset factory and signs it, and the acquire asset transaction is generated and signed by an owner, and the owner may present the acquire asset transaction FIG. 13 illustrates a diagram 1300 in which an embodiment may be practiced. The diagram 1300 may be used to implement a system that supports blockchain asset factory. FIG. 13 illustrates issuer 1302, owner 1304, derived account 1306, and blockchain network 1308, in accordance with at least one embodiment. Techniques described in connection with FIG. 12 may be applicable to embodiments described elsewhere in this disclosure, such as in FIGS. 9-12. Issuer 1302, owner 1304, derived account 1306 and blockchain network 1308 may be in accordance with those described elsewhere in this disclosure.

An issuer 1302 may create an asset factory transaction 1310 that includes several parameters, including fixed parameters such as a description of a real-world asset (e.g., a SKU identifying a product or service). An asset factory may include a parameter indicating a value of the asset to be vended by an asset factory. An asset factory may include variable parameters that are to be selected as part of generating an acquire asset transaction. For example, an asset factory for a movie ticket or plane ticket that includes a seat number that is being reserved by the ticket. An asset factory transaction may include additional metadata, such as properties for digital tokens to be vended by the asset factory, such as an indication of how long the token is valid after being consumed (e.g., gym subscription service), whether the token is transferrable (e.g., plane ticket may be non-transferrable). An asset factory may encode one or more conditions to vend a token, such as an age restriction. Issuer 1302 may digitally sign an asset factory transaction and broadcast it to blockchain network 1308. Blockchain network 1308 may validate 1312 an asset factory transaction by checking the issuer listed in the transaction matches the author of the digital signature and make the asset factory transaction to nodes on the blockchain network.

A user of blockchain network 1308 (e.g., owner 1304) may obtain a create asset factory transaction and create 1314 an acquire asset transaction. An acquire asset transaction may include a reference to the asset factory transaction's blockchain address. Additionally, the acquire asset transaction may fill in variable parameters (e.g., selecting a specific seat of a movie show for sale). In some cases, an asset factory includes a condition such as an age restriction. A condition may gate (e.g., restrict) acquire asset transactions and/or consume asset transactions. For example, an acquire asset transaction may satisfy an age-restriction by submitting a zero-knowledge proof of the owner's age. Acquire asset transaction may include a transfer of digital assets from owner 1304 to issuer 1302. Owner 1304 may digitally sign the acquire asset transaction and broadcast the acquire asset transaction to blockchain network 1308. Blockchain network 1308 may validate 1316 conditions (if any) by, for example, verifying a zero-knowledge proof, validating information about the owner from a trusted source (e.g., blockchain license digitally signed by a trusted government entity). In some cases, acquire asset transaction includes a transfer of digital assets from owner 1304 to another entity such as issuer 1302, which may also be reflected on the blockchain ledger when the acquire asset transaction is processed. A validated and confirmed acquire asset transaction may be considered a digital token that can be redeemed for a real-world benefit in the form of a product or service.

In some embodiments, issuer 1302 creates a derived account 1318. Creating a derived account may include generating a derived account based on techniques described in connection with FIGS. 15-16. An issuer 1302 may create a digital certificate that includes a chain of trust that links derived account 1306 to issuer 1302. In some cases, a derived account is not needed and issuer 1302 performs the functions of derived account 1306 (e.g., issuer signs consume asset transactions). A derived account may be created at any point in time prior to generating consume asset transactions, and it should be noted that one or more of the operations performed in processes described above may be performed in various orders and combinations, including parallel execution and execution in a non-deterministic order, for example. No ordering of operations of process flows illustrated in FIGS. 1-25 are necessarily indicative of relative ordering of the operations unless otherwise stated.

Derived account 1306 may pre-generate 1320 consume asset transactions and contribute a first digital signature. As an example, a movie theatre organization, at some point prior to a movie showing, checks how many acquire asset transactions were generated for an asset factory for the movie showing and generates a corresponding number of consume asset transactions that encode the movie name, showing, etc. In some cases, not all parameters are included in the consume asset transaction (for example, price may be irrelevant). The movie theatre organization may digitally sign the consume asset transactions. The consume asset transactions may be temporarily stored in a data store. The consume asset transactions may be loaded (e.g., from data store) to mobile or embedded devices which can be transported to points of sale or delivery, such as the entrances of a movie theatre.

At a later point in time, owner 1304 and derived account 1306 may perform a negotiation process to consume an acquired asset (e.g., redeem digital token). Either party may initiate the negotiation process, in at least some embodiments. Derived account 1306 may provide a pre-generated consume asset transaction to owner 1304 and owner 1304 may verify 1322 the consume asset transaction and first digital signature and then contribute a token and second digital signature. The fully formed consume asset transaction may be broadcasted to blockchain network 1308 which may validate 1324 both digital signatures and then mark the asset of the acquire asset transaction as being consumed. Other verification checks described in this disclosure may also be performed, such as checking that the acquire asset transaction contributed by the owner is under the control of the owner, that the acquire asset transaction has not already been consumed, that a TTL field has not expired, and others, as circumstances may warrant. Marking an asset as being consumed may be done by appending a flag that irrevocably changes the state of an asset from used=false to used=true on blockchain network 1308. Marking an asset as being consumed may be used to prevent a replay attack and re-consuming an already consumed asset. Derived account 1306 may receive the fully formed (e.g., two-party signed) consume asset transaction from blockchain network 1308 and validate 1326 the consume asset transaction was broadcasted correctly. The validation may include checking that a particular consume asset transaction identifier that was provided to owner 1304 was accepted to blockchain network 1308 with a valid acquire asset transaction. In some cases, owner 1304 may provide the consume asset transaction to derived account 1306, derived account 1306 reviews and validates the consume asset transaction, and derived account 1306 broadcasts the consume asset transaction (with both parties' digital signatures) to blockchain network 1308. In some cases, owner 1304 presents additional information such as a zero-knowledge proof to satisfy a condition. In some cases, the proof involves an additional authentication step by derived account 1306. For example, owner 1304 may be required to show a verifiable proof of age to the derived account 1306 to buy a controlled substance, which may be presented digitally (e.g., as a zero-knowledge proof encoded in the consume asset transaction) or may be performed offline (e.g., owner 1304 presents a physical driver's license to an attendant that authenticates identity and age).

An owner who has previously created an acquire asset transaction encoding a ticket with a specific seat may receive, at one of the entrances, one of the consume asset transactions. The consume asset transaction may be presented to the owner visually (e.g., on owner's mobile device) with the movie name, show time, etc. which may be encoded as a QR code that the owner scans. The owner may be prompted, via a graphical user interface, to redeem a ticket for a specific show. More generally, the owner is prompted to exercise rights that the user obtained from a previous acquire asset transaction. The owner may inspect the contents of the consume asset transaction (e.g., reviewing movie information matches the movie the owner wants to see) and click a button indicating the user is consuming (e.g., utilizing) a digital asset.

In at least some embodiment, an owner verifies the contents of a consume asset transaction and verifies authenticity of a digital signature of an issuer or derived account associated with the issuer. After verifying the contents and authenticity of the consume asset transaction, the owner includes an address to an acquire asset transaction that is controlled by the owner and generates a digital signature over the updated consume asset transaction that includes a reference to an acquire asset transaction controlled by the owner.

After generate a digital signature over a consume asset transaction—which results in a consume asset transaction with a first digital signature from an issuer or authorized derived party and a second digital signature from an owner that controls an acquire asset transaction, the owner, after contributing the second digital signature to the consume asset transaction, may broadcast the consume asset transaction to a blockchain ledger. When a consume asset transaction is broadcasted to the blockchain network, worker nodes may verify authenticity of both digital signatures, verify that the acquire asset transaction referenced by the owner is controlled by the owner, and verifies that the acquire asset transaction can be consumed. Determining that the acquire asset transaction can be consumed may involve checking that the acquire asset transaction has not been previously consumed (e.g., in the case of a movie ticket, once a ticket is consumed it may not be consumed a second time). In some cases, verifying that an acquire asset transaction can be consumed involves checking whether a time to live (TTL) is expired. For example, in the case of a day-pass to an amusement park, re-entry may be permitted within the same day by checking that a TTL written to the acquire asset transaction has a timestamp that is the same date as the current local time. Once all verification checks are completed, the consume asset transaction may be accepted for the blockchain ledger. In some cases, when a consume asset transaction is processed, a corresponding acquire asset transaction referenced in the consume asset transaction is marked as being un-transferrable. Generally speaking, marking an acquire asset transaction as being un-transferrable is one example of state information on the blockchain that indicates whether an acquire asset transaction is used or consumed, and other implementations are also contemplated in the scope of this disclosure.

After the owner or any other suitable computing entity broadcasts a consume asset transaction to the blockchain, the issuer or derived entity may verify the consume asset transaction was signed by the owner and perform an appropriate action. For example, a movie attendant may be prompted with information on which room or seat to usher the owner to. In some cases, access may be contingent upon further authentication of the owner. For example, an individual may create an acquire asset transaction at home that entitles the user to a showing of an age restricted movie—as part of creating the acquire assent transaction, a corresponding asset factory transaction may have a condition that requires the user to provide a verifiable proof that the user satisfies the age restriction. Upon creating the acquire asset transaction, the user becomes an owner of a digital asset (e.g., the acquire asset transaction) that entitles the user to view the age restricted at a movie theatre. When owner goes to the movie theatre and redeems the digital asset, the owner may be required to provide authentication information attesting to the owner's identity. Continuing with the previous example, when the owner attempts to redeem the movie ticket, the user may provide a reference to a blockchain license which a movie attendant may access and check that the user is the same identity as presented in the blockchain license and verify that the user satisfies the age restrictions. In some embodiments, at the point of entry, a zero-knowledge proof is used to verify the user meets the age restriction—the user provides biometric data (based on the user's fingerprint, iris, voice, etc.) which allows the user to use a blockchain license to authentic the user's identity. Once the biometric data is validated, the blockchain license is used to perform a zero-knowledge proof that the user is over a certain age or meets other criteria to use the ticket (e.g., the user is part of an organization such as AAA, AARP which is entitled to certain types of discounted tickets). The zero-knowledge proof is presented to the movie theatre attendant who use a blockchain-connected device to verify the proof and grant access to the age restricted show.

In some embodiments, an issuer or related entity includes a timestamp in the consume asset transaction that indicates when the asset is being utilized. For example, a gym membership may be consumed at a specific point in time and be valid for a predefined duration (e.g., 1 month membership). A date of activation may be included in the consume asset transaction by either the issuer or owner, in accordance with at least one embodiment. In some embodiments, the consume asset transaction includes a time to live (TTL) that indicates how long the owner is entitled to a specific resource, such as access to gym facilities in the case of a time-bound gym membership.

In some cases, a consume asset transaction can be digitally signed by an issuer—the same entity that created and digitally signed an asset factory transaction—or by a delegated or derived account associated with the issuer. A delegated account may be a blockchain account that is created by an entity to perform delegated functions. For example, an organization may have a primary blockchain account and create delegated accounts associated with different employees to perform different functions. As an example, a movie theatre organization may create an asset factory using the organization's account and cryptographic keys, and create a delegated account for employees or locales that are used to digitally sign consume asset transactions. A delegated account may be linked to a primary account through a digital certificate. A delegated account may have a certificate chain that shows the delegated account's public key is issued by a parent account (e.g., organization). A delegated account may be used to track different metrics and provide data that may otherwise be unavailable if the issuer directly signed a consume asset transaction. An organization may provide delegated accounts to different employees that have different cryptographic keys. Accordingly, when an owner signs and broadcasts a consume asset transaction to the blockchain, the organization can determine which employee validated the consume asset transaction—this information can be used to audit individual employees and ensure that they are complying company policies, laws and regulations, and track down whether fraudulent transactions are being perpetrated by a specific employee. A delegated account may be associated with a specific location—for example, a national park may have several entrances, each of which has a different delegated account; when a patron digitally signs a consume asset transaction at an entrance, the point of entry may be recorded to the blockchain, which allows the organization running the national park determine where the heaviest traffic is and to allocate resources accordingly (e.g., staff up busy entrances).

Techniques described herein may provide security advantages over other techniques. For example, it should be noted that a consume asset transaction can be pre-signed by an issuer (or derived account) off-chain such that the issuer does not need to have access to the issuer's private key at the time and place where the second digital signature is contributed by the owner of an acquire asset transaction. Accordingly, there is less risk of losing cryptographic material in many scenarios—for example, a movie attendant may use a handheld device to consume tickets and the handheld device is not required to store the movie attendant's private key used to sign consume asset transaction. This may have at least two advantages—first, secure storage of cryptographic material often requires a hardware security module (HSM) or other suitable hardware for secure storage of cryptographic material that prevents unauthorized access (e.g., including physical access to data storages system where keys are persisted); and second, loss of the handheld device (e.g., theft or oversight) does not result in the loss of cryptographic material, which could otherwise necessitate deprecating a private key which might be in the possession of an adversary.

Figure 14:
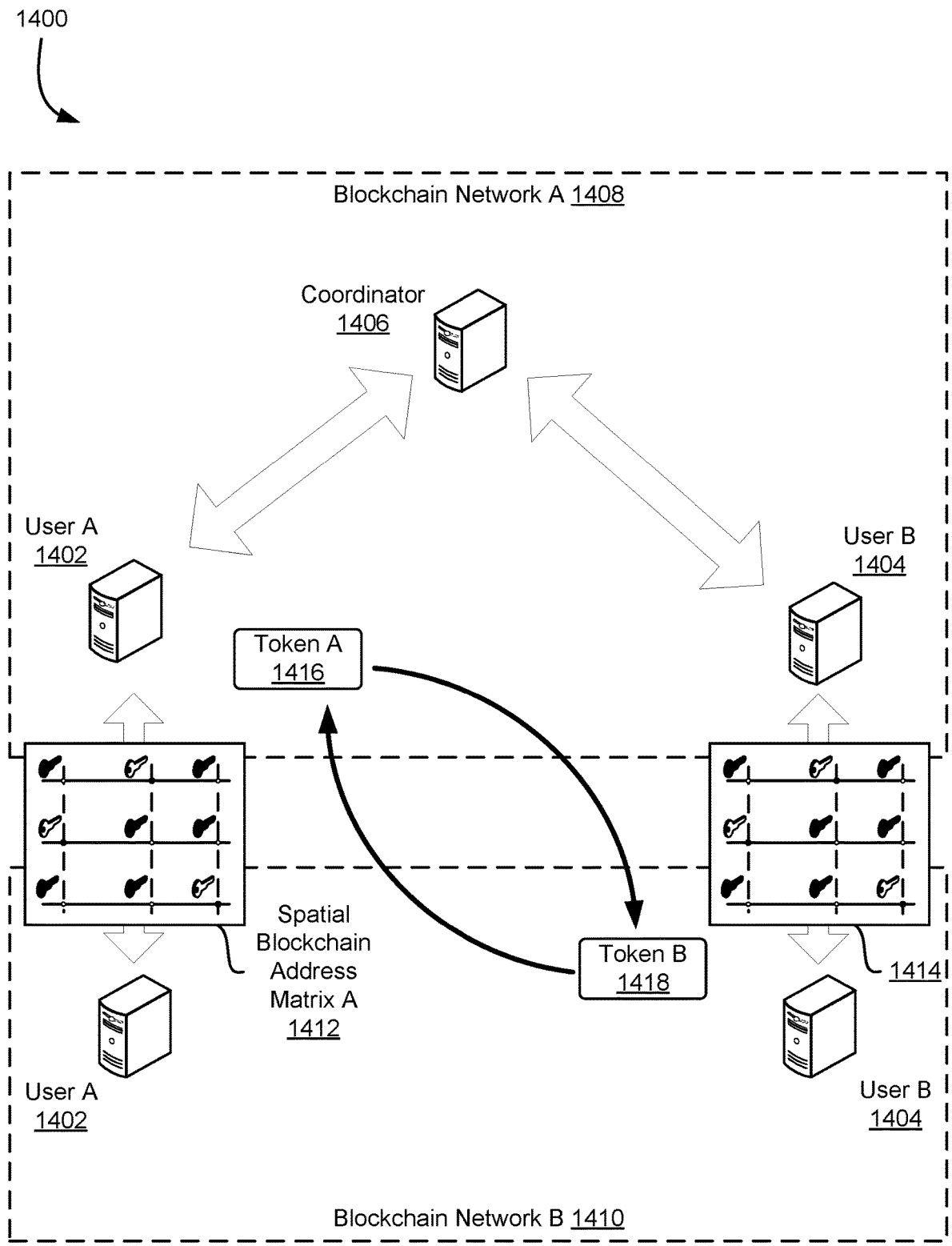
FIG. 14 illustrates a computing environment which may be used to implement a system that supports an exchange of digital assets across different blockchain networks, in accordance with at least one embodiment.

FIG. 14 illustrates a computing environment 1400 in which an embodiment may be practiced. The computing environment 1400 may be used to implement a system that supports cross-chain transactions. FIG. 14 illustrates cross-chain exchange of digital assets, in accordance with at least one embodiment. Techniques described in connection with FIG. 14 may be applicable to embodiments described elsewhere in this disclosure, such as in FIGS. 15-24. Computing entities such as first user (e.g., User A 1402), second user (e.g., User B 1404), and coordinator 1406 may be implemented as computing entities in accordance with FIGS. 15-24.

User A 1402 may refer to an entity that participates and/or is a user of both a first blockchain network 1408 and a second blockchain network 1410. User A 1402 may be associated with (e.g., control) with a first blockchain address on the first blockchain network and a second blockchain address on the second blockchain network. User A 1402 may be associated with decentralized identifiers across multiple blockchain networks. User A may be associated with spatial blockchain address matrix 1412. A spatial blockchain address matrix 1412 may refer to a collection of blockchains associated with a blockchain users which is arranged in a multi-dimensional grid of identifiers associated with a single blockchain user. A blockchain user may control or otherwise own each blockchain address of a spatial blockchain address matrix and have access to sufficient cryptographic material to generate cryptographically verifiable attestations of control for each blockchain address in the spatial blockchain address matrix. A spatial blockchain address matrix may comprise a set of decentralized identifiers and a set of shadow blockchain addresses generated in accordance with techniques described in connection with FIGS. 15-16.

User B 1404 may be similar to User A 1402 in various respects. For example, user B 1404 may participate in both a first blockchain network 1408 and a second blockchain network 1410. User B may be a second user that is associated with decentralized identifiers across multiple blockchain networks. User B 1404 may be associated with a second spatial blockchain address matrix 1416 comprising different decentralized identifiers and different shadow blockchain addresses from those discussed in connection with User A 1402.

Coordinator 1406 may be a computing entity on the first blockchain 1408 that is used to coordinate cross-chain exchange of digital assets. In some cases, there is no formal process for becoming a coordinator and the coordinator 1406 is able to self-select and broadcast to the blockchain network 1408 that it is a coordinator. A coordinator may be required to stake an amount of value of digital assets t which may be used to help resolve disputes in which the coordinator 1406 does not act in accordance with a prescribed protocol. In some cases, the stake cannot be withdrawn by the coordinator 1406 unless certain conditions are met—for example, there may be a configurable threshold after the last tether is successfully withdraw that the coordinator's stake is returned, the threshold allowing for clients that utilize coordinator in cross-chain transactions to initiate protocol disputes, such as those discussed in connection with FIGS. 22-24. In some cases, the time threshold is 30 days, after which withdrawal of the stake may be allowed by the blockchain network 1408.

Coordinator 1406 may have a deposit cap that corresponds to a maximum amount or value of deposits that the coordinator 1406 can receive in a deposit pool. Digital assets and tokens of a deposit pool may be controlled by coordinator 1406 but be subject to conditions, such as being subject to revocation as described in connection with FIG. 22. In at least some embodiments, this deposit cap is equal to or less than the total amount or value that the coordinator stakes to the blockchain.

User A 1402 may have control of Token A 1416 (e.g., an illustrative example of a digital asset) on the first blockchain network 1408 and User B may have control of Token B on a second blockchain network and the users may jointly execute a protocol to exchange those tokens. Tokens described in this context may refer to digital assets which may be controlled by a party, and control of which may be transferred to other entities through blockchain transactions. Digital assets may include fungible digital assets which are largely interchangeable (e.g., Bitcoin balance) and non-fungible digital assets (e.g., a token that grants access to a specific seat on a specific commercial flight, which may not be exactly the same as any other token).

User A 1402, which may be referred to as "Alice" throughout this disclosure, may be referred to as the first user or a user that initiates a deposit tether blockchain transaction. Alice® may refer to the extended decentralized identifier for Alice on the first blockchain 1408 and Alice1 may refer to the extended decentralized identifier for Alice on the second blockchain 1410. User B 1404, which may be referred to as "Bob" throughout this disclosure, may be referred to as a second user that initiates an exchange of digital assets on the second blockchain network 1410. The second blockchain 1410 may be referred to as a remote blockchain, reflecting that it is remote from the coordinator and tether. An exchange of digital assets on the remote blockchain may be a one-way exchange, where Bob receives nothing in return. Bob0 may refer to the extended decentralized identifier for Alice on the first blockchain 1408 and Bob1 may refer to the extended decentralized identifier for Alice on the second blockchain 1410. In some cases, User A transfers Token A 1416 from Alice® to Alice1 (e.g., a shadow blockchain account) on the first blockchain network.

Figure 15:
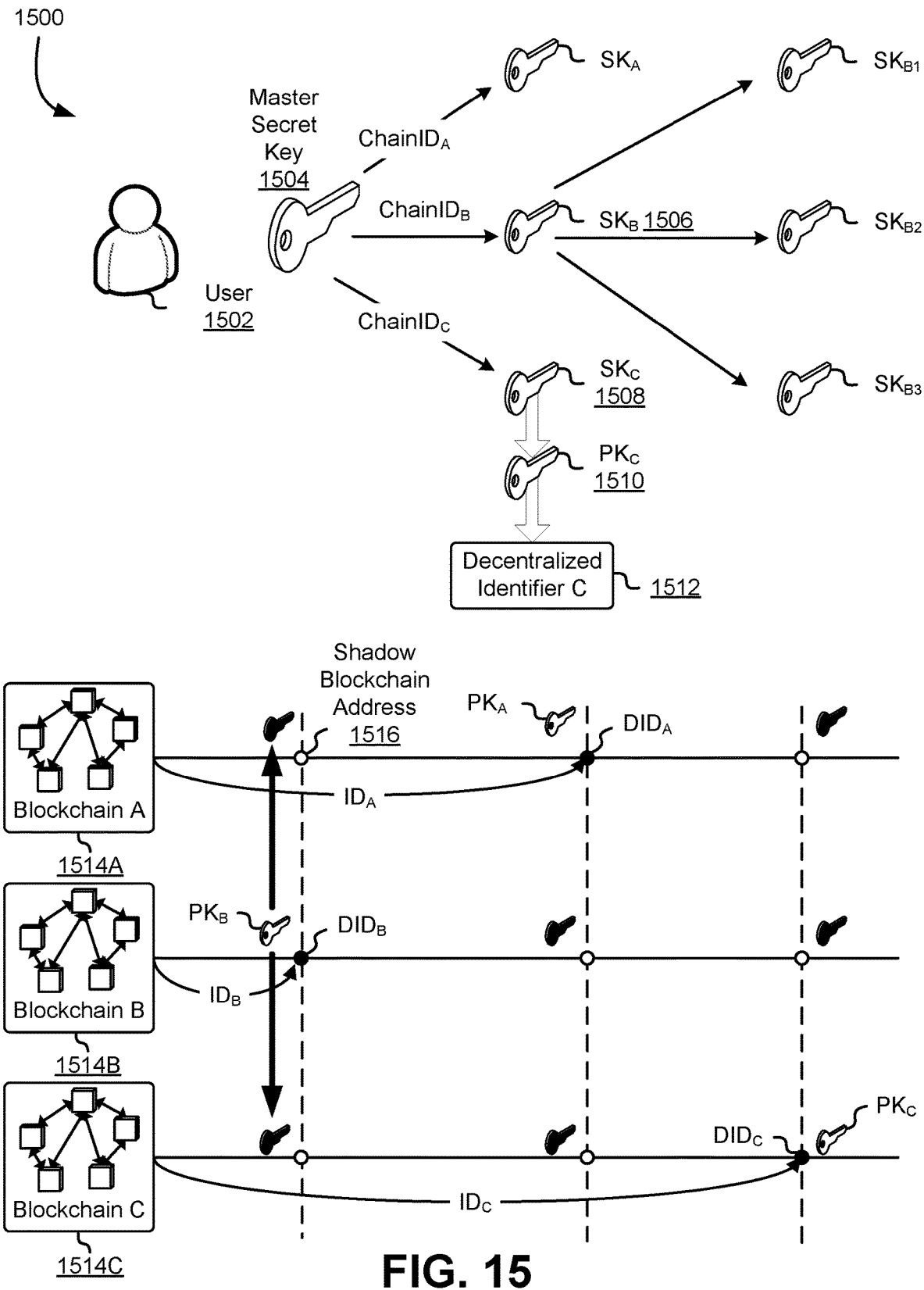
FIG. 15 illustrates cross-blockchain decentralized identification, in accordance with at least one embodiment.

FIG. 15 illustrates a diagram 1500 in which an embodiment may be practiced. The diagram 1500 may be used to implement a system that supports cross-chain transactions. FIG. 15 illustrates, in accordance with at least one embodiment. Techniques described in connection with FIG. 15 may be applicable to embodiments described elsewhere in this disclosure, such as in FIGS. 14 and 16-24. FIG. 15 illustrates cross-blockchain decentralized identification.

Decentralized identification may refer to identification of computing entities in a computing environment in which identities and identification information is generated in a decentralized manner. Decentralized identification may refer to identity (e.g., identifier) generation that does not require a centralized authority. Decentralized identification may be contrasted to traditional identification in which identities are issued by a central authority. An example of traditional, non-decentralized identification is issuance of passport numbers by a government organization—an individual relies upon a central authority to obtain an identification number and is not allowed to unilaterally determine an identifier.

One or more embodiments described herein may utilize techniques described in connection with W3C Credentials Community Group Decentralized Identifiers (DIDs) v0.13 (accessible at https://w3c-ccg.github.io/did-spec/) and/or ArcBlock DID Auth Protocol (accessible at https://arcblock.github.io/abt-did-spec/), all of which are hereby incorporated by reference.

User 1502 may be a user of at least one blockchain network. In some cases, user 1502 is a user on multiple blockchain networks. User 1502 may be associated to a blockchain address which serves as a unique identifier for that user on a particular blockchain network. In some embodiments, a user of a blockchain network is able to choose an identifier (e.g., blockchain address) which may be used to identify the user. In some embodiments, user 1502 mathematically derives a blockchain address.

A master secret key 1504 may be generated by user 1502. Master secret key 1504 may be any suitable cryptographic secret which, to maintain cryptographic assurances of confidentiality, should not be divulged to an unauthorized party. A private key of an asymmetric key pair is an example of a secret. In some embodiments, master secret key 1504 is generated based on a password or secret phrase that user 1502 selects. In some embodiments, master secret key 1504 is generated based at least in part on random or pseudo-random data, such as a random or pseudo-random seed that is used in conjunction with a generator to produce master secret key 1504. Master secret key 1504 can be used to derive blockchain-specific keys. In some cases, master secret key 1504 is not directly used on any specific blockchain.

A key stretching or key derivation routine may use master secret key 1504 to generate a derived key such as keys $SK_A$, $SK_B$, and $SK_C$ illustrated in FIG. 15. An example of a key derivation routine is Password-Based Key Derivation Function 2 (PBKDF2). In an embodiment, a system, such as those described in connection with other figures of this disclosure, determines whether to perform a key stretching or key derivation routine by determining the security level of the access key and whether it is sufficiently strong. It should be noted that the strength of a key, in an embodiment, refers to how resilient a particular key, under a cryptographic algorithm, is to an attack by an adversary, such as a brute force attack.

For example, master secret key 1504 can be used to generate a derived key using PBKDF2:

$$SK_A = PBKDF2(MSK, ChainID_A)$$

where MSK refers to master secret key 1504 and $ChainID_A$ is a blockchain identifier utilized as a salt value—it should be noted that the salt values can be any suitable value so long as they are different from each other. In some embodiments, a separate salt value Salta is utilized as a salt and $ChainID_A$ is otherwise utilized in the key derivation, for example by being concatenated to the input key. For example, a system may perform a lookup using techniques similar to a DNS lookup table to resolve a particular blockchain network to a particular value, such as by incorporating techniques related to how a DNS lookup table resolves a particular website address (e.g., www.website.com) to a particular IP address (e.g., 45.60.77.250). Salt values can be combined with the input key in any suitable manner and that the concatenation of master secret key with the salt values is merely described as a non-limiting illustrative example in accordance with one embodiment. It should be further noted that key stretching techniques suitable for deriving keys of any suitable length and are, in an embodiment specifiable by a client—for example, a client can specify a desired key length of 512-bits, 1024-bits, 2048-bits, and more. In an embodiment, any suitable key stretching or key derivation routine can be utilized in place of PBKDF2. In an embodiment, a suitable key stretching or key derivation function utilizes a hash-based message authentication code (HMAC) function.

User 1502 may use master secret key 1504 to generate private keys for each blockchain that the user is connected to. For example, user 1502 may be connected to a plurality of N blockchain networks. Each of blockchain network may have a different identifier $ChainID_1 \ldots ChainID_N$ which are used to generate respective secret private keys $SK_1 \ldots SK_N$. For example, a first blockchain network may be a Bitcoin-based network, a second blockchain network may be an ArcBlock-based network, and a third blockchain network may be an application chain. For example, a blockchain private key $SK_B$ 1506 may be utilized as a private key for generating digital signatures associated with a wallet address of user 1502 on blockchain B in lieu of using master secret key 1504 directly on blockchain B (e.g., master secret key 1504 is not used to generate digital signatures or otherwise directly generate cryptographic outputs that are broadcasted to blockchain B). In some embodiments, a key such as blockchain private key $SK_B$ 1506 may be used to generate additional derived keys in the same or similar manner. For example, a user may create a blockchain private key $SK_B$ 1506 and exclusively use derived keys $SK_{B1} \ldots SK_{BN}$ to generate digital signatures on blockchain B. In some cases, child keys $SK_{B1} \ldots SK_{BN}$ may be generated for specific uses, for example, to interact with a specific blockchain user.

In some embodiments, a private key is used to derive a corresponding public key. In an embodiment, private key $SK_C$ 1508 is used to generate public key $PK_C$ 1510 based at least in part on a generator g (not shown in FIG. 15). In an embodiment, a set of domain parameters are selected and made public. In an embodiment, the domain parameters include a finite cyclic group G of order n and a generator g which is an element of G. In an embodiment, an asymmetric public key is derivable from a generator and a corresponding private key—in an embodiment, $Q_A = g^{d_A}$ where g is an element of a finite cyclic group G of order n, $d_A$ is a private key, and $Q_A$ is a corresponding public key.

In an embodiment, a public key is used to generate a decentralized identifier. For example, a decentralized identifier may be generated based at least in part on a hash out of a public key. For example, Decentralized Identifier C 1512 may be generated based at least in part on a hash of public key $PK_C$ 1510. In an embodiment, a private key SK is computed using a random or pseudo-random number and a corresponding public key PK is generated from the private key SK, for example, using a generator point. DID may be generated by selecting a DID type with parameters such as DSA algorithm, role of the DID (e.g., application, device, account), hash algorithm associated with the DID (e.g., SHA2, SHA3, KECCAK-based hashes). Some or all of the parameters may be encoded to a bit stream which is combined with a public key or portion thereof, and the combined bit stream may be hashed using an indicated parameter.

The bottom half of FIG. 15 illustrates a plurality of blockchain networks 1514A, 1514B, 1514C . . . 1514N and a spatial blockchain address matrix, in accordance with at least one embodiment. In at least one embodiment, a user is associated with decentralized identifiers which may be used as blockchain addresses for the user. In some cases, a user generates at least one DID for each blockchain network that the user is a part of and each DID has a corresponding public key. For example, user 1502 may have a first blockchain address that is or is based on $DID_A$ and a corresponding public key $PK_A$. Likewise, user 1502 may select a second blockchain address based at least in part on $DID_B$ which has a corresponding public key $PK_B$, and so on.

A spatial blockchain address matrix may refer to a collection of blockchains associated with a blockchain users which is arranged in a multi-dimensional grid of identifiers associated with a single blockchain user. A blockchain user may control or otherwise own each blockchain address of a spatial blockchain address matrix and have access to sufficient cryptographic material to generate cryptographically verifiable attestations of control for each blockchain address in the spatial blockchain address matrix.

A blockchain user may generate one or more private/public key pairs for each blockchain network of a plurality of blockchain network. Private/public keys (i.e., asymmetric key pairs) may be generated in any suitable manner, and may rely on key derivation functions, domain parameters, for example. The blockchain user may derive a decentralized identifier from the asymmetric key pair (or a portion thereof) that serves as a blockchain address on a blockchain network for which the blockchain user can be identified. The decentralized identifier may be generated further at least in part on an identifier associated with the blockchain network.

For example, a user may perform a process or method for creating a blockchain address for use on blockchain network 1514B. The user may use a random or pseudo-random number generator to determine a private key $SK_B$. The private key $SK_B$ may be used to generate a public key $PK_B$. For example, $SK_B$ may be a randomly selected integer suitable for elliptic curve cryptography and $PK_B$ may be a result of an elliptic curve point multiplication based on $SK_B$ and a generator point. Generally speaking, in at least some embodiments, a public key can be derived from a private key using a suitable one-way function and may utilize nonces or salts. A decentralized identifier $DID_B$ may be generated based at least in part on the public key $PK_B$. Decentralized identifier $DID_B$ may be directly or indirectly generated, at least in part, from $ID_B$, an identifier associated with blockchain network B 1514B. For example, $PK_B$ may be generated using identifier $ID_B$ as a salt value of PBKDF2 key derivation function. For example, $ID_B$ may be an input to a hash function that generates, a hash output that is used as $DID_B$. These techniques may be used to generate other keys and DIDs for other blockchain networks.

A spatial blockchain address matrix is generated based at least in part on a plurality of decentralized identifiers $DID_A$, $DID_B \ldots DID_N$, in accordance with at least an embodiment. Accordingly, decentralized identifier $DID_A$, $DID_B \ldots DID_N$ generated (e.g., directly or indirectly) using blockchain chain identifiers may be generated along two dimensions of a spatial blockchain address matrix—a first dimension defined by a first domain of address space of a blockchain network and a second dimension defined based on a second domain of blockchain network identifiers. A domain may refer to a domain in the mathematical sense and in accordance with mathematical set theory.

A spatial blockchain address matrix may comprise a set of decentralized identifiers and a set of shadow blockchain addresses. In at least some embodiments, a shadow blockchain address is generated based on first and second domain spaces of a first and second decentralized identifier. For example, shadow blockchain address 1516 illustrated in FIG. 15 may be generated based on a first domain value of a first decentralized identifier $DID_B$ and a second domain value of a second decentralized identifier $DID_A$. A shadow blockchain address 1516 generated based at least in part from properties of a first and second decentralized identifiers may be utilized to facilitate communications and exchanges between the first and second decentralized identifiers. For example, a digital asset under control of a first blockchain account $DID_A$ of a user may be transferred to a shadow blockchain address that is generated based at least in part on a second blockchain account $DID_B$ of the user, wherein the first blockchain account $DID_A$ is associated with a first blockchain network and the second blockchain account $DID_B$ is associated with different second blockchain network. The aforementioned user may generate, on the second blockchain network, an attestation of control of the digital asset based on an ability of the user to control the shadow blockchain address, and that digital asset may be transferred as part of a blockchain transaction processed and mined at least in part on the second blockchain network. For example, a token controlled by a second user of the second blockchain network may be exchanged for the digital asset, which may be implemented in accordance with techniques described elsewhere in this disclosure such as those discussed in connection with FIGS. 16-24.

In some embodiments, a spatial blockchain address matrix is an N*M matrix comprising N decentralized identifiers that are blockchain addresses under control of a user and (N-1)*M shadow blockchain addresses. Shadow blockchain addresses may be under control of the user by virtue of at least one decentralized identifier being under control of the user. A spatial blockchain address matrix may include fewer than (N-1)*M shadow blockchain addresses. In some embodiments, a public key associated with a decentralized identifier on a first blockchain network can be used in connection with a shadow blockchain address of a second blockchain network. A public key of a first blockchain network can be used to determine a shadow public key of a shadow blockchain address. For example, if a shadow blockchain address of a first blockchain network has a value that matches a decentralized identifier of a second blockchain network, a public key used to derive the decentralized identifier may be a shadow public key of the first blockchain network. A user which has access to a private key associated with a decentralized identifier may also have access to a shadow private key that can be used to attest to control of a shadow blockchain address. For example, public key $SK_B$ of blockchain network 1514B may be used to generate a digital signature attesting to control of shadow blockchain address 1516 on blockchain network 1514A.

Figure 16:
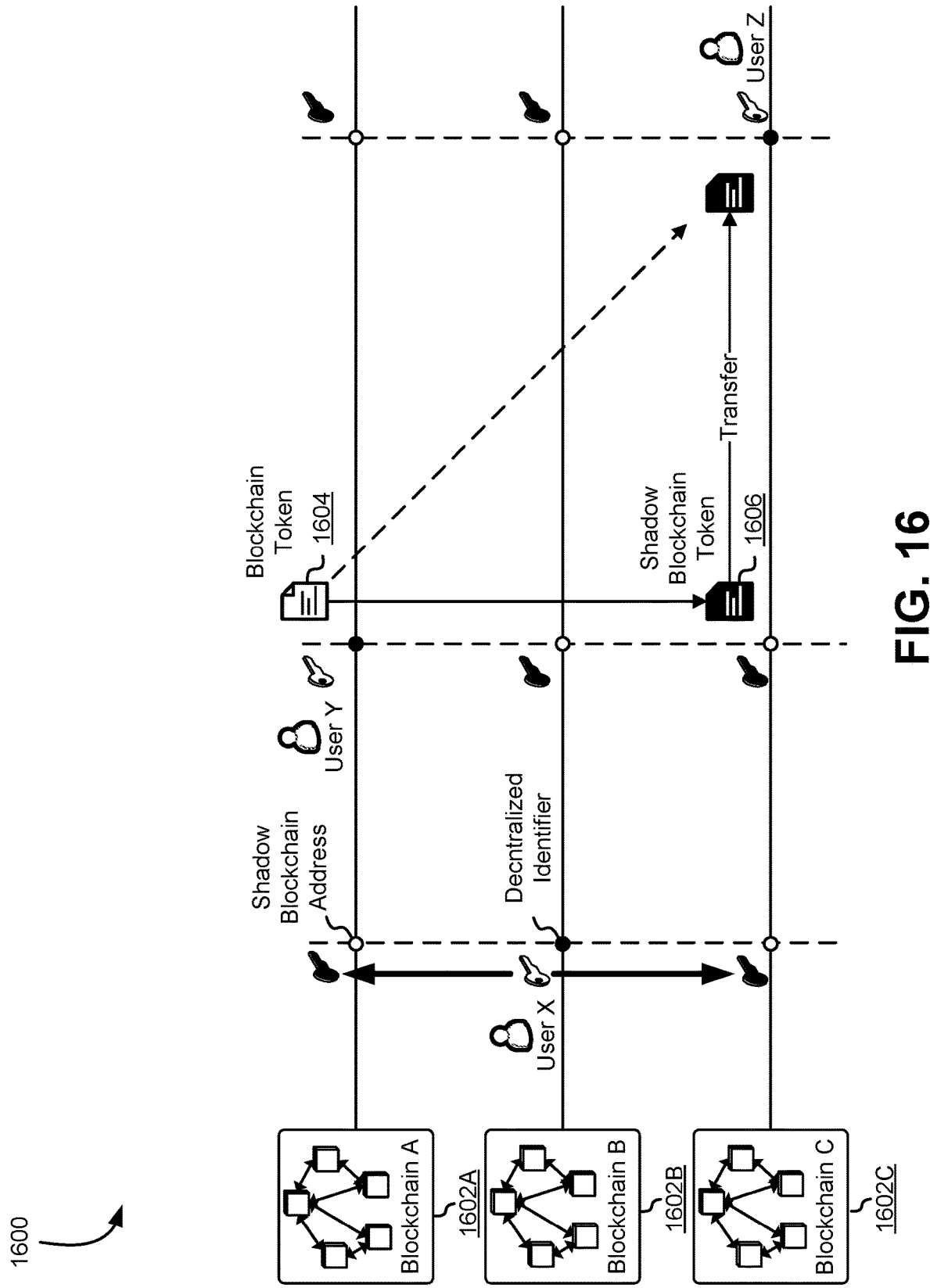
FIG. 16 illustrates cross-blockchain decentralized identification, in accordance with at least one embodiment.

FIG. 16 illustrates a diagram 1600 in which an embodiment may be practiced. The diagram 1600 may be used to implement a system that supports cross-chain transactions. FIG. 16 illustrates, in accordance with at least one embodiment. Techniques described in connection with FIG. 16 may be applicable to embodiments described elsewhere in this disclosure, such as in FIGS. 14-15 and 17-24.

FIG. 16 illustrates a plurality of blockchain networks 1602A, 1602B, 1602C which are illustrative of an example plurality of blockchain networks. Each blockchain network may have an associated identifier that uniquely identifies the blockchain network. The blockchain networks described in connection with FIG. 16 may be in accordance with those discussed elsewhere in this disclosure.

A user of a blockchain network may be associated with an identifier that serves as a blockchain address which other uses can use to interact with the user, such as determining an address to transfer control of a digital asset to. In some embodiments, an entity such as a human manages interacts with multiple blockchain networks and controls at least one blockchain address on each of the blockchains. In some embodiments, a user or entity establishes a spatial blockchain address matrix comprising a set of decentralized identifiers and shadow blockchain addresses under the control of a user. For example, FIG. 16 illustrates a first user X that controls a decentralized identifier of blockchain network 1602B and two shadow blockchain addresses 1602A and 1602C. Users X, Y, and Z illustrated in FIG. 16 may correspond to different logical/physical entities.

Blockchain token 1604 may be a digital asset under control of User Y, control of which is transferred to User Z. In some embodiments, User Y creates a shadow token 1606 on blockchain network 1602C based on blockchain token 1604 controlled by User Y on blockchain network 1602A. The shadow blockchain token 1606 may reference blockchain network 1602A and an address associated with blockchain token 1604 and a cryptographically verifiable attestation of control of blockchain token 1604. User Y may have a $DID_Y$ on blockchain network 1602A and blockchain token 1604 may be controlled by User Y based on the user having access to a corresponding private key $SK_Y$ that can be used to generate digital signatures for $DID_Y$. User Y may further control a shadow blockchain address on blockchain network 1602C based on having access to $SK_Y$. User Y may generate a shadow blockchain token 1606 that (1) attests to control of a blockchain token on blockchain network 1602A and (2) is digitally signed using a private key, wherein the digital signature is cryptographically verifiable using a public key associated with the shadow blockchain address. Since User Y controls $SK_Y$, can derive $PK_Y$, and the shadow blockchain address may be generated from a one-way function using $PK_Y$ as an input, User Y is able to control the shadow blockchain address and create shadow blockchain token 1606. In some embodiments, User Y creates a reference to shadow blockchain token 1606 on blockchain network 1602A that indicates blockchain token 1604 is tethered to shadow blockchain token 1606.

In some embodiments, shadow blockchain token 1606 is transferred from User Y to User Z on blockchain network 1602C, thereby transferring control of blockchain token 1604 to User Z, who may be a different entity from User Y. For example, User Y may be a first organization and User Z may be a second organization, which operate independently of each other. In some cases, control of shadow blockchain token 1606 is sufficient to indicate control of blockchain token 1604 and can be used to consume, redeem, or exhaust blockchain token 1604. For example, redemption of shadow blockchain token 1606 on a second blockchain may consume, redeem, or exhaust a blockchain token 1604 located on a different blockchain network. In some cases, cross-chain transaction protocols include additional safe guards against undesired behavior, such as User Y attempting to transfer blockchain token 1604 despite having transferred control of shadow blockchain token 1606. However, in some contexts, such as those in which User Y and User Z have other safeguards in place, such as contractual obligations or cooperation in such a respect can be expected or guaranteed in other ways, additional safeguards such as the use of a coordinator (e.g., as described in connection with FIG. 17) may be optional.

Figure 17:
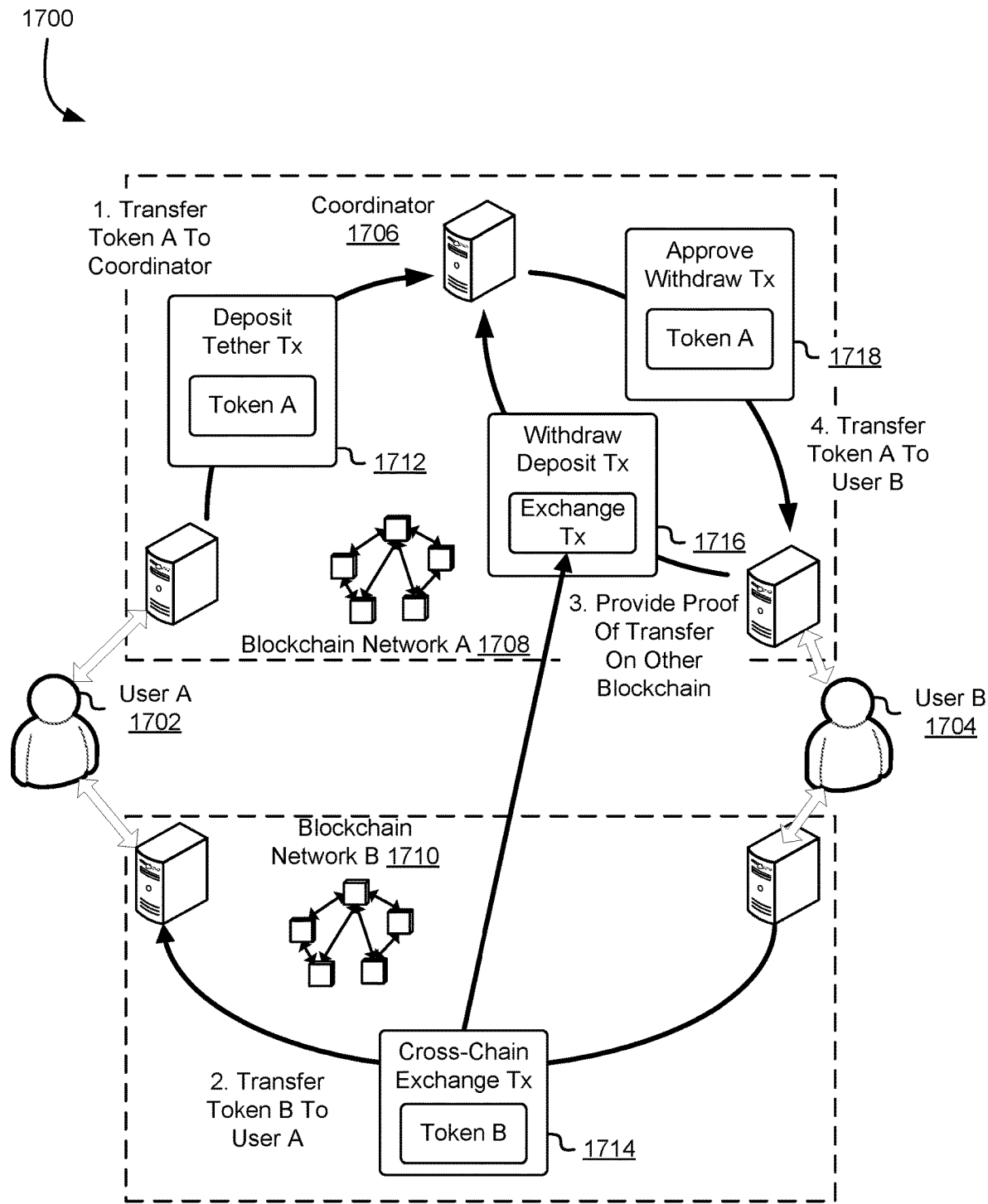
FIG. 17 illustrates a computing environment which may be used to implement a system that supports cross-chain transactions, in accordance with at least one embodiment.

FIG. 17 illustrates a computing environment 1700 in which an embodiment may be practiced. The computing environment 1700 may be used to implement a system that supports cross-chain transactions. FIG. 17 illustrates, in accordance with at least one embodiment. Techniques described in connection with FIG. 17 may be applicable to embodiments described elsewhere in this disclosure, such as in FIGS. 14-16 and 18-24. FIG. 17 illustrates, in at least one embodiment, a protocol for performing a cryptographically verifiable and programmatically enforceable protocol for transferring digital assets between User A 1702 and User B 1704. User A may control a first digital asset on a first blockchain network, indicated as blockchain network A 1708, and User B may control a second digital asset on a second blockchain, indicated as blockchain network B 1710. Blockchain network B 1710 may be referred to as a remote blockchain throughout this disclosure, as the blockchain network is a different blockchain that is logically separated from coordinator 1706 and from blockchain network A 1708.

User A 1702 may refer to a first entity that participates in both a first blockchain network and a second blockchain network. For example, User A may use techniques described in connection with FIGS. 15-16 to generate a decentralized identifier for each blockchain network that the user participates in. Decentralized identifiers may be utilized by users as blockchain addresses on the respective blockchain networks. User A may utilize different computer systems to participate in blockchain networks or utilize the same computer (not illustrated in FIG. 17). User A may control Token A—a digital asset on a first blockchain network—and perform a cross-chain transaction in which control of Token A is transferred to User B in exchange for control of Token B controlled by User B 1704 may refer to a different second entity that participates in both blockchain networks in the same or similar manner as User A—for example, User B may control blockchain addresses on both blockchain networks, and User B may have control of a digital asset (e.g., Token B) which is to be transferred to User A as part of a cross-chain transaction.

In at least one embodiment, a first user and a second user are jointly agree to perform an exchange of digital assets across two or more blockchains. For example, User A 1702 and User B 1704 may connect to each other (e.g., on or off of a blockchain network) and jointly agree to make an exchange of Token A for Token B. A cross-chain transaction may be initiated based on communications between User A and User B where they agree on the digital assets to transfer prior to initiating an on-chain protocol. These communications may involve querying what digital assets are under control of the counterparty.

A cross-chain transaction may begin with a first user generating a deposit tether blockchain transaction 1712 that transfers control of a digital asset to a coordinator 1706 on a first blockchain network. The coordinator 1706 may be any suitable computing entity and may be in accordance with those described elsewhere in this disclosure. Coordinator 1706 may be connected to the first blockchain network but not a second blockchain network. In some cases, the deposit tether blockchain transaction 1712 further includes a charge and/or commission, as described in greater detail elsewhere in this disclosure. The deposit tether blockchain transaction 1712 may be broadcasted to the first blockchain network and mined to a block.

User B 1704 may query the first blockchain network, determine that the deposit tether blockchain transaction was accepted to the first blockchain, and broadcast a cross-chain exchange blockchain transaction 1714 to User A 1702 on a second blockchain network. The cross-chain exchange blockchain transaction 1714 may include a transfer of a digital asset (e.g., Token B) which User B has control over on the second blockchain network to a blockchain address associated to User A on the second blockchain network. In some cases, cross-chain exchange blockchain transaction 1714 may include a transfer of a digital asset or token from User A 1702 to User B 1704 on the second blockchain as well. For example, blockchain network B 1710 may be an application chain that is generated by an organization that sells movie tickets as tokens on the second blockchain network—a customer may purchase the ticket using assets on a different blockchain (e.g., Bitcoin network, different from the application chain) in addition to digital assets on the application chain (e.g., a digital coupon that reduces the value of digital assets the customer is to exchange from the other blockchain network). The cross-chain exchange blockchain transaction 1714, in an embodiment, includes a reference to the deposit tether blockchain transaction 1712 broadcasted on the first blockchain network.

Once the cross-chain exchange blockchain transaction 1714 is processed and accepted to the second blockchain, User B 1704 may generate a withdraw deposit blockchain transaction 1716 that acts as a proof of transfer of digital assets on the other blockchain. In some embodiments, the entire cross-chain exchange blockchain transaction 1714 is encoded in the withdraw deposit blockchain transaction 1716. A withdraw deposit blockchain transaction 1716 may be processed by verifying a digital signature of User B over the withdraw deposit transaction is verified to be authentic, the cross-chain exchange blockchain transaction is correctly signed by both User A and User B, that the values and/or specific digital assets transferred are correct, and that User B had not previously submitted a request to release the tether on Token A.

Coordinator 1706 may verify that the withdraw deposit blockchain transaction 1716 was properly processed and that the cross-chain exchange blockchain transaction was broadcasted to the second blockchain network. Once the coordinator 1706 has verified that the transfer was made on the other blockchain, coordinator 1706 may generate an approved withdraw blockchain transaction 1718 that transfers control of Token A to User B 1704. Accordingly, FIG.

17 illustrates techniques to solve a technical problem with real-world applications by implementing a protocol to securely exchange control of a first digital asset on a first blockchain network for control of a second digital asset on a second blockchain network.

Figure 18:
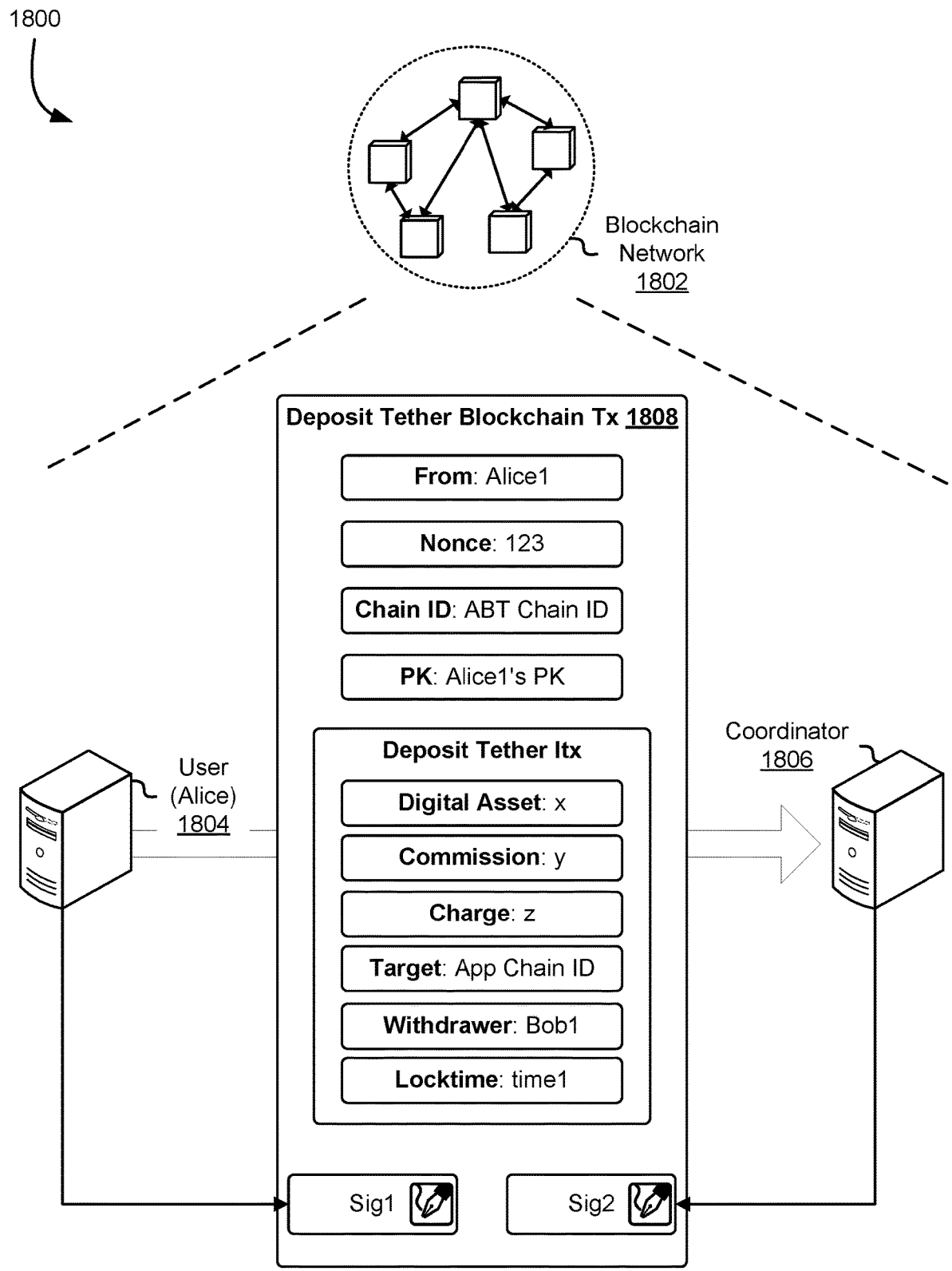
FIG. 18 illustrates a computing environment which may be used to implement a deposit tether blockchain transaction, in accordance with at least one embodiment.

FIG. 18 illustrates a computing environment 1800 in which an embodiment may be practiced. The computing environment 1800 may be used to implement a system that supports cross-chain transactions. FIG. 18 illustrates, in accordance with at least one embodiment. Techniques described in connection with FIG. 18 may be applicable to embodiments described elsewhere in this disclosure, such as in FIGS. 14-17 and 19-24. FIG. 18 illustrates, in at least one embodiment, a protocol for performing a cryptographically verifiable and programmatically enforceable protocol for cross-chain exchange of digital assets between two or more users.

Blockchain network 1802 may be in accordance with those described elsewhere in this disclosure. A user 1804 may transfer control of a digital asset x to a coordinator 1806 using a deposit tether blockchain transaction. User 1804 may be referred to as "Alice" or "User A" throughout. Deposit tether blockchain transaction 1808 may be broadcasted to blockchain network 1802, which may be the first network described in connection with FIG. 17. Blockchain network 1802 may be a different blockchain network from the blockchain network illustrated in FIG. 19.

A deposit tether blockchain transaction 1808 may include one or more of the fields illustrated in FIG. 18, and may include other fields not illustrated in FIG. 18 in various other embodiments. Deposit tether blockchain transaction 1808 may include a field that indicates the first user 1804 that is to transfer control of a digital asset to coordinator 1806 subject to a tether (e.g., digital assets are transferred to a deposit pool associated with coordinator 1806). Deposit tether blockchain transaction 1808 may include a nonce. A nonce can be an arbitrary number, such as a random or pseudo-random number. A nonce can be deterministically selected, for example, a timestamp or counter. Many cryptographic algorithms rely on the use of a cryptographic nonce, a number or bits of information that are to be only used once in a particular cryptographic context (e.g., encryption or digital signature generation), and may be necessary to properly perform decryption. A deposit tether blockchain transaction 1808 may include a chain identifier that uniquely resolves to blockchain network 1802, which is the blockchain network that the deposit tether blockchain transaction 1808 is to be broadcasted to. A deposit tether blockchain transaction 1808 may include a public key corresponding to the identity of the "From" field. The public key may be usable to verify a digital signature generated over the deposit tether blockchain transaction 1808 and may be used to provide cryptographically verifiable assurances of integrity, authenticity, and non-repudiation of the deposit tether blockchain transaction.

In some embodiments, first user 1804 Alice controls a blockchain address Alice® and also controls a shadow blockchain address generated based at least in part on a second blockchain network which the first user 1804 uses. "Alice1" illustrated in FIG. 18 may be a shadow blockchain address that the first user controls 1804. In some embodiments, Alice transfers digital asset x or equivalent from the blockchain address Alice® to the shadow blockchain address Alice1 which may be only visible to Alice, but is still publicly verifiable. "Alice0" may refer to Alice's blockchain address on blockchain network 1802, which may be in contrast to "Alice1" which may be used to reference a shadow blockchain address of Alice that is generated based at least in part on the blockchain network illustrated in FIG. 19. DID techniques described in connection with FIGS. 15-16 may be utilized to generate a spatial blockchain address matrix for Alice across multiple blockchain networks that includes DIDs and shadow blockchain accounts across the multiple blockchain networks.

A deposit tether blockchain transaction 1808 may include a deposit tether transaction information that includes subfields. Deposit tether transaction information may include a digital asset or token that is to be transferred. For example, "x" may represent a particular token or an amount of fungible digital assets to transfer to coordinator 1806. Deposit tether transaction information may include a commission which may be like the digital asset but having a different value "y" wherein $x > y$. The commission may be paid to coordinator 1806 for successful completion of a cross-chain exchange of digital assets. Deposit tether transaction information may include a charge which may be like the digital asset but have a different value "z" wherein $x > y > z$. The charge may be an amount of digital assets to reward coordinator 1806 if user 1804 revokes the tether on the digital asset x. Deposit tether transaction information may include a withdrawer, which indicates a blockchain address of a withdrawer, who may be referred to herein as a second user, "User B", or "Bob" in various context. The withdrawer address may be a blockchain address on blockchain network 1802 associated with the second user. Deposit tether transaction information may include a lock time, which may be a time stamp before which the tether is locked and the first user is disallowed from revoking the tether before the indicated time stamp. Control of digital assets x, y, and z transferred to coordinator 1806 may be subject to a tether, such that the coordinator's control of the digital assets is conditional—for example, digital assets x, y, and z may be non-fungible tokens which coordinator 1806 cannot unilaterally transfer to another entity besides User A and User B. For example, digital assets x, y, and z may be fungible digital assets and a balance of x digital assets may be transferred to a deposit pool associated with coordinator 1806 wherein the value of x may be subject to a tether which, if revoked, returns the value of x to the sender of the deposit tether blockchain transaction.

Fields of a deposit tether blockchain transaction 1808 may be populated and then, once formed, the blockchain transaction is digitally signed by the first user 1804 and then digitally signed by coordinator 1806. In some embodiments, the first signature by first user 1804 is a main signature that comes first and the second signature is a multi-signature signed by at least coordinator 1806 (e.g., signed by second user and coordinator). The hash of deposit tether blockchain transaction 1808 may be referred to as hash1 throughout this disclosure. Once both signatures have been contributed, the deposit tether blockchain transaction 1808 may be broadcasted to blockchain network 1802. Deposit tether blockchain transaction 1808 may be accepted by blockchain network 1802 if the following conditions are met: digital signature is correctly signed by first user 1804; digital signature is correctly signed by second user 1806 (e.g., in a multi-sig); values of digital assets $x > y > z$; the first user 1804 has control of digital asset referenced by x or otherwise has access to fungible tokens with value of x; and coordinator has not exceeded a maximum deposit amount. These conditions are merely illustrative and more or less or different conditions may exist.

As a result of deposit tether blockchain transaction 1808 being executed, the following changes may occur: control of digital assets is transferred from first user 1804 to coordinator 1806. For example, if "x" refers to a token, then control of the token may be transferred to coordinator 1806; if "x" refers to a fungible digital asset (e.g., balance of Bitcoin) then the corresponding value indicated in deposit tether blockchain transaction 1808 may be transferred from user 1804's digital wallet to coordinator 1806's digital wallet. A tether may be created in the chain state of the blockchain network 1802 wherein the address of the tether is generated based on hash1:

| | |
|---|---|
| Hash | Hash of deposit transaction (hash1) |
| Address | Address of the tether (addr1) |
| Available | Boolean indicating whether or not the tether is active (initialized to TRUE) |
| Coordinator | Address of coordinator (coordinator 1806) |
| Depositor | Address of depositor (Alice) |
| Withdrawer | Address of withdrawer (Bob) |
| Digital Asset | Value of digital asset (x) |
| Commission | Commission value (y) |
| Charge | Charge value (z) |
| Target | The DID of the chain where the tether will be used |
| LockTime | Time stamp before which the tether is locked |

In some embodiments, the deposit tether blockchain transaction is referenced by a cross-chain exchange blockchain transaction, such as those discussed in connection with FIG. 19. Digital assets (e.g., tokens) referenced in the tether may be digital assets which are encumbered by a set of conditions that restrict how and when the digital assets can be transferred. An encumbrance may encode the lock time, preventing the first user 1804 from revoking the deposit tether transaction before the lock time. Tethered digital assets may be placed in a deposit pool with a maximum cap that is determined based on how much the coordinator has staked to the blockchain network. The stake may be used as part of resolving disputes that may arise where the coordinator does not act according to the defined protocol for cross-chain exchange.

Figure 19:
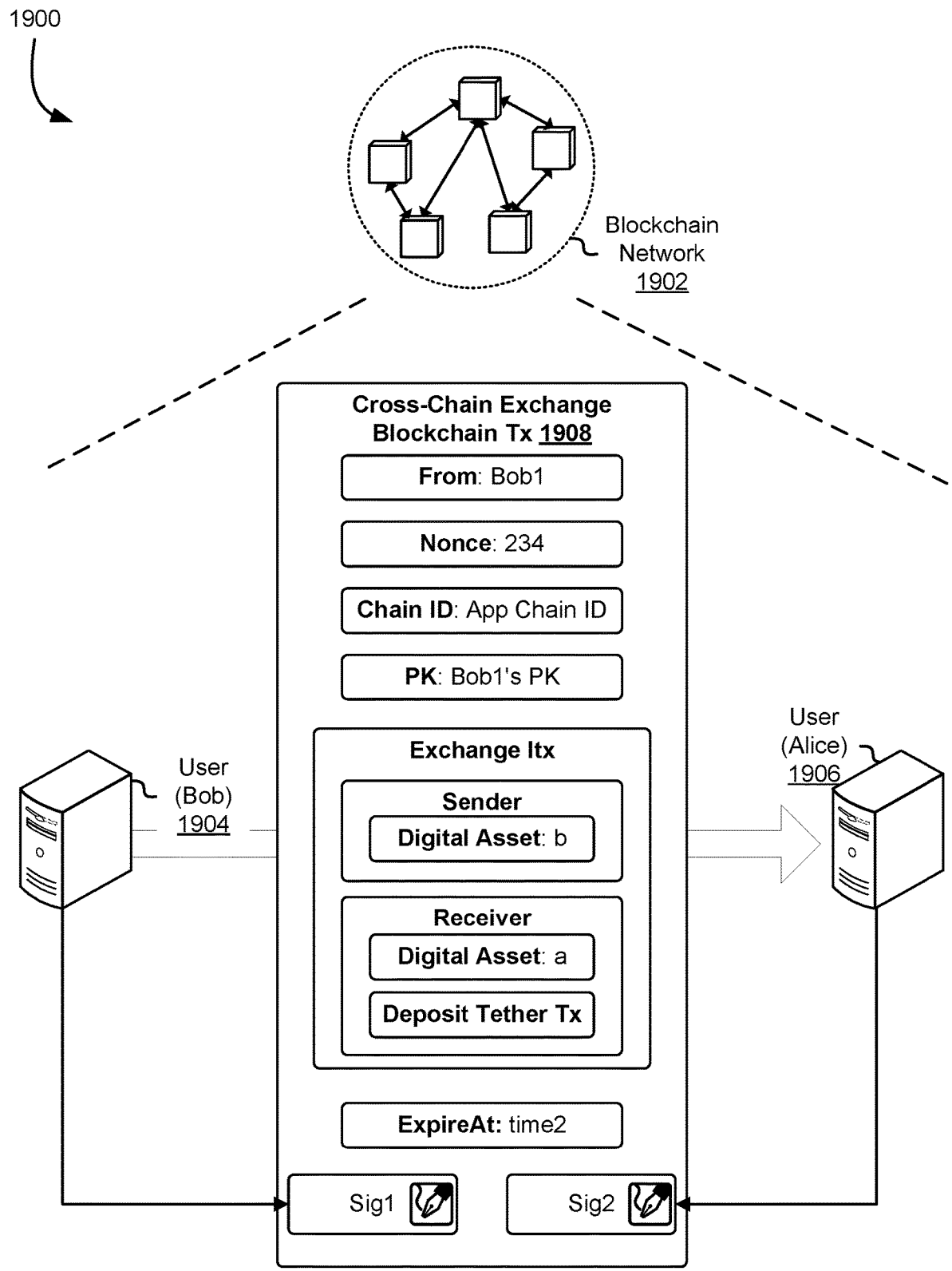
FIG. 19 illustrates a computing environment which may be used to implement a cross-chain exchange blockchain transaction, in accordance with at least one embodiment.

FIG. 19 illustrates a computing environment 1900 in which an embodiment may be practiced. The computing environment 1900 may be used to implement a system that supports cross-chain transactions. FIG. 19 illustrates, in accordance with at least one embodiment. Techniques described in connection with FIG. 19 may be applicable to embodiments described elsewhere in this disclosure, such as in FIGS. 14-18 and 20-24. FIG. 19 illustrates, in at least one embodiment, a protocol for performing a cryptographically verifiable and programmatically enforceable protocol for cross-chain exchange of digital assets between two or more users.

Blockchain network 1902 may be in accordance with those described elsewhere in this disclosure. A first user 1904 may transfer control of a digital asset b to a second user 1906 using a cross-chain exchange blockchain transaction. First user 1904 may be referred to as "Bob" or "User B" throughout. Second user 1906 may be referred to as "Alice" or "User A" throughout. Cross-chain exchange blockchain transaction 1908 may be broadcasted to blockchain network 1902, which may be the second blockchain network described in connection with FIG. 17. Blockchain network 1902 may be a different blockchain network from the blockchain network illustrated in FIG. 18.

Cross-chain exchange blockchain transaction 1908 may refer to a blockchain transaction on a first blockchain network that causes control of a digital asset on the first blockchain network to be transferred from one entity to another and furthermore references a blockchain transaction on a different second network that causes control of a different digital asset to be transferred (e.g., in reverse order of the transfer on the first blockchain network). In some cases, a first entity Alice generates and broadcasts a deposit tether blockchain transaction on a different blockchain network from blockchain network 1902 and Bob detects the deposit tether blockchain transaction on the different blockchain, which is a trigger or indication for Bob to generate the cross-chain exchange blockchain transaction 1908 on the blockchain network 1902. In some cases, Alice generates and broadcasts a deposit tether blockchain transaction on a different blockchain network from blockchain network 1902 and sends Bob a message or datagram that notifies Bob to generate the cross-chain exchange blockchain transaction 1908. The recipient blockchain address of the cross-chain exchange blockchain transaction 1908 may be determined based on the sender (e.g., "From" field) of the deposit tether blockchain transaction, for example, as described in connection with FIG. 18.

A cross-chain exchange blockchain transaction 1908 may include one or more of the fields illustrated in FIG. 19, and may include other fields not illustrated in FIG. 19 in various other embodiments. Cross-chain exchange blockchain transaction 1908 may include a field that indicates a sender entity, indicated as the "From" field in FIG. 19. "Bob1" may refer to Bob's blockchain address on blockchain network 1902, which may be in contrast to "Bob0" which may be used to reference Bob's blockchain address on the blockchain network illustrated in FIG. 18. DID techniques described in connection with FIGS. 15-16 may be utilized to generate a spatial blockchain address matrix for Bob across multiple blockchain networks that includes DIDs and shadow blockchain accounts across the multiple blockchain networks. Cross-chain exchange blockchain transaction 1908 may include a nonce. A nonce can be an arbitrary number, such as a random or pseudo-random number. A nonce can be deterministically selected, for example, a timestamp or counter. Many cryptographic algorithms rely on the use of a cryptographic nonce, a number or bits of information that are to be only used once in a particular cryptographic context (e.g., encryption or digital signature generation), and may be necessary to properly perform decryption. A cross-chain exchange blockchain transaction 1908 may include a chain identifier that uniquely resolves to blockchain network 1902, which is the blockchain network that the cross-chain exchange blockchain transaction 1908 is to be broadcasted to. A cross-chain exchange blockchain transaction 1908 may include a public key corresponding to the identity of the sender indicated in the "From" field. The public key may be usable to verify a digital signature generated over the cross-chain exchange blockchain transaction 1908 and may be used to provide cryptographically verifiable assurances of integrity, authenticity, and non-repudiation of the cross-chain exchange blockchain transaction 1908.

A cross-chain exchange blockchain transaction 1908 may include a cross-chain exchange information that includes sub-fields. Cross-chain exchange information may include sender digital assets. Sender digital assets may refer to digital assets that the sender is to contribute to the blockchain transaction. In some cases, the sender field includes a value of fungible digital assets that the first user 1904 is to send the second user 1906 and a blockchain address that corresponds to the fungible digital assets—under the first user's control on the blockchain network 1902—that the first user 1904 is contributing. For example, "b" may represent a particular token or an amount of fungible digital assets to transfer to second user 1906. For example, "b" may be access to a product or service.

Cross-chain exchange information may include receiver digital assets. In some cases, the receiver field includes a value of fungible digital assets that the second user 1906 is to send the first user 1904 and a blockchain address that corresponds to the fungible digital assets—under the second user's control on the blockchain network 1902—that the second user 1906 is contributing. For example, "a" may represent a particular token or an amount of fungible digital assets to transfer to first user 1904. For example, "a" may be a coupon that reduces the value to be paid in exchange for a product or service being offered by the first user 1904. In some cases, the receiver's contributions are optional and may be omitted from the cross-chain exchange blockchain transaction if the receiver's overall contributions are satisfied by the contributions made in the deposit tether blockchain transaction. Receiver field may also include a copy of the deposit tether blockchain transaction, including the digital signatures and public keys from another blockchain network.

Cross-chain exchange information may include an expiration time, which may be a time stamp after which the tether cannot be redeemed.

Fields of a cross-chain exchange blockchain transaction 1908 may be populated and then, once formed, the cross-chain exchange blockchain transaction 1908 is digitally signed by the first user 1904 and then digitally signed by the second user 1906. In some embodiments, the first signature by first user 1904 is a main signature that comes first and the second signature is a multi-signature signed by at least the second user 1906. Once both signatures have been contributed, the cross-chain exchange blockchain transaction 1908 may be broadcasted to blockchain network 1902 to be processed, validated, and confirmed. Cross-chain exchange blockchain transaction 1908 may be accepted by blockchain network 1902 if the following conditions are met: digital signature is correctly signed by first user 1904; digital signature is correctly signed by second user 1906 (e.g., in a multi-sig); deposit tether blockchain transaction encoded in cross-chain exchange blockchain transaction 1908 is correctly signed; the first user controls digital asset b or equivalent; the second user controls digital asset a or equivalent; time2 (e.g., the ExpireAt specified in the blockchain transaction) is not later than the current block time; every deposit in receiver field is valid, which may include verifying that the deposit tether blockchain transaction has not appeared on the blockchain network 1902 before (e.g., preventing a replay attach), the target of the deposit tether blockchain transaction is the chain ID specified in the outer cross-chain exchange blockchain transaction field, the withdrawer is the first user 1904, the deposit is issued by the second user 1906, and that the deposit is correctly signed by the coordinator (e.g., coordinator described in connection with FIG. 18). These conditions are merely illustrative and more or less or different conditions may exist.

The first user 1904 may be responsible for calculating the hash of the deposit tether blockchain transaction (e.g., encoded in the cross-chain exchange blockchain transaction 1908), which should equal hash1, as described above. The first user 1904 may further check whether the tether corresponding to hash1 exists (e.g., on the blockchain network illustrated in FIG. 18) and verify that it has not been already been withdrawn. The first user 1904 may set a reasonable ExpireAt time to ensure that there is enough time to redeem the tether. After performing some or all of the actions described in this paragraph, the first user 1904 may contribute the first digital signature Sig1 to cross-chain exchange blockchain transaction 1908. The second user 1906 may receive cross-chain exchange blockchain transaction 1908 and contribute Sig2, the second signature, after Sig1 is contributed, review the field values of cross-chain exchange blockchain transaction 1908, and then contribute a second digital signature to cross-chain exchange blockchain transaction 1908, which may be in the form of a multi-sig.

Figure 20:
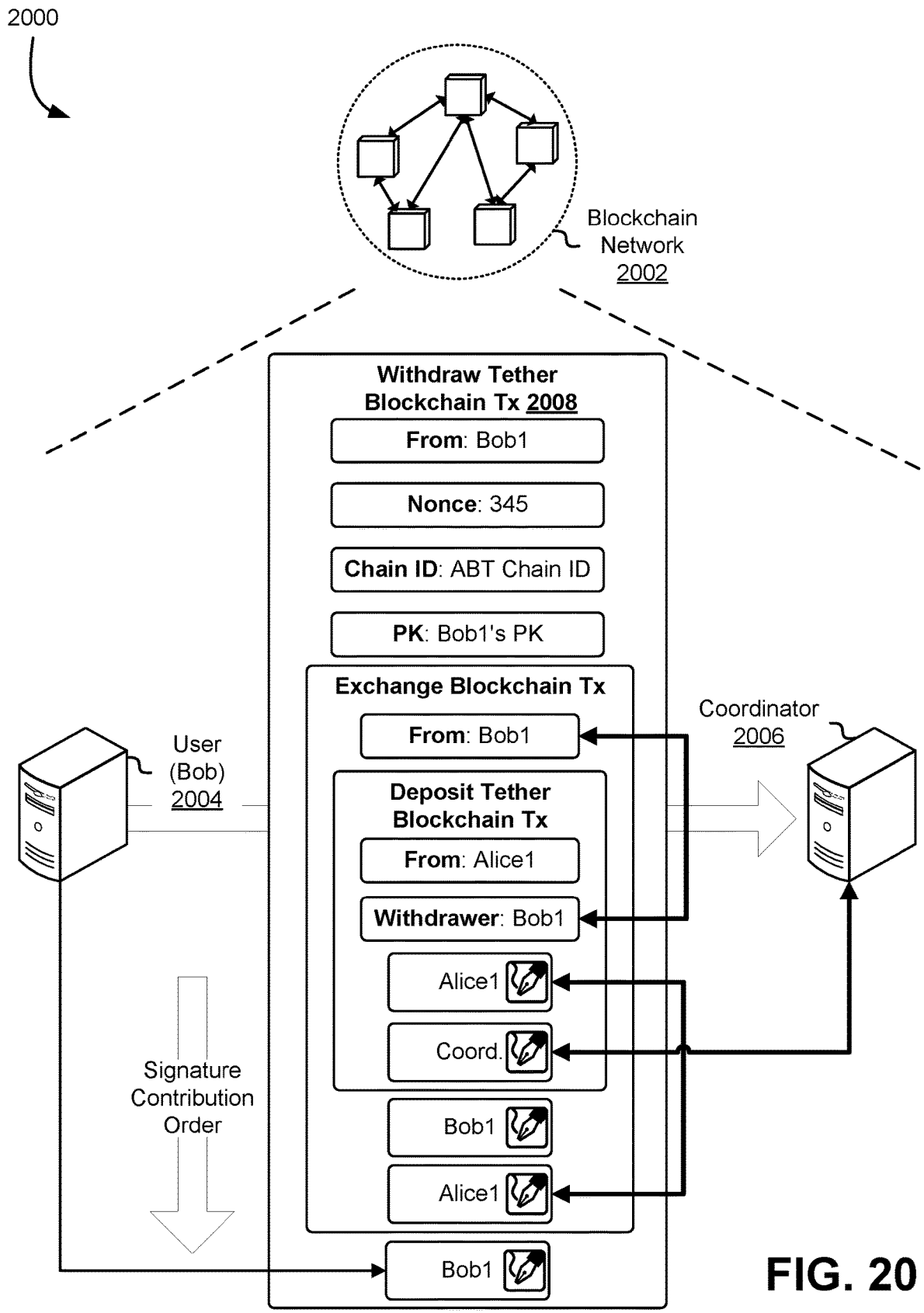
FIG. 20 illustrates a computing environment which may be used to implement a withdraw tether blockchain transaction, in accordance with at least one embodiment.

FIG. 20 illustrates a computing environment 2000 in which an embodiment may be practiced. The computing environment 2000 may be used to implement a system that supports cross-chain transactions. FIG. 20 illustrates, in accordance with at least one embodiment. Techniques described in connection with FIG. 20 may be applicable to embodiments described elsewhere in this disclosure, such as in FIGS. 14-19 and 21-24. FIG. 20 illustrates, in at least one embodiment, a protocol for performing a cryptographically verifiable and programmatically enforceable protocol for cross-chain exchange of digital assets between two or more users.

Blockchain network 2002 may be in accordance with those described elsewhere in this disclosure. A user 2004 may broadcast withdraw tether blockchain transaction 2008 which can be verified by a coordinator 2006. User 2004 may be referred to as "Bob" or "User B" throughout. Coordinator 2006 may be in accordance with those described elsewhere in this disclosure, such as those discussed in connection with FIGS. 17-18. Blockchain network 2002 may be a different blockchain network from the blockchain network illustrated in FIG. 19.

Withdraw tether blockchain transaction 2008 may refer to a blockchain transaction on a blockchain network 2002 that provides an indication to coordinator 2006 that a particular cross-chain exchange blockchain transaction was processed on a second blockchain network that is different from the blockchain network 2002 illustrated in FIG. 20. Withdraw tether blockchain transaction 2008, in at least one embodiment, does not directly obtain control of tethered digital assets held by coordinator 2006 but, instead, provides a notification to coordinator 2006 that allows coordinator 2006 to make a determination as to whether or not to release tethered digital assets, such as those that may have been transferred to coordinator 2006 by a deposit tether blockchain transaction, which may be in accordance with those described in connection with FIG. 18.

Withdraw tether blockchain transaction 2008 may include one or more of the fields illustrated in FIG. 20, and may include other fields not illustrated in FIG. 20 in various other embodiments. For example, the withdraw tether blockchain transaction illustrated in FIG. 20 may include fields and data such as those described in connection with FIG. 18. Withdraw tether blockchain transaction 2008 may include a field that indicates a sender entity, indicated as the "From" field in FIG. 20. "Bob1" may be used to reference a shadow blockchain address of Bob on blockchain network 2002 that is generated based at least in part on the blockchain network illustrated in FIG. 20. DID techniques described in connection with FIGS. 15-16 may be utilized to generate a spatial blockchain address matrix for Bob across multiple blockchain networks that includes DIDs and shadow blockchain accounts across the multiple blockchain networks.

"Bob1" may refer to a shadow blockchain address on blockchain network 2002, which may have a blockchain address which has a value computed based at least in part on a DID blockchain address of Bob's from another blockchain address. Bob's shadow blockchain address may be generated based at least in part on a spatial blockchain address matrix for Bob across multiple blockchain networks that includes DIDs and shadow blockchain accounts across the multiple blockchain networks. Withdraw tether blockchain transaction 2008 may include a nonce. A nonce can be an arbitrary number, such as a random or pseudo-random number. A nonce can be deterministically selected, for example, a timestamp or counter. Many cryptographic algorithms rely on the use of a cryptographic nonce, a number or bits of information that are to be only used once in a particular cryptographic context (e.g., encryption or digital signature generation), and may be necessary to properly perform decryption. A withdraw tether blockchain transaction 2008 may include a chain identifier that uniquely resolves to blockchain network 2002, which is the blockchain network that the withdraw tether blockchain transaction 2008 is to be broadcasted to. A withdraw tether blockchain transaction 2008 may include a public key corresponding to the identity of the sender indicated in the "From" field, which may be a shadow public key of a shadow blockchain address. The public key may be usable to verify a digital signature generated over the withdraw tether blockchain transaction 2008 and may be used to provide cryptographically verifiable assurances of integrity, authenticity, and non-repudiation of the withdraw tether blockchain transaction 2008.

In various embodiments, withdraw tether blockchain transaction 2008 includes or encodes sufficient data to recreate the cross-chain exchange blockchain transaction. For example, withdraw tether blockchain transaction 2008 may comprise a data body of a cross-chain blockchain transaction and digital signatures signed by Alice and Bob using public keys associated with their respective DIDs on a second blockchain network (e.g., different from blockchain network 2002 illustrated in FIG. 20), wherein the cross-chain blockchain transaction includes body data for a withdraw tether blockchain transaction which was previously broadcasted to blockchain network 2002 illustrated in FIG. 20. The withdraw tether blockchain transaction described above may encode a first digital signature from a shadow blockchain account controlled by Alice which was generated based at least in part on the second blockchain network and a second digital signature generated by coordinator 2006.

The user 2004 may broadcast withdraw tether blockchain transaction 2008 to blockchain network 2002, thereby making it accessible to coordinator 2006 for verification. The withdraw tether blockchain transaction 2008 may be verified by the blockchain network 2002 when it is broadcasted such that the verification includes checking one or more of the following conditions: the withdraw tether blockchain transaction 2008 is correctly signed by user 2004; the cross-chain exchange blockchain transaction encoded in the withdraw tether blockchain transaction 2008 is correctly signed by its sender and receiver (e.g., Bob1 and Alice1); the sender of the "From" field of the cross-chain exchange transaction matches (e.g., is equal to) the withdrawer from the "Withdrawer" field of the deposit tether blockchain transaction; the tether corresponding to the deposit tether blockchain transaction is still available (e.g., controlled by coordinator 2006); and more. If a set of conditions specified in the protocol—such as those just discussed—the withdraw tether blockchain transaction 2008 may be accepted on the blockchain network 2002. If a withdraw tether blockchain transaction 2008 is validated and accepted by blockchain network 2002, it is broadcasted across the blockchain network 2002 and may have a hash output referred to as hash2. A hash output, as described throughout this disclosure, may be generated using a suitable one-way function such as SHA3.

Figure 21:
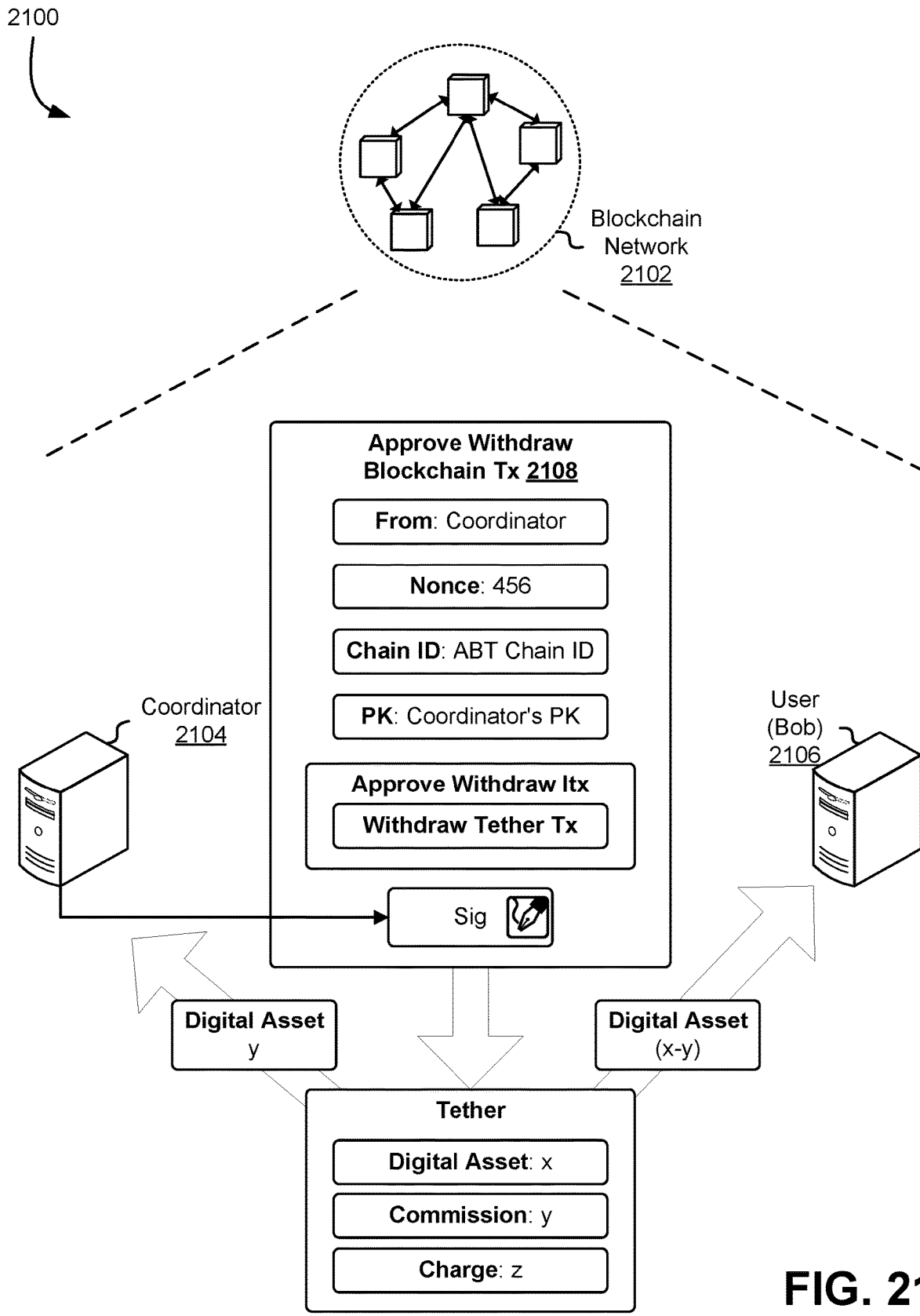
FIG. 21 illustrates a computing environment which may be used to implement an approve withdraw blockchain transaction, in accordance with at least one embodiment.

FIG. 21 illustrates a computing environment 2100 in which an embodiment may be practiced. The computing environment 2100 may be used to implement a system that supports cross-chain transactions. FIG. 21 illustrates, in accordance with at least one embodiment. Techniques described in connection with FIG. 21 may be applicable to embodiments described elsewhere in this disclosure, such as in FIGS. 14-20 and 22-24. FIG. 21 illustrates, in at least one embodiment, a protocol for performing a cryptographically verifiable and programmatically enforceable protocol for cross-chain exchange of digital assets between two or more users.

Blockchain network 2102 may be in accordance with those described elsewhere in this disclosure. Coordinator 2104 may be in accordance with those described elsewhere in this disclosure, such as those discussed in connection with FIGS. 17-18. User 2106 may be in accordance with the user illustrated in FIG. 20, and user 2106 may be referred to alternatively as "Bob" or "User2" throughout. Blockchain network 2102 may be in accordance with those described in connection with FIG. 20 and may be a different blockchain network from the blockchain network illustrated in FIG. 19.

Approve withdraw blockchain transaction 2108 may include a sender field corresponding to coordinator 2104. In some cases, approve withdraw blockchain transaction 2108 includes a nonce or cryptographic salt value. Approve withdraw blockchain transaction 2108 may include a blockchain identifier for the blockchain network 2102. Approve withdraw blockchain transaction 2108 may encode a public key of coordinator 2104 corresponding to a private key that is used to digitally sign approve withdraw blockchain transaction 2108.

Approve withdraw blockchain transaction 2108 may include one or more data fields, such as a Withdraw field that stores the hash of a withdraw tether blockchain transaction, such as those described in connection with FIG. 20. In some cases, approve withdraw blockchain transaction 2108 may include additional data fields to transfer digital assets. If approve withdraw blockchain transaction 2108 is accepted by the blockchain network 2102, then control of a digital asset x may be transferred to user 2106, control of digital asset y may be transferred to coordinator 2104 (e.g., the digital asset is no longer subject to revocation and is unilaterally controlled by coordinator as a result of approve withdraw blockchain transaction 2108), and control of digital asset z may be returned to the user that submitted the deposit tether blockchain transaction. In some embodiments, x, y, and z are fungible digital assets and the balances of such digital assets may be updated such that the balance of user 2106 is increased by (x-y) and the balance of coordinator 2104 is increased by y. Furthermore, a deposit pool (e.g., deposits received by coordinator 2104) may be decreased by x, reflecting that the fungible digital assets that were transferred to coordinator 2104 as part of a deposit tether blockchain transaction have been distributed and cannot be revoked.

Approve withdraw blockchain transaction 2108 may be considered valid if the approve withdraw blockchain transaction 2108 is correctly signed by coordinator 2104, the inner deposit tether blockchain transaction's coordinator is the same as coordinator 2104, the withdraw tether blockchain transaction references a successfully executed blockchain transaction, and the tether corresponding to the deposit tether blockchain transaction is still available (e.g., has not been previously distributed). Once approve withdraw blockchain transaction 2108 has been accepted, the tether specified by hash1 is no longer available.

Figure 22:
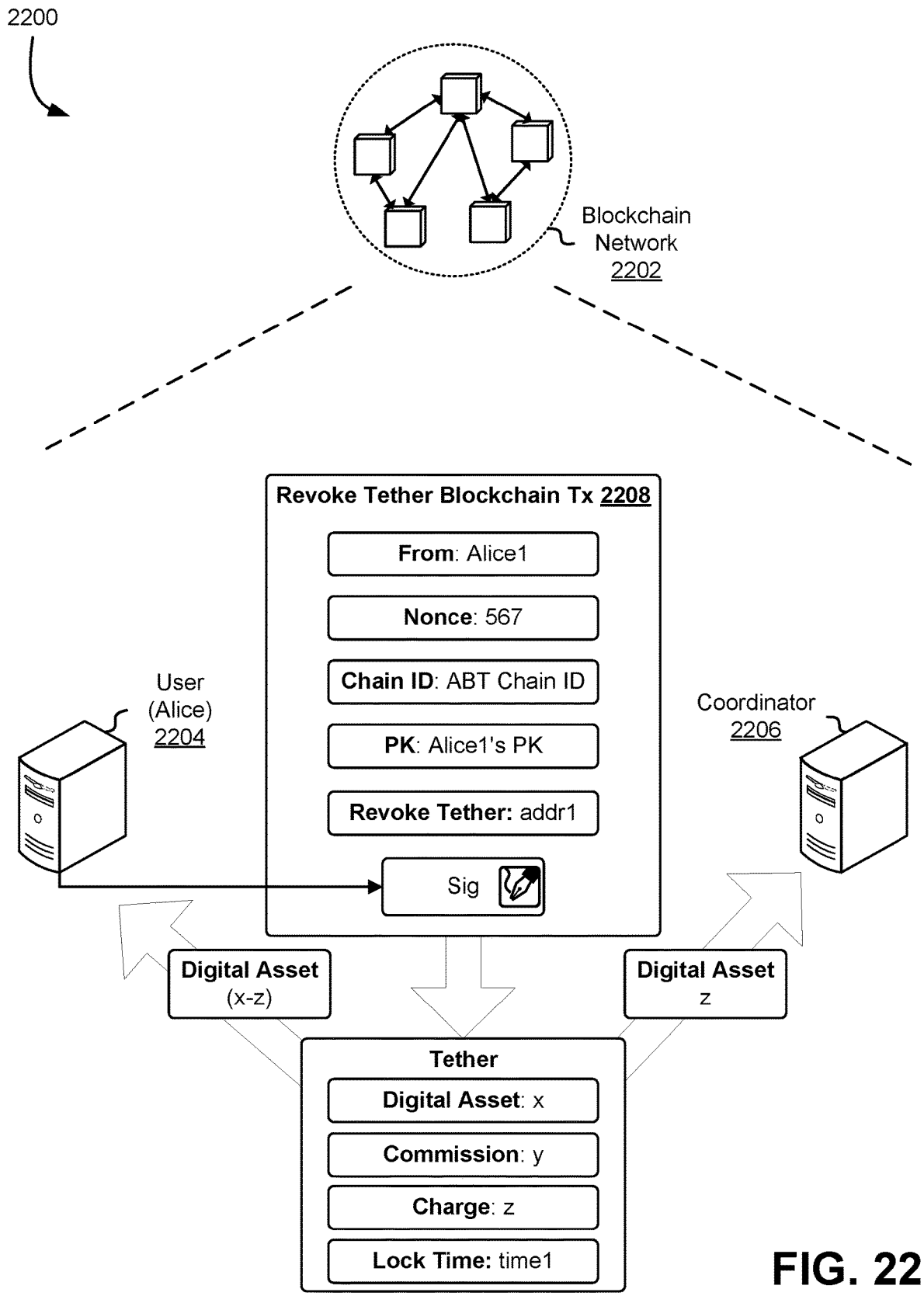
FIG. 22 illustrates a computing environment which may be used to implement a revoke tether blockchain transaction, in accordance with at least one embodiment.

FIG. 22 illustrates a computing environment 2200 in which an embodiment may be practiced. The computing environment 2200 may be used to implement a system that supports cross-chain transactions. FIG. 22 illustrates, in accordance with at least one embodiment. Techniques described in connection with FIG. 22 may be applicable to embodiments described elsewhere in this disclosure, such as in FIGS. 14-21 and 23-24. FIG. 22 illustrates, in at least one embodiment, a protocol for performing a cryptographically verifiable and programmatically enforceable protocol for cross-chain exchange of digital assets between two or more users.

Blockchain network 2202 may be in accordance with those described elsewhere in this disclosure, such as the blockchain network illustrated in FIG. 18. User 2204 may be in accordance with the user illustrated in FIG. 18 that generates and broadcasts a deposit tether blockchain transaction. Coordinator 2206 may be in accordance with those described elsewhere in this disclosure, such as those discussed in connection with FIGS. 17-18. Blockchain network 2202 may be in accordance with those described in connection with FIG. 18 and may be a different blockchain network from the blockchain network illustrated in FIG. 19.

FIGS. 17-21 may illustrate an execution flow of a protocol in which a cross-chain exchange of digital assets between two or more users is successfully performed and where each entity participating in the protocol abides by their responsibilities in the protocol, and may be considered good actors in the flow. FIG. 22 illustrates, in at least one embodiment, a revocation to stop a cross-chain exchange of digital assets between two or more users, for example, in response to determining that another participant of the cross-chain exchange protocol is not behaving as expected. For example, if a first user 2204 and second user (not shown in FIG. 22) agree to perform a cross-chain exchange of digital assets, first user 2204 generates and broadcasts a deposit tether blockchain transaction (e.g., in accordance with FIG. 18), and the second user refuses to broadcast a cross-chain exchange blockchain transaction, then the first user 2204 may issue a revocation as illustrated in FIG. 22.

User 2204 may elect to perform a revocation at any point in time, but successful revocation may be subject to conditions: first, a revocation may not be accepted if it is requested prior to the end of the lock time specified in a deposit tether blockchain transaction; and second, the tether must still be available (e.g., it has not been redeemed, which may indicate that the protocol was successfully completed). In some cases, the current block time is compared against the lock time to determine whether revocation is allowed yet.

User 2204 may broadcast revoke tether blockchain transaction 2208 to reclaim tethered digital assets from a deposit tether blockchain transaction that the user had previously broadcasted. If the tether has not been redeemed (e.g., by user 2204 or a counterparty), the user 2204 is the same user that deposited the tether, and the lock time has elapsed, then the revoke tether blockchain transaction 2208 may be accepted by blockchain 2202. In at least one embodiment, deposit tether blockchain transaction includes a deposit of digital assets x, y, and z which are respectively, the value, commission, and charge. In some cases, control of digital assets x, y, and z are non-fungible tokens, control of which is subject to a tether that allows user 2204 to perform a revocation in which digital assets x and y are returned to user 2204 but digital asset z is given to coordinator 2206 such that it is no longer subject to a tether (this may be considered a penalty to user 2204 to discourage excessive revocations). In some embodiments, digital assets x, y, and z are fungible digital assets such that a value of x is transferred from user 2204 to coordinator 2206 subject to a tether as part of a deposit tether blockchain transaction and that a charge of z is deducted as part of a revocation—in other words, a revocation may result in a transfer of (x-z) digital assets from coordinator 2206 to user 2204 wherein the remaining charge z may be transferred from a deposit pool of the coordinator 2206 to a balance or wallet of the coordinator 2206 that is not subject to tethers.

Figure 23:
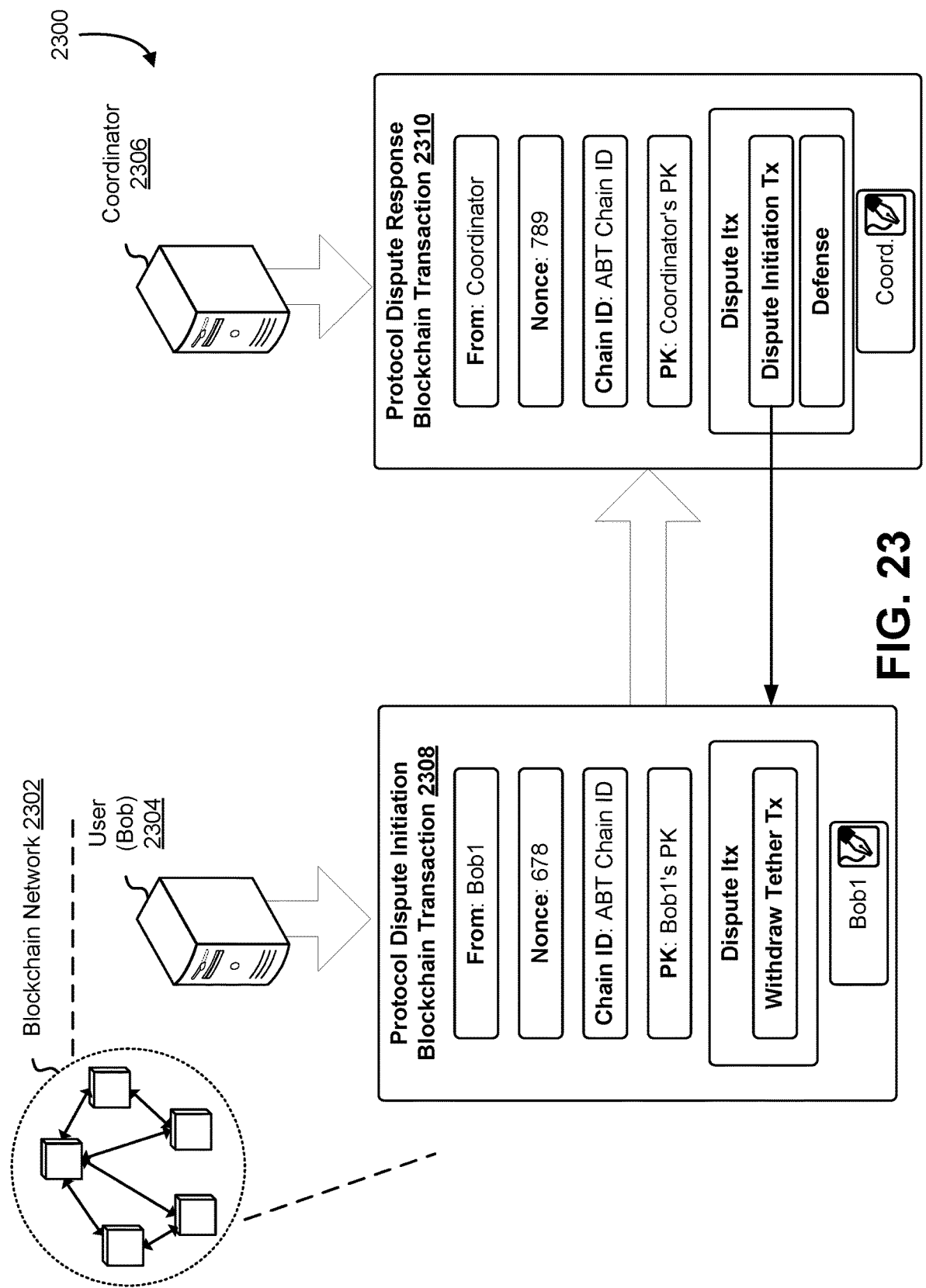
FIG. 23 illustrates a computing environment which may be used to implement a protocol dispute, in accordance with at least one embodiment.

FIG. 23 illustrates a computing environment 2300 in which an embodiment may be practiced. The computing environment 2300 may be used to implement a system that supports cross-chain transactions. FIG. 23 illustrates, in accordance with at least one embodiment. Techniques described in connection with FIG. 23 may be applicable to embodiments described elsewhere in this disclosure, such as in FIGS. 14-22 and 24. FIG. 23 illustrates, in at least one embodiment, a protocol for performing a cryptographically verifiable and programmatically enforceable protocol for cross-chain exchange of digital assets between two or more users. Blockchain network 2302 may be the same blockchain illustrated and described in connection with FIG. 20.

In the context of FIGS. 17-22, the coordinator acts according to the protocol. However, if the coordinator does not act according to the protocol—for example, refusing the release the tether and submit an approve withdraw blockchain transaction—additional mechanisms may be utilized to mitigate such behavior. For example, either a first user (e.g., Alice or User A) or second user (e.g., Bob or User B) may submit a dispute blockchain transaction to use a blockchain network to make a consensus-based protocol compliance determination. FIG. 23 illustrates, according to at least one embodiment, a protocol dispute in which a user 2304 (e.g., Bob or User B) initiates a protocol dispute and provides a verifiable claim that the user 2304 has acted according to the protocol and an assertion that the coordinator 2306 has not.

In at least one embodiment, User A and User B collectively perform various steps of a cross-chain digital asset exchange protocol described in connection with FIGS. 17-22 but, unlike the embodiments described in connection with FIGS. 17-22 where the coordinator is a good actor, the coordinator of FIG. 23 refuses to broadcast an approve withdraw blockchain transaction in response to a valid withdraw tether blockchain transaction that is accepted by a blockchain network. User B may generate and broadcast a protocol dispute initiation blockchain transaction which can be used to make a consensus-based protocol compliance determination as to whether the coordinator has acted according to the protocol and/or whether to perform a mitigation in response that the cross-chain exchange protocol has been violated.

In at least one embodiment, protocol dispute initiation blockchain transaction 2308 is a blockchain transaction that is broadcasted to a blockchain network. The blockchain network may be the same blockchain network which a deposit tether blockchain transaction and a corresponding withdraw tether blockchain transaction are broadcasted to. A protocol dispute initiation blockchain transaction may include data fields such as a sender field where the "From" value references a blockchain user that is initiating the dispute. FIG. 23 illustrates the user 2304 as initiating the dispute. A protocol dispute initiation blockchain transaction may include a nonce or cryptographic salt value. A protocol dispute initiation blockchain transaction may include a blockchain identifier which, to be valid, matches the blockchain identifier value of the withdraw tether blockchain transaction that is encoded in the protocol dispute initiation blockchain transaction.

Protocol dispute initiation blockchain transaction may include a field that encodes the withdraw tether blockchain transaction (e.g., hash of the withdraw tether blockchain transaction) in dispute. Finally, User B may digitally sign the protocol dispute initiation blockchain transaction and broadcast it to the blockchain network for consensus-based protocol dispute resolution. Blockchain network 2302 may validate whether to initiate a dispute resolution process by at least validating protocol dispute initiation blockchain transaction. In some cases, protocol dispute initiation blockchain transaction checks that one or more conditions are true: the withdraw tether blockchain transaction referenced by the protocol dispute initiation blockchain transaction was successfully executed; the withdraw tether blockchain transaction was sent prior to a lock time specified in the tether; and the protocol dispute initiation blockchain transaction was broadcasted after withdraw tether blockchain transaction. In some cases, a buffer is added to the timings described above—for example, the withdraw tether blockchain transaction may be required to have been sent two hours ahead of the tether's lock time and the protocol dispute initiation blockchain transaction may have to be sent at least two hours after the withdraw tether blockchain transaction. These buffer times are merely illustrative and other values may be selected to provide sufficient buffer for processing various blockchain transactions. Threshold times and deadlines may be specified as a clock time (e.g., UTC), as a block height, or as another suitable timing or sequencing representation.

Once a protocol dispute initiation blockchain transaction has been broadcasted, the coordinator may have given a predetermined period of time to provide a dispute defense blockchain transaction, such as in the case where a withdrawer fraudulently claims that the coordinator did not release a tether. Several different defenses are presented below, and various embodiments may implement protocols that support various combinations of such defenses.

For example, a first defense available to a coordinator is to submit a protocol dispute response blockchain transaction 2310 that includes a reference to the protocol dispute initiation blockchain transaction and encode an approve withdraw blockchain tether transaction that was broadcasted to the blockchain network that proves the coordinator released the digital assets to the withdrawer. The protocol dispute response blockchain transaction may include a hash of the approved withdraw blockchain tether transaction. The protocol dispute response blockchain transaction may be digitally signed by the coordinator and broadcasted to the blockchain network 2302. Blockchain network 2302 may determine that protocol dispute response blockchain transaction is a valid defense if the approve withdraw blockchain transaction was successfully executed on the blockchain network. In at least some embodiments, the approved withdraw blockchain transaction must be broadcasted before the protocol dispute initiation blockchain transaction.

As a second example, a defense available to a coordinator is to submit a protocol dispute response blockchain transaction that claims User B did not submit a valid cross-chain exchange blockchain transaction on a remote blockchain (as described in connection with FIG. 17). This defense may be used to claim that a cross-chain transfer of digital assets was never performed on the remote blockchain or that it was not done according to parameters agreed upon by the parties, which may be encoded at least in part in the deposit tether blockchain transaction. Note that User B's signing of a deposit tether blockchain transaction may indicate an agreement as to the parameters for a cross-change exchange, which may include values, amounts, or specific tokens (e.g., identified by blockchain address) to be exchanged. This second defense may be validated using a consensus-based voting by nodes of blockchain network 2302 to determine whether a valid cross-chain exchange blockchain transaction was executed on a remote blockchain. The voting may be performed by a subset of nodes of the blockchain network 2302 that may be used to determine off-chain events (e.g., events occurring off of the blockchain 2302, which may include events occurring on a remote blockchain). Voting may be performed by a proof of stake blockchain network in which nodes vote for whether an event occurred, reach a consensus, and penalize nodes that voted contrary to the consensus.

In some cases, a coordinator may behave contrary to the protocol by deliberately refusing to approve the tether even though the cross-chain exchange protocol was successfully executed. If the coordinator refuses to process the approved withdraw blockchain transaction, the lock time may lapse, after which User A may revoke the tether. If, after these series of events, User B initiates a protocol dispute, the coordinator may be unable to generate a valid defense since the coordinator may be unable to prove that an approved withdraw blockchain transaction was broadcasted prior to the tether lock time. The arising situation may be similar to the case where coordinator fails to submit a valid protocol dispute response blockchain transaction. Accordingly, the coordinator may be punished by transfer of control of digital assets or tokens equivalent to the digital assets revoked by User A. In some cases, the revocation transfers digital assets that the coordinator staked to the blockchain network 2302 and, accordingly, reduces the amount of digital assets that the coordinator is able to accept in a deposit pool. The coordinator's deposit cap may be equal to the amount or value of digital assets staked by the coordinator.

There may be at least two possible outcomes of the protocol dispute response blockchain transaction—in the case that coordinator fails to provide a valid defense (e.g., does not submit a protocol dispute response blockchain transaction or one that is invalid for any reason), the coordinator may be penalize; in the case that coordinator provides a valid defense, the user that initiated the dispute may be punished. For example, in the case that coordinator is to be punished, the tethered digital assets may be transferred to the user, including the commission. For example, if non-fungible digital asset x was to be transferred to the user and non-fungible digital asset y was to be transferred to the coordinator (e.g., as commission) as part of a cross-chain exchange of digital assets, then the consensus-based dispute resolution may resolve the dispute by sending both digital assets to the user and nothing to the coordinator. As a second example, if fungible digital asset x was tethered and a portion y<x was to be provided to the coordinator as a commission, then the entire amount x—rather than (x-y)—may be transferred to the user as part of the dispute resolution in the user's favor. In some cases, the user initiating a protocol dispute must stake a digital asset to initiate a protocol dispute, and relinquishes control of the digital asset on condition that a valid protocol dispute response blockchain transaction is produced by the coordinator. Accordingly, penalties can be used to discourage different parties from behavior that is contrary to the protocol.

Figure 24:
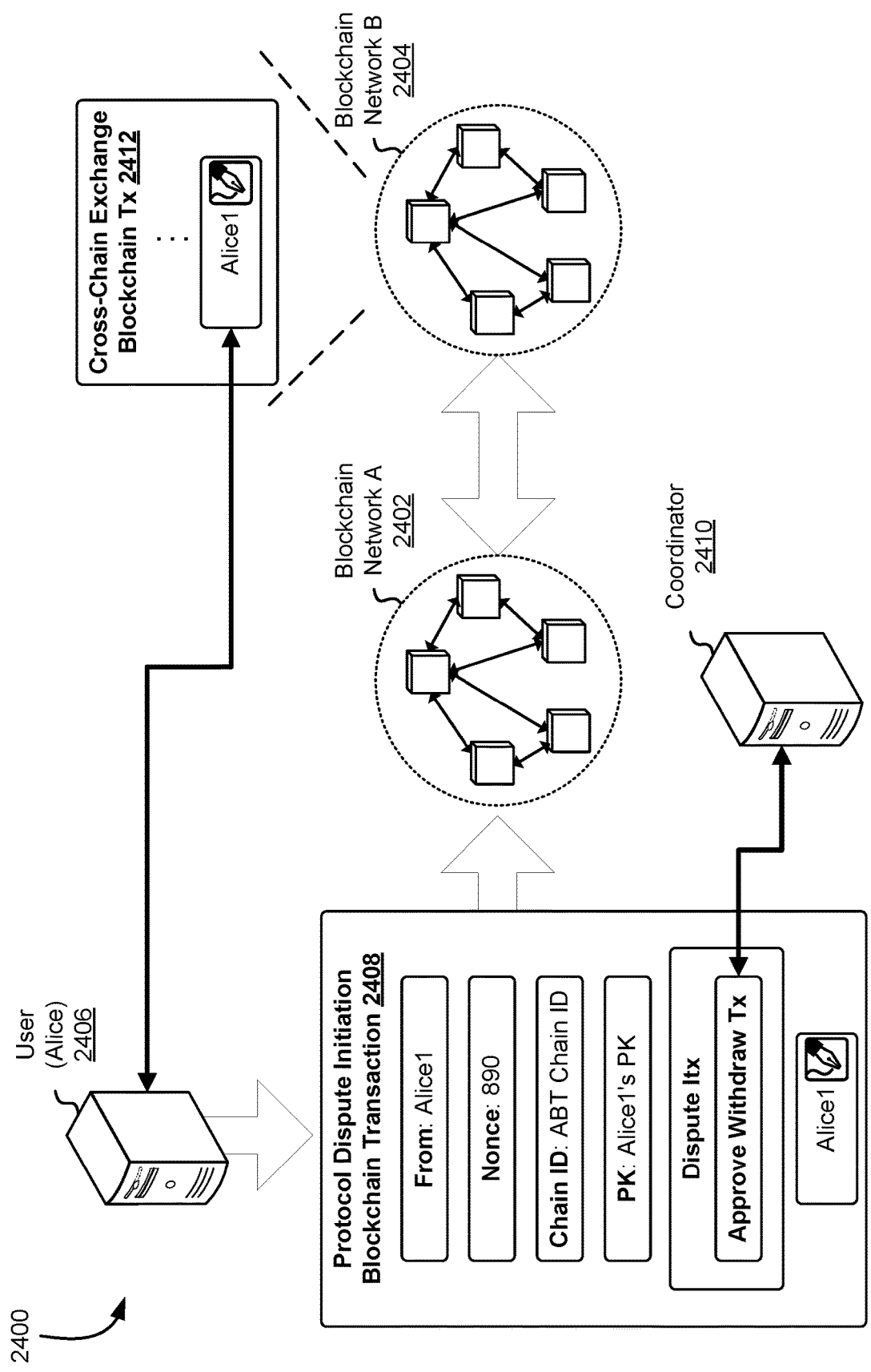
FIG. 24 illustrates a computing environment which may be used to implement a protocol dispute, in accordance with at least one embodiment.

FIG. 24 illustrates a computing environment 2400 in which an embodiment may be practiced. The computing environment 2400 may be used to implement a system that supports cross-chain transactions. FIG. 24 illustrates, in accordance with at least one embodiment. Techniques described in connection with FIG. 24 may be applicable to embodiments described elsewhere in this disclosure, such as in FIGS. 14-23. FIG. 24 illustrates, in at least one embodiment, a protocol for performing a cryptographically verifiable and programmatically enforceable protocol for cross-chain exchange of digital assets between two or more users. Blockchain network 2402 may be the same blockchain illustrated and described in connection with FIG. 20 in which a deposit tether blockchain transaction and withdraw tether blockchain transaction are broadcasted. Blockchain network 2404 may be a remote blockchain different from blockchain network 2402 in which a cross-chain exchange blockchain transaction is broadcasted—for example, according to embodiments in accordance with FIG. 19.

In some cases, a user 2406 (e.g., Alice or User A) can initiate a protocol dispute with coordinator 2410, such as in cases where the coordinator erroneously executes an approved withdraw blockchain transaction, for example, in response to an invalid withdraw tether blockchain transaction submitted by User B (e.g., either maliciously or inadvertently). The result, in such a situation, may be that coordinator releases the tether on digital asset x and transfers it to User B even though User B has not actually executed a proper transfer on a remote blockchain.

A user 2406—referred to as User A throughout—may generate a protocol dispute initiation blockchain transaction 2408. The protocol dispute initiation blockchain transaction 2408 may be different from the dispute initiation blockchain transactions described in connection with FIG. 23 (e.g., have a different transaction type). Disputes initiated by User A may be different from User B, as there are different points of failure from the perspective of User A and User B. A protocol dispute initiation blockchain transaction 2408 may include a sender field indicating User A is initiating a dispute, a nonce or cryptographic salt, a chain identifier, a public key associated with the sender, which may be the same shadow blockchain account which was the sender of the deposit tether blockchain transaction, and various combinations thereof. Other fields may be included, but are omitted from this discussion so as to not belabor the description of the protocol dispute initiation blockchain transaction. A protocol dispute initiation blockchain transaction may include a hash of an approved withdraw blockchain transaction broadcasted by the coordinator which User A asserts is improper. Improper may mean that the approved withdraw blockchain transaction was executed even though one or more conditions of execution were not met. A protocol dispute initiation blockchain transaction may be digitally signed by User A and broadcasted to blockchain network 2402.

If protocol dispute initiation blockchain transaction is successfully broadcasted to blockchain network 2402, a dispute case may be opened and include some or all of the following information:

| | |
|---|---|
| Blockchain Address | The blockchain address of the dispute case, generated by the dispute transaction hash |
| Accuser | The user initiating the dispute (e.g., User A) |
| Defender | The user being accused of violating protocol behavior (e.g., Coordinator) |
| ApproveTetherTx | The hash of the approve withdraw blockchain transaction in dispute |
| WithdrawTetherTx | The hash of the withdraw tether blockchain transaction |
| Exchange | { } |
| ExchangeHash | The hash of the corresponding cross-chain exchange blockchain transaction |
| Tether | The blockchain address of the tether created by the deposit tether blockchain transaction |
| AccuserStake | Stake of digital assets of the accuser |
| DefenderStake | Stake of digital assets of the defender |

Additionally, if protocol dispute initiation blockchain transaction is successfully broadcasted to blockchain network 2402, the accuser may stake digital assets to initiate adjudication of the dispute case. When the accuser stakes digital assets, it may include a reference to the blockchain address of the dispute case. An address may be based on the type, from, to, and case fields.

| | |
|---|---|
| Type | Dispute |
| From | The user initiating the dispute (e.g., Alice) |
| To | Chain Identifier |
| Case | Blockchain address of the dispute case |
| Address | "Type + From + To + Case" |
| Balance | "" |

In some cases, a condition for the coordinator approving withdrawal of a tether is that the sender User A signed a cross-chain exchange blockchain transaction 2412 on a remote blockchain network—accordingly, resolving this type of dispute case may involve validating the execution status of the cross-chain exchange blockchain transaction 2412 that was purported to have occurred on blockchain network 2404 (e.g., the remote blockchain). The validation may be performed by voting (e.g., public voting to reach consensus).

| | |
|---|---|
| From | Defender (e.g., coordinator) |
| Nonce | Nonce value |
| Chain Identifier | Primary chain's DID |
| Public Key | Defender's public key |
| Dispute Case | Blockchain address of the dispute case |
| Signature | Defender's digital signature |

If the transaction is successfully executed, coordinator will stake some tokens to the dispute case:

| | |
|---|---|
| Type | Dispute |
| From | The user accused in the dispute (e.g., coordinator) |
| To | Chain Identifier |
| Case | Blockchain address of the dispute case |
| Address | "Type + From + To + Case" |
| Balance | "" |

A voting transaction may include one or more of the following fields: a sender field, indicating the coordinator; a nonce, which may be a cryptographic value or number used for cryptographic operations only once; a chain identifier; the coordinator's public key, a hash of the dispute transaction, and a digital signature of the coordinator.

Note that one or more of the operations performed in processes described above may be performed in various orders and combinations, including parallel execution and execution in a non-deterministic order, for example. No ordering of operations of process flows illustrated in FIGS. 1-25 are necessarily indicative of relative ordering of the operations unless otherwise stated.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

In at least some embodiment, a "blockchain" or "blockchain network" refers to any and all suitable forms of distributed ledgers, which includes consensus-based blockchain and transaction-chain technologies, permissioned and un-permissioned ledgers, shared ledgers, and more. Non-limiting examples of blockchain technology include Bitcoin, Ethereum, and ArcBlock, although other examples of blockchain technologies are also contemplated in the scope of this disclosure. While Bitcoin, Ethereum, and ArcBlock may be described in connection with various embodiments of this disclosure, those embodiments are to be construed merely as illustrative examples and not limiting. For example, alternative blockchain implementations and protocols are contemplated within the scope of the present disclosure.

A blockchain network may refer to a peer-to-peer electronic ledger implemented as a decentralized system. A ledger may comprise multiple blocks wherein a genesis block is a first block of the ledger and all other blocks reference a previous block. In at least some embodiment, each block (except the genesis block) includes a hash of the previous block to which that block became chained together to create an immutable record of the block to the blockchain ledger which cannot be modified, deleted, or otherwise altered. A block may include one or more blockchain transactions. A blockchain transaction may refer to a data structure that encodes the transfer of control of a digital asset between users of the blockchain network. For example, a blockchain transaction may transfer control of a digital asset from a source address to a destination address. The blockchain transaction may be signed with a private key associated with the address which can be cryptographically verified using a corresponding public key that is made available to other parties of the blockchain network. In at least one embodiment a blockchain transaction includes a transaction input and a transaction output. Blockchain transactions may include nonces or salt values.

In some embodiment, a blockchain transaction is validated before it is committed to the blockchain ledger as part of a block. Blockchain nodes may be used to verify blockchain transactions, which may include verifying digital signatures of transactions, verifying that a purported owner of a digital asset is actually the owner by inspecting the blockchain ledger to verify that control of the digital asset was transferred to the purported owner and that the purported owner has not elsewhere transferred control of the digital asset (meaning that the purported owner was previous the owner of the digital asset but has previously transferred control to another entity).

Validity in the blockchain context may be consensus based, and a transaction may be considered valid if a majority of nodes agrees that the blockchain transaction is valid. In at least some embodiments, a blockchain transaction references an unspent transaction output (UTXO) that is used to validate the transaction by executing the UTXO locking and unlocking script. If the UTXO locking and unlocking script executes successfully (e.g., by evaluating to TRUE and any other validation operations). Accordingly, a blockchain transaction is written to a blockchain ledger when it is validated by a node that receives the transaction and is added to a new block by a node (e.g., miner) and actually mined by added it to the public ledger of past transaction. In at least some embodiment, a blockchain transaction is considered to be confirmed when a certain number of subsequent blocks are added to the blockchain ledger, whereinafter the blockchain transaction becomes virtually irreversible.

A blockchain transaction output may include a locking script that "locks" a digital asset by specifying a condition that is to be met in order for the encumbrance to be lifted or unlocked (e.g., to allow control of the digital asset to be transferred to another user). A locking script may be referred to as an encumbrance. An unlocking script may be a corresponding script that in combination with the locking script, removes an encumbrance on digital assets. A locking script and unlocking script may be combined to form executable code that, if executed to completion or to yield a specific result, indicates that the unlocking script is valid and that the encumbrance may be removed. For example, "scriptPubKey" is a locking script in Bitcoin and "scriptSig" is an unlocking script.

It should be noted that while blockchain technology is perhaps most widely known for its use cryptocurrency, there are many other applications for blockchain technologies for providing secure systems. A secure system may refer to a system in which functionality—such as the exchange of digital assets between two or more entities—is cryptographically verifiable. A secure system may be robust to failure. A secure system may be immutable such that information that is committed to the blockchain ledger cannot be unilaterally modified by an individual. A secure system may provide additional assurances, such as assurances of confidentiality, integrity, authenticity, and nonrepudiation. Confidentiality may refer to assurances that certain information is not made publicly available (e.g., the underlying identity of a blockchain address may be kept secret or unknown). Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. Nonrepudiation may refer to assurances that a party that digitally signs a blockchain transaction cannot deny the authenticity of the transaction.

Electronic signatures may be generated using secret information (e.g., a private key of a key pair associated with a user) that is available to both an authenticating entity (e.g., user) and the authentication service. The request and signatures for the request may be provided to the authentication service which may, using the secret information, compute a reference signature for comparison with the received signature to determine whether the request is authentic. If the request is authentic, the authentication service may provide information that the data service frontend can use to prove to other services, such as the cryptography service, that the request is authentic, thereby enabling the other services to operate accordingly. For example, the authentication service may provide a token that another service can analyze to verify the authenticity of the request. Electronic signatures and/or tokens may have validity that is limited in various ways. For example, electronic signatures and/or tokens may be valid for certain amounts of time. In one example, electronic signatures and/or tokens are generated based at least in part on a function (e.g., a Hash-based Message Authentication Code) that takes as input a timestamp, which is included with the electronic signatures and/or tokens for verification. An entity verifying a submitted electronic signature and/or token may check that a received timestamp is sufficiently current (e.g., within a predetermined amount of time from a current time) and generate a reference signature/token using for the received timestamp. If the timestamp used to generate the submitted electronic signature/token is not sufficiently current and/or the submitted signature/token and reference signature/token do not match, authentication may fail. In this manner, if an electronic signature is compromised, it would only be valid for a short amount of time, thereby limiting potential harm caused by the compromise. It should be noted that other ways of verifying authenticity are also considered as being within the scope of the present disclosure. A digital signature may be a type of electronic signature. Authentication information may be encoded as a digital signature or other types of electronic signatures. An attestation of information may utilize electronic signatures to provide mathematically verifiable assurances of one or more of the following properties: authenticity; integrity; non-repudiation; and any suitable combination thereof.

Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that $f(x)=y$ is below a specified threshold), second pre-image resistance (given an input $x_1$, the probability of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x_1)=f(x_2)$ for different $x_1$ and $x_2$ is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

As used herein, the terms "private key" and "public key" may be used to refer, respectively, to private and public keys used as part of asymmetric cryptography ("public key cryptography"). Asymmetric cryptography refers to a class of cryptographic protocols wherein the private key and public key may be mathematically linked. In public key cryptography, there is no requirement that parties exchange a shared secret. Rather, a public key may be published and may be generally available (even to untrusted parties), whereas the private key should not be revealed to untrusted parties. The key pair (of the corresponding private key and public key) may be used to perform cryptographic operations. For example, a public key may be used to encrypt a plaintext message, resulting in a ciphertext, and the corresponding private key may be used to decrypt the ciphertext, resulting in the original plaintext message. As a second example, a private key may be used to generate a digital signature authenticating a message, and the corresponding public key may be used to verify that the digital signature is correct and thus, that the message is authentic.

Figure 25:
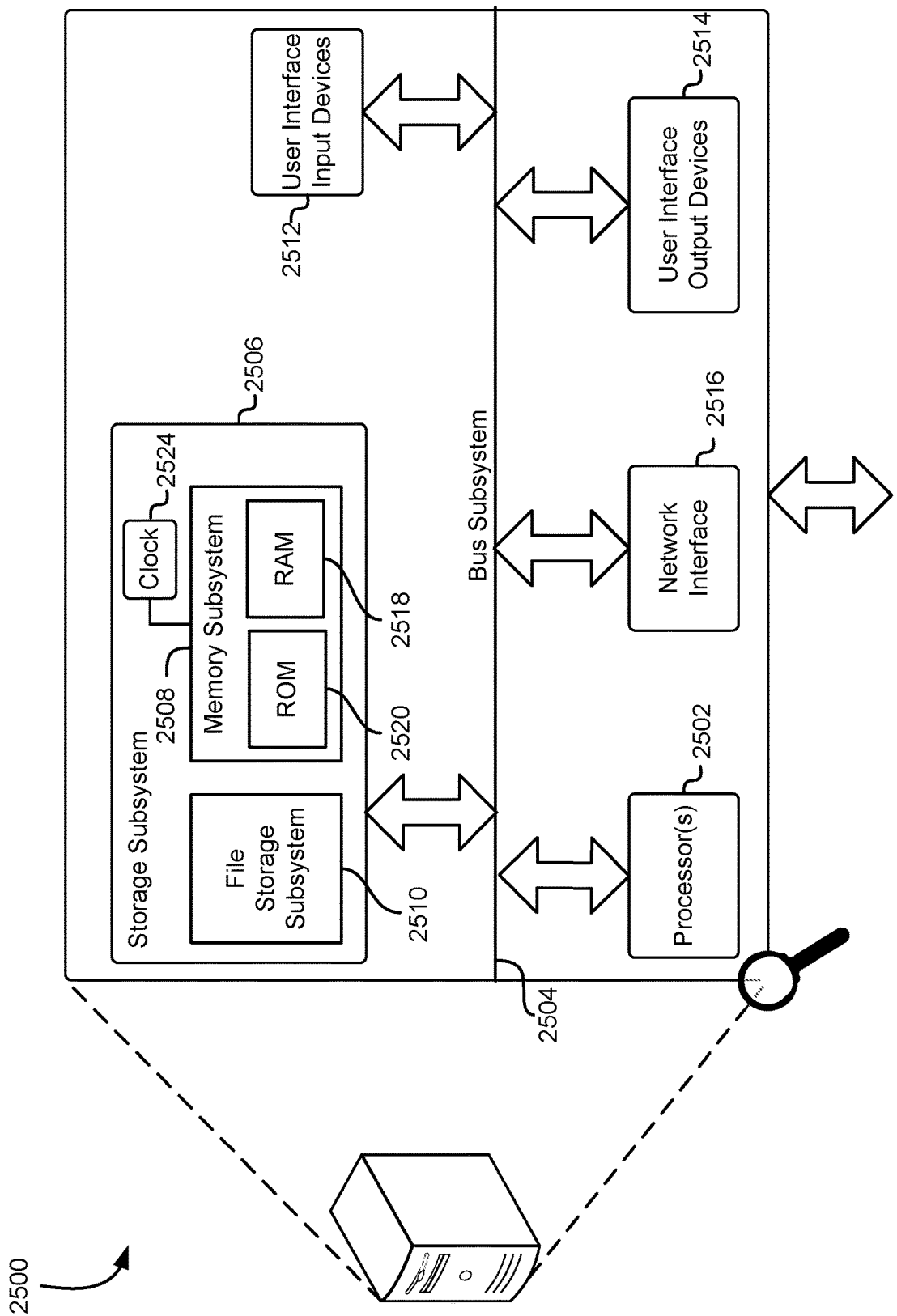
FIG. 25 illustrates an environment in which various embodiments can be implemented.

FIG. 25 is an illustrative, simplified block diagram of a computing device 2500 that can be used to practice at least one embodiment of the present disclosure. In various embodiments, the computing device 2500 may be used to implement any of the systems illustrated and described above. For example, the computing device 2500 may be configured for use as a data server, a web server, a portable computing device, a personal computer, or any electronic computing device. As shown in FIG. 25, the computing device 2500 may include one or more processors 2502 that, in embodiments, communicate with and are operatively coupled to a number of peripheral subsystems via a bus subsystem. In some embodiments, these peripheral subsystems include a storage subsystem 2506, comprising a memory subsystem 2508 and a file/disk storage subsystem 2510, one or more user interface input devices 2512, one or more user interface output devices 2514, and a network interface subsystem 2516. Such storage subsystem 2506 may be used for temporary or long-term storage of information.

In some embodiments, the bus subsystem 2504 may provide a mechanism for enabling the various components and subsystems of computing device 2500 to communicate with each other as intended. Although the bus subsystem 2504 is shown schematically as a single bus, alternative embodiments of the bus subsystem utilize multiple buses. The network interface subsystem 2516 may provide an interface to other computing devices and networks. The network interface subsystem 2516 may serve as an interface for receiving data from and transmitting data to other systems from the computing device 2500. In some embodiments, the bus subsystem 2504 is utilized for communicating data such as details, search terms, and so on.

In some embodiments, the user interface input devices 2512 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2500. In some embodiments, the one or more user interface output devices 2514 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2500.

The one or more user interface output devices 2514 can be used, for example, to present user interfaces to facilitate user interaction with applications performing processes described and variations therein, when such interaction may be appropriate.

In some embodiments, the storage subsystem 2506 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 2506. These application modules or instructions can be executed by the one or more processors 2502. In various embodiments, the storage subsystem 2506 additionally provides a repository for storing data used in accordance with the present disclosure. In some embodiments, the storage subsystem 2506 comprises a memory subsystem 2508 and a file/disk storage subsystem 2510.

In embodiments, the memory subsystem 2508 includes a number of memories, such as a main random access memory (RAM) 2518 for storage of instructions and data during program execution and/or a read only memory (ROM) 2520, in which fixed instructions can be stored. In some embodiments, the file/disk storage subsystem 2510 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 2500 includes at least one local clock 2524. The at least one local clock 2524, in some embodiments, is a counter that represents the number of ticks that have transpired from a particular starting date and, in some embodiments, is located integrally within the computing device 2500. In various embodiments, the at least one local clock 2524 is used to synchronize data transfers in the processors for the computing device 2500 and the subsystems included therein at specific clock pulses and can be used to coordinate synchronous operations between the computing device 2500 and other systems in a data center. In another embodiment, the local clock is a programmable interval timer.

The computing device 2500 could be of any of a variety of types, including a portable computer device, tablet computer, a workstation, or any other device described below. Additionally, the computing device 2500 can include another device that, in some embodiments, can be connected to the computing device 2500 through one or more ports (e.g., USB, a headphone jack, Lightning connector, etc.). In embodiments, such a device includes a port that accepts a fiber-optic connector. Accordingly, in some embodiments, this device is that converts optical signals to electrical signals that are transmitted through the port connecting the device to the computing device 2500 for processing. Due to the ever-changing nature of computers and networks, the description of the computing device 2500 depicted in FIG. 25 is intended only as a specific example for purposes of illustrating the preferred embodiment of the device. Many other configurations having more or fewer components than the system depicted in FIG. 25 are possible.

At least one embodiment of the disclosure can be described in view of the following clauses:

Clause 1. A computer-implemented method, comprising:
broadcasting one or more blockchain transactions to a blockchain network that include an attestation that a user has access to a first private key associated with a first blockchain address;
determining a condition that indicates that the first private key should be deprecated has been met;
obtaining, by the user, access to a second private key associated with a second blockchain address;
generating a blockchain account migrate transaction that encodes:
the first blockchain address;
the second blockchain address;
a public key corresponding to the second private key; and
a digital signature generated by the first private key; and
broadcasting the blockchain account migrate transaction to the blockchain network, thereby causing a subsequent blockchain transaction transferring control of a digital asset to the first blockchain address to instead transfer control of the digital asset to the second blockchain address.

Clause 2. The method of clause 1, wherein broadcasting the blockchain account migrate transaction further causes the first blockchain to be associated with a data structure that indicates a migration from the first blockchain address to the second blockchain address.

Clause 3. The method of clause 1, wherein broadcasting the blockchain account migrate transaction further causes one or more transferrable tokens controlled under the first blockchain address to be transferred to the second blockchain address.

Clause 4. The method of clause 1, wherein the condition that indicate that the first private key should be deprecated is an indication that the first private key may be accessible to a different entity from the user.

Clause 5. The method of clause 1, wherein a second public key corresponding to the first private key is usable, after the broadcasting of the blockchain account migrate transaction, to verify digital signatures generated by the first private key prior to the broadcasting of the blockchain account migrate transaction.

Clause 6. The method of clause 1, wherein causing the subsequent blockchain transaction transferring control of the digital asset to instead transfer control of the digital asset to the second blockchain address comprises causing a node of the blockchain network to:
determine the subsequent blockchain transaction indicates control of the digital asset should be transferred to the first blockchain address;
determine that a first account associated with the first blockchain address is deprecated;
determine an ancestry that links the first blockchain account to a second blockchain account associated with the second blockchain address; and
transfer control of the digital asset to the second blockchain address.

Clause 7. The method of clause 6, wherein the ancestry links the first blockchain account to the second blockchain account via a third blockchain account, wherein the third blockchain account is deprecated.

Clause 8. A system, comprising:
one or more processors; and
memory storing a set of instructions that, as a result of execution by the one or more processors, cause the system to:
broadcast one or more blockchain transactions to a blockchain network that include an attestation that a user has access to a first private key associated with a first blockchain address;
determine a condition that indicates that the first private key should be deprecated has been met;
obtain, by the user, access to a second private key associated with a second blockchain address;
generate a blockchain account migrate transaction that encodes:
the first blockchain address;
the second blockchain address;
a public key corresponding to the second private key; and
a digital signature generated by the first private key; and
broadcast the blockchain account migrate transaction to the blockchain network, thereby causing a subsequent blockchain transaction transferring control of a digital asset to the first blockchain address to instead transfer control of the digital asset to the second blockchain address.

Clause 9. The system of clause 8, wherein the instructions that broadcast the blockchain account migrate transaction comprise instructions that, as a result of execution, causes the first blockchain to be associated with a data structure that indicates a migration from the first blockchain address to the second blockchain address.

Clause 10. The system of clause 8, wherein the instructions that broadcast the blockchain account migrate transaction comprise instructions that, as a result of execution, causes one or more non-transferrable tokens controlled under the first blockchain address to remain under control of the first blockchain address after the blockchain account migration transaction is broadcasted.

Clause 11. The system of clause 8, wherein the condition that indicate that the first private key should be deprecated is an indication to perform a key rotation.

Clause 12. The system of clause 8, wherein the instructions that cause the subsequent blockchain transaction transferring control of the digital asset to instead transfer control of the digital asset to the second blockchain address include instructions that, as a result of execution, cause the system to cause a node of the blockchain network to:
determine the subsequent blockchain transaction indicates control of the digital asset should be transferred to the first blockchain address;
determine that a first account associated with the first blockchain address is deprecated;
determine an ancestry that links the first blockchain account to a second blockchain account associated with the second blockchain address; and
transfer control of the digital asset to the second blockchain address.

Clause 13. The system of clause 12, wherein the ancestry links the first blockchain account to the second blockchain account via a third blockchain account, wherein the third blockchain account is deprecated.

Clause 14. A non-transitory computer-readable storage medium having stored thereon executable instructions that, as a result of execution by one or more processors of a computer system, cause the computer system to:
broadcast one or more blockchain transactions to a blockchain network that include an attestation that a user has access to a first private key associated with a first blockchain address;
determine a condition that indicates that the first private key should be deprecated has been met;
obtain, by the user, access to a second private key associated with a second blockchain address;
generate a blockchain account migrate transaction that encodes:
the first blockchain address;
the second blockchain address;
a public key corresponding to the second private key; and
a digital signature generated by the first private key; and
broadcast the blockchain account migrate transaction to the blockchain network, thereby causing a subsequent blockchain transaction transferring control of a digital asset to the first blockchain address to instead transfer control of the digital asset to the second blockchain address.

Clause 15. The non-transitory computer-readable storage medium of clause 14, wherein the instructions that broadcast the blockchain account migrate transaction comprise instructions that, as a result of execution, causes the first blockchain to be associated with a data structure that indicates a migration from the first blockchain address to the second blockchain address.

Clause 16. The non-transitory computer-readable storage medium of clause 14, wherein the instructions that broadcast the blockchain account migrate transaction comprise instructions that, as a result of execution, causes one or more non-transferrable tokens controlled under the first blockchain address to remain under control of the first blockchain address after the blockchain account migration transaction is broadcasted.

Clause 17. The non-transitory computer-readable storage medium of clause 14, wherein the condition that indicate that the first private key should be deprecated is an indication to perform a key rotation.

Clause 18. The non-transitory computer-readable storage medium of clause 14 wherein a second public key corresponding to the first private key is usable, after the broadcasting of the blockchain account migrate transaction, to verify digital signatures generated by the first private key prior to the broadcasting of the blockchain account migrate transaction.

Clause 19. The non-transitory computer-readable storage medium of clause 14, wherein the instructions that cause the subsequent blockchain transaction transferring control of the digital asset to instead transfer control of the digital asset to the second blockchain address include instructions that, as a result of execution, cause the computer system to cause a node of the blockchain network to:
determine the subsequent blockchain transaction indicates control of the digital asset should be transferred to the first blockchain address;
determine that a first account associated with the first blockchain address is deprecated;
determine an ancestry that links the first blockchain account to a second blockchain account associated with the second blockchain address; and
transfer control of the digital asset to the second blockchain address.

Clause 20. The non-transitory computer-readable storage medium of clause 19, wherein the ancestry links the first blockchain account to the second blockchain account via a third blockchain account, wherein the third blockchain account is deprecated.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. Further, unless stated otherwise or otherwise clear from context, the phrase "based on" means "based at least in part on" and not "based solely on." Further, unless stated otherwise or otherwise clear from context, "some embodiments" may refer to "one or more embodiments."

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    broadcasting one or more blockchain transactions to a blockchain network that include an attestation that a user has access to a first private key associated with a first blockchain address;
    determining a condition that indicates that the first private key should be deprecated has been met;
    obtaining, by the user, access to a second private key associated with a second blockchain address;
    generating a blockchain account migrate transaction that encodes:
        a first field indicating a first address to deprecate, wherein the first field comprises the first blockchain address;
        a second field indicating a second address to link to the first address, wherein the second field comprises the second blockchain address;
        a public key corresponding to the second private key; and
        a digital signature generated by the first private key; and
    broadcasting, in response to the condition indicating the first private key should be deprecated, the blockchain account migrate transaction to the blockchain network, thereby causing a subsequent blockchain transaction to transfer control of the digital asset to the second blockchain address instead of a destination address of the subsequent blockchain transaction, wherein the subsequent blockchain transaction indicates the first blockchain address as the destination address.

2. The method of claim 1, wherein broadcasting the blockchain account migrate transaction further causes the first blockchain to be associated with a data structure that indicates a migration from the first blockchain address to the second blockchain address.

3. The method of claim 1, wherein broadcasting the blockchain account migrate transaction further causes one or more transferrable tokens controlled under the first blockchain address to be transferred to the second blockchain address.

4. The method of claim 1, wherein the condition that indicate that the first private key should be deprecated is an indication that the first private key may be accessible to a different entity from the user.

5. The method of claim 1, wherein a second public key corresponding to the first private key is usable, after the broadcasting of the blockchain account migrate transaction, to verify digital signatures generated by the first private key prior to the broadcasting of the blockchain account migrate transaction.

6. The method of claim 1, wherein causing the subsequent blockchain transaction transferring control of the digital asset to instead transfer control of the digital asset to the second blockchain address comprises causing a node of the blockchain network to:
  determine the subsequent blockchain transaction indicates control of the digital asset should be transferred to the first blockchain address;
  determine that a first blockchain account associated with the first blockchain address is deprecated;
  determine an ancestry that links the first blockchain account to a second blockchain account associated with the second blockchain address; and
  transfer control of the digital asset to the second blockchain address.

7. The method of claim 6, wherein the ancestry links the first blockchain account to the second blockchain account via a third blockchain account, wherein the third blockchain account is deprecated.

8. A system, comprising:
  one or more processors; and
  memory storing a set of instructions that, as a result of execution by the one or more processors, cause the system to:
    broadcast one or more blockchain transactions to a blockchain network that include an attestation that a user has access to a first private key associated with a first blockchain address;
    determine a condition that indicates that the first private key should be deprecated has been met;
    obtain, by the user, access to a second private key associated with a second blockchain address;
    generate a blockchain account migrate transaction that encodes:
      a first field indicating a first address to deprecate, wherein the first field comprises the first blockchain address;
      a second field indicating a second address to link to the first address, wherein the second field comprises the second blockchain address;
      a public key corresponding to the second private key; and
      a digital signature generated by the first private key; and
    broadcast, in response to the condition indicating the first private key should be deprecated, the blockchain account migrate transaction to the blockchain network, thereby causing a subsequent blockchain transaction to transfer control of the digital asset to the second blockchain address instead of a destination address of the subsequent blockchain transaction, wherein the subsequent blockchain transaction indicates the first blockchain address as the destination address.

9. The system of claim 8, wherein the instructions that broadcast the blockchain account migrate transaction comprise instructions that, as a result of execution, causes the first blockchain to be associated with a data structure that indicates a migration from the first blockchain address to the second blockchain address.

10. The system of claim 8, wherein the instructions that broadcast the blockchain account migrate transaction comprise instructions that, as a result of execution, causes one or more non-transferrable tokens controlled under the first blockchain address to remain under control of the first blockchain address after the blockchain account migration transaction is broadcasted.

11. The system of claim 8, wherein the condition that indicate that the first private key should be deprecated is an indication to perform a key rotation.

12. The system of claim 8, wherein the instructions that cause the subsequent blockchain transaction transferring control of the digital asset to instead transfer control of the digital asset to the second blockchain address include instructions that, as a result of execution, cause the system to cause a node of the blockchain network to:
  determine the subsequent blockchain transaction indicates control of the digital asset should be transferred to the first blockchain address;
  determine that a first blockchain account associated with the first blockchain address is deprecated;
  determine an ancestry that links the first blockchain account to a second blockchain account associated with the second blockchain address; and
  transfer control of the digital asset to the second blockchain address.

13. The system of claim 12, wherein the ancestry links the first blockchain account to the second blockchain account via a third blockchain account, wherein the third blockchain account is deprecated.

14. A non-transitory computer-readable storage medium having stored thereon executable instructions that, as a result of execution by one or more processors of a computer system, cause the computer system to:
  broadcast one or more blockchain transactions to a blockchain network that include an attestation that a user has access to a first private key associated with a first blockchain address;
  determine a condition that indicates that the first private key should be deprecated has been met;
  obtain, by the user, access to a second private key associated with a second blockchain address;
  generate a blockchain account migrate transaction that encodes:
    a first field indicating a first address to deprecate, wherein the first field comprises the first blockchain address;
    a second field indicating a second address to link to the first address, wherein the second field comprises the second blockchain address;

a public key corresponding to the second private key; and a digital signature generated by the first private key; and broadcast, in response to the condition indicating the first private key should be deprecated, the blockchain account migrate transaction to the blockchain network, thereby causing a subsequent blockchain transaction to transfer control of the digital asset to the second blockchain address instead of a destination address of the subsequent blockchain transaction, wherein the subsequent blockchain transaction indicates the first blockchain address as the destination address.

15. The non-transitory computer-readable storage medium of claim 14, wherein the instructions that broadcast the blockchain account migrate transaction comprise instructions that, as a result of execution, causes the first blockchain to be associated with a data structure that indicates a migration from the first blockchain address to the second blockchain address.

16. The non-transitory computer-readable storage medium of claim 14, wherein the instructions that broadcast the blockchain account migrate transaction comprise instructions that, as a result of execution, causes one or more non-transferrable tokens controlled under the first blockchain address to remain under control of the first blockchain address after the blockchain account migration transaction is broadcasted.

17. The non-transitory computer-readable storage medium of claim 14, wherein the condition that indicate that the first private key should be deprecated is an indication to perform a key rotation.

18. The non-transitory computer-readable storage medium of claim 14 wherein a second public key corresponding to the first private key is usable, after the broadcasting of the blockchain account migrate transaction, to verify digital signatures generated by the first private key prior to the broadcasting of the blockchain account migrate transaction.

19. The non-transitory computer-readable storage medium of claim 14, wherein the instructions that cause the subsequent blockchain transaction transferring control of the digital asset to instead transfer control of the digital asset to the second blockchain address include instructions that, as a result of execution, cause the computer system to cause a node of the blockchain network to:

determine the subsequent blockchain transaction indicates control of the digital asset should be transferred to the first blockchain address;

determine that a first blockchain account associated with the first blockchain address is deprecated;

determine an ancestry that links the first blockchain account to a second blockchain account associated with the second blockchain address; and transfer control of the digital asset to the second blockchain address.

20. The non-transitory computer-readable storage medium of claim 19, wherein the ancestry links the first blockchain account to the second blockchain account via a third blockchain account, wherein the third blockchain account is deprecated.

* * * * *